US009294926B2

(12) United States Patent
Pragada et al.

(10) Patent No.: US 9,294,926 B2
(45) Date of Patent: Mar. 22, 2016

(54) METHOD AND APPARATUS FOR INTEGRATING DIFFERENT RADIO ACCESS TECHNOLOGIES USING CARRIER AGGREGATION

(71) Applicant: INTERDIGITAL PATENT HOLDINGS, INC., Wilmington, DE (US)

(72) Inventors: Ravikumar V. Pragada, Collegeville, PA (US); Samian Kaur, Plymouth Meeting, PA (US); Douglas R. Castor, Norristown, PA (US); Philip J. Pietraski, Huntington Station, NY (US); Arnab Roy, East Norriton, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 342 days.

(21) Appl. No.: 13/646,160

(22) Filed: Oct. 5, 2012

(65) Prior Publication Data
US 2013/0088983 A1 Apr. 11, 2013

Related U.S. Application Data

(60) Provisional application No. 61/544,853, filed on Oct. 7, 2011, provisional application No. 61/653,753, filed on May 31, 2012.

(51) Int. Cl.
*H04W 16/14* (2009.01)
*H04W 92/02* (2009.01)
(Continued)

(52) U.S. Cl.
CPC .......... *H04W 16/14* (2013.01); *H04W 36/0083* (2013.01); *H04W 92/02* (2013.01); *H04L 5/003* (2013.01); *H04W 36/14* (2013.01);
(Continued)

(58) Field of Classification Search
None
See application file for complete search history.

(56) References Cited

U.S. PATENT DOCUMENTS

| 2006/0126565 A1 | 6/2006 | Shaheen |
| 2007/0224988 A1 | 9/2007 | Shaheen |

(Continued)

OTHER PUBLICATIONS

IEEE P802.11ad/D4.0, Draft Standard for Information Technology—Telecommunications and Information Excahnge Between Systems—Local and Metropolitan Area Networks—Specific Requirements—Part 11: Wireless LAN Medium Access Control (MAC) and Physical Layer (PHY) Specifications—Amendement 3: Enhancements for Very High Throughput in the 60 GHz Band (Jul. 2011).

(Continued)

*Primary Examiner* — Diane Lo
(74) *Attorney, Agent, or Firm* — Volpe and Koenig, P.C.

(57) ABSTRACT

A method and apparatus are described for integrating third generation partnership project (3GPP) radio access network and an Institute of Electrical and Electronics Engineers (IEEE) 802.11 radio access technologies (RATs). This may be done at a medium access control (MAC) layer or below the MAC layer. For example, a wireless transmit/receive unit (WTRU) for multiple radio access technology (RAT) integration includes a 3GPP RAT including a radio resource control (RRC) entity, an IEEE 802.11 RAT including a medium access control (MAC) management entity, and a session management entity (SME) for mapping between the RRC entity and the MAC management entity. Combined, hybrid and split versions of logical channel prioritization (LCP) are described. The features of an LTE access stratum-service management entity (AS-SME) are also described.

21 Claims, 35 Drawing Sheets

(51) Int. Cl.
  *H04W 36/00* (2009.01)
  *H04W 36/14* (2009.01)
  *H04L 5/00* (2006.01)
  *H04W 88/06* (2009.01)
  *H04W 48/12* (2009.01)
  *H04W 48/16* (2009.01)

(52) U.S. Cl.
  CPC .............. *H04W 48/12* (2013.01); *H04W 48/16* (2013.01); *H04W 88/06* (2013.01)

(56) References Cited

U.S. PATENT DOCUMENTS

| | | | |
|---|---|---|---|
| 2011/0019532 A1* | 1/2011 | Jung et al. | 370/216 |
| 2011/0044218 A1 | 2/2011 | Kaur et al. | |
| 2011/0134831 A1 | 6/2011 | Pirskanen | |
| 2011/0149731 A1* | 6/2011 | Gong et al. | 370/235 |
| 2012/0106506 A1* | 5/2012 | Taaghol | 370/331 |
| 2012/0113839 A1* | 5/2012 | Etemad | 370/252 |
| 2012/0164948 A1* | 6/2012 | Narasimha et al. | 455/63.1 |
| 2014/0050086 A1* | 2/2014 | Himayat et al. | 370/230 |

OTHER PUBLICATIONS

IEEE Standard for Information Technology—Telecommunications and information exchange between systems—Local and metropolitan area networks—Specific requirements; Part 11: Wireless LAN Medium Access Control (MAC) and Physical Layer (PHY) Specifications, IEEE Draft P802.11-REVmb D10.0 (Aug. 2011).
IEEE Standard for Information Technology—Telecommunications and information exchange between systems—Local and metropolitan area networks—Specific requirements; Part 11: Wireless LAN Medium Access Control (MAC) and Physical Layer (PHY) Specifications, Amendment 2: Fast Basic Service Set (BSS) Transition, IEEE P802.11r-2008 (Jul. 2008).
Intel Corporation, "Discussions on Carrier Aggregation across LTE and WIFI," 3GPP TSG-RAN meeting #53, RP-111094 (Sep. 13-16, 2011).
LAN/MAN Standards Committee of the IEEE Computer Society, "IEEE Standard for Information technology—Telecommunications and information exchange between systems—Local and metropolitan area networks—Specific requirements. Part 11: Wireless LAN Medium Access Control (MAC) and Physical Layer (PHY) Specifications. Amendment 5: Enhancements for Higher Throughput," IEEE Std 802.11n-2009 (Sep. 11, 2009).
LAN/MAN Standards Committee of the IEEE Computer Society, "IEEE Standard for Information technology—Telecommunications and information exchange between systems—Local and metropolitan area networks—Specific requirements. Part 11: Wireless LAN Medium Access Control (MAC) and Physical Layer (PHY) Specifications. Amendment 1: Radio Resource Measurement of Wireless LANs," IEEE Std. 802.11k-2008 (Jun. 12, 2008).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.10.0 (Sep. 2011).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.12.0 (Mar. 2012).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.4.0 (Sep. 2011).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.6.0 (Mar. 2012).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.3.0 (Sep. 2011).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.6.0 (Sep. 2012).
Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.0.0 (Sep. 2012).
Third Generation Partnership Project, "Technical Specification Group Radio Access Network; Evolved Universal Terrestrial Radio Access (E-UTRA); Radio Resource Control (RRC); Protocol specification (Release 8),"0 3GPP TS 36.331 V8.15.0 (Sep. 2011).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.17.0 (Jun. 2012).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.8.0 (Sep. 2011).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.12.0 (Sep. 2012).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.3.0 (Sep. 2011).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.7.0 (Sep. 2012).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.1.0 (Sep. 2012).
Third Generation Partnership Project, "Technical Specification Group Radio Access Network; Requirements for further advancements for Evolved Universal Terrestrial Radio Access (E-UTRA) (LTE-Advanced) (Release 8)," 3GPP TR 36.913 V8.0.1 (Mar. 2009).
Third Generation Partnership Project, "Technical Specification Group Radio Access Network; Requirements for further advancements for Evolved Universal Terrestrial Radio Access (E-UTRA) (LTE-Advanced) (Release 9)," 3GPP TR 36.913 V9.0.0 (Dec. 2009).
Third Generation Partnership Project, "Technical Specification Group Radio Access Network; Requirements for further advancements for Evolved Universal Terrestrial Radio Access (E-UTRA) (LTE-Advanced) (Release 10)," 3GPP TR 36.913 V10.0.0 (Mar. 2011).
Third Generation Partnership Project, "Technical Specification Group Radio Access Network; Requirements for further advancements for Evolved Universal Terrestrial Radio Access (E-UTRA) (LTE-Advanced) (Release 11)," 3GPP TR 36.913 V11.0.0 (Sep. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2, (Release 9)," 3GPP TS 36.300 V9.8.0 (Sep. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overal description; Stage 2 (Release 9)," 3GPP TS 36.300 V9.9.0 (Dec. 2011).
Third Generation Partnership Project, "Technical Specification Group Radio Access Network; Evolved Universal Terrestrial Radio

(56) References Cited

OTHER PUBLICATIONS

Access (E-UTRA) and Evolved Universal Terrestrial Radio Access Network (E-UTRAN); Overall description; Stage 2 (Release 10)," 3GPP TS 36.300 V10.5.0 (Sep. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.8.0 (Jun. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.3.0 (Sep. 2012).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.3.0 (Sep. 2011).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.6.0 (Jun. 2012).
Third Generation Partnership Project, "Technical Specification Group Radio Access Network; Evolved Universal Terrestrial Radio Access (E-UTRA); Multiplexing and channel coding (Release 11)," 3GPP TS 36.212 V11.0.0 (Sep. 2012).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9);" 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedures (Release 10);" 3GPP TS 36.213 V10.3.0 (Sep. 2011).
Third Generation Partnership Project, "Technical Specification Group Radio Access Network; Evolved Universal Terrestrial Radio Access (E-UTRA); Physical layer procedures (Release 10);" 3GPP TS 36.213 V10.7.0 (Sep. 2012).
Third Generation Partnership Project, "Technical Specification Group Radio Access Network; Evolved Universal Terrestrial Radio Access (E-UTRA); Physical layer procedures (Release 11)," 3GPP TS 36.213 V11.0.0 (Sep. 2012).
Third Generation Partnership Project, "Technical Specification Group Radio Access Network; Evolved Universal Terrestrial Radio Access (E-UTRA); Physical layer—Measurements (Release 8)," 3GPP TS 36.214 V8.7.0 (Sep. 2009).
Third Generation Partnership Project, "Technical Specification Group Radio Access Network; Evolved Universal Terrestrial Radio Access (E-UTRA); Physical layer; Measurements (Release 9)," 3GPP TS 36.214 V9.2.0 (Jun. 2010).
Third Generation Partnership Project, "Technical Specification Group Radio Access Network; Evolved Universal Terrestrial Radio Access (E-UTRA); Physical layer; Measurements (Release 10)," 3GPP TS 36.214 V10.1.0 (Mar. 2011).
Third Generation Partnership Project, "Technical Specification Group Radio Access Network; Evolved Universal Terrestrial Radio Access (E-UTRA); Physical layer; Measurements (Release 11)," 3GPP TS 36.214 V11.0.0 (Sep. 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

\* cited by examiner

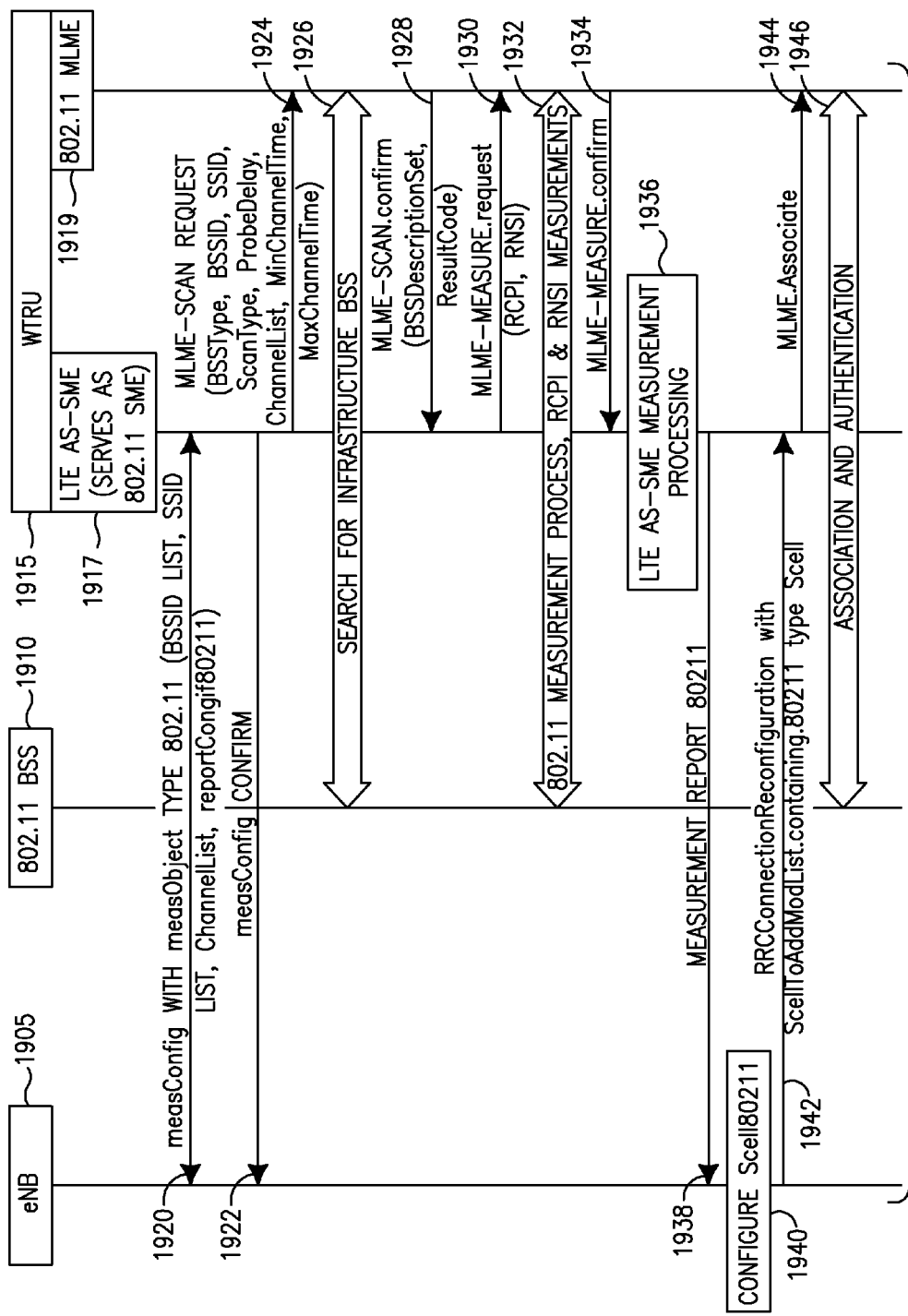
FIG. 19A  CONTINUED ON FIG. 19B

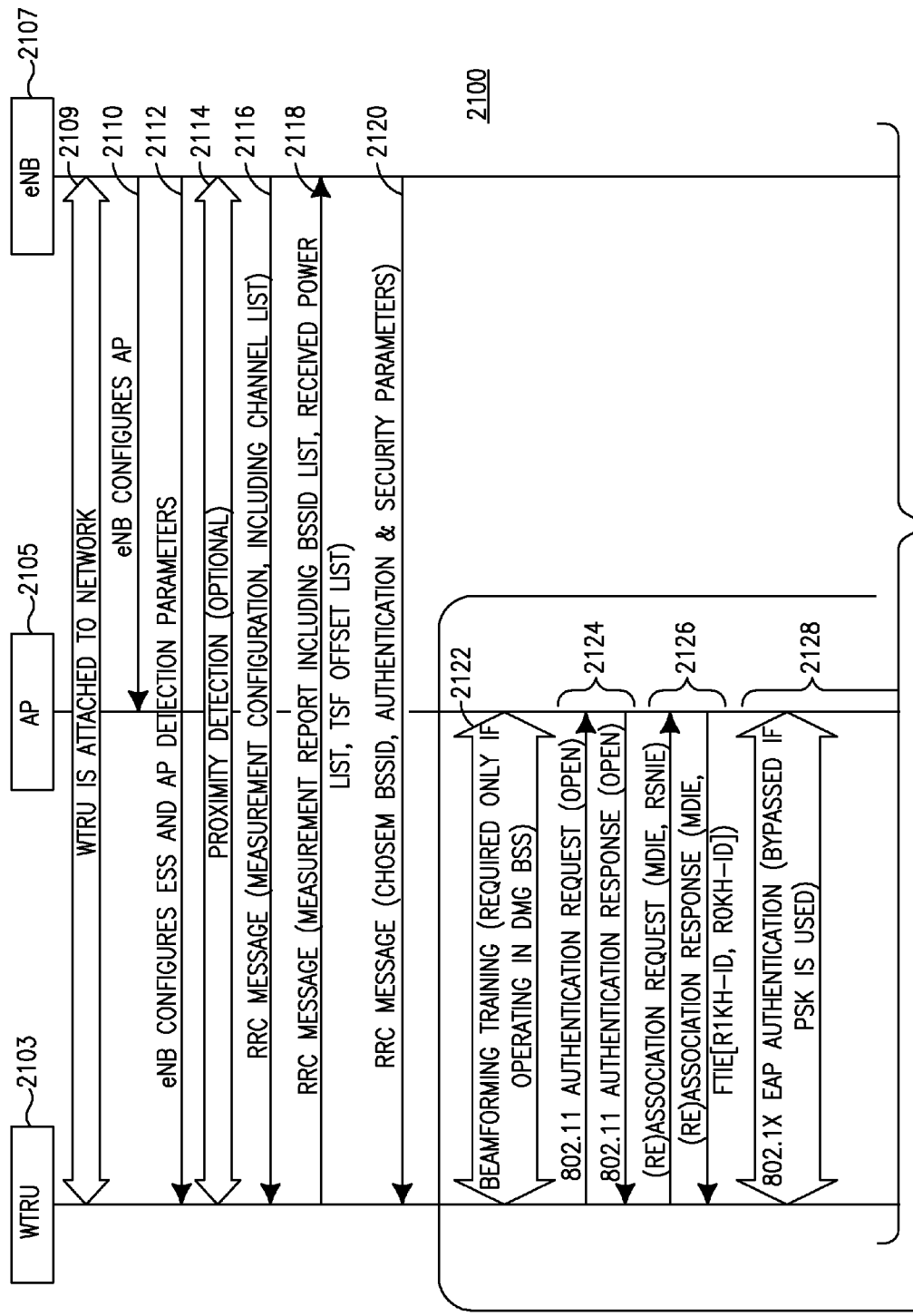

METHOD AND APPARATUS FOR INTEGRATING DIFFERENT RADIO ACCESS TECHNOLOGIES USING CARRIER AGGREGATION

This application claims the benefit of U.S. Provisional Application No. 61/544,853, filed Oct. 7, 2011, and U.S. Provisional Application No. 61/653,753, filed May 31, 2012, the contents of which are hereby incorporated by reference herein.

FIELD OF THE INVENTION

This application is related to wireless communications.

BACKGROUND

Recent growth in data traffic driven by mobile applications on smart phone devices, tablets, and the like has continued to strain the capacity of today's networks. Therefore, network operators are increasingly utilizing un-licensed WiFi spectrum to cope with such network congestion, and this trend is expected to accelerate further as traffic demand continues to grow.

The use of unlicensed spectrum is a cost-effective means to add the needed capacity, given the limited availability and high cost of licensed spectrum. Currently, a wireless local area network (WLAN) may be integrated as a separate access network to the third generation partnership project (3GPP) evolved packet core (EPC). This may result in extra costs for deploying the complete WLAN access network, and impact the 3GPP core network entities. Existing WiFi offload solutions may be based on this deployment model of distinct 3GPP and WLAN access networks using a common core with selective switching of flows based on operator/user policies.

Other solutions are possible that result in a tighter integration and aggregation of 3GPP access network components with WLAN access networks without any impact to and reusing the same 3GPP core network elements. These solutions may enhance the overall user experience without degrading quality of service (QoS), mobility, security and power management when capacity is expanded to unlicensed spectrum.

It would be desirable to achieve such optimized capacity extension without duplicating any functionality already provided by 3GPP core network elements, (e.g., through use of opportunistic carrier aggregation at the edge of radio network, i.e., in the evolved Node-B (eNB)), while minimizing any changes to the WLAN access network/air-interface.

SUMMARY

A method and apparatus are described for integrating third generation partnership project (3GPP) radio access network and an Institute of Electrical and Electronics Engineers (IEEE) 802.11 radio access technologies (RATs). This may be done at a medium access control (MAC) layer or below the MAC layer. For example, a wireless transmit/receive unit (WTRU) for multiple radio access technology (RAT) integration includes a 3GPP RAT including a radio resource control (RRC) entity, an IEEE 802.11 RAT including a medium access control (MAC) management entity, and a session management entity (SME) for mapping between the RRC entity and the MAC management entity. Combined, hybrid and split versions of logical channel prioritization (LCP) are described. The features of an LTE access stratum-service management entity (AS-SME) are also described.

BRIEF DESCRIPTION OF THE DRAWINGS

A more detailed understanding may be had from the following description, given by way of example in conjunction with the accompanying drawings wherein:

FIGS. 19A and 19B show an example message sequence flow and procedure for measurement configuration and execution;

FIGS. 21A and 21B show an example cellular integration with 802.11 initial mobility domain association;

DETAILED DESCRIPTION

Figure 1A:
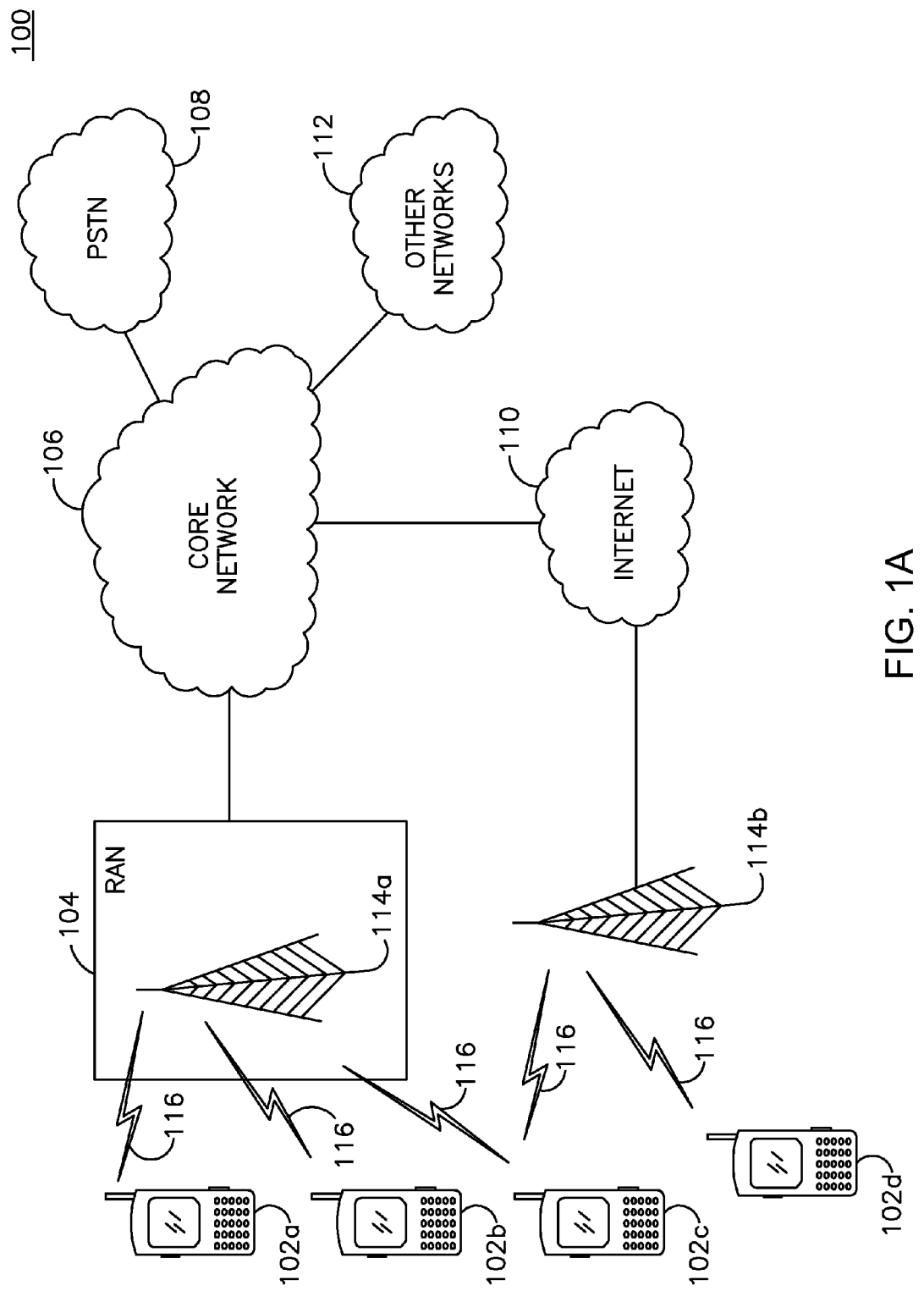
FIG. 1A shows an example communications system in which one or more described embodiments may be implemented.

FIG. 1A shows an example communications system 100 in which one or more described embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, 102d, a radio access network (RAN) 104, a core network (CN) 106, a public switched telephone network (PSTN) 108, the Internet 110, and other networks 112, though it will be appreciated that the described embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a notebook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink (DL) packet access (HSDPA) and/or high-speed uplink (UL) packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1X, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over Internet protocol (VoIP) services to one or more of the WTRUs 102a, 102b, 102c, 102d. For example, the CN 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing an E-UTRA radio technology, the CN 106 may also be in communication with another RAN (not shown) employing a GSM radio technology.

The CN 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
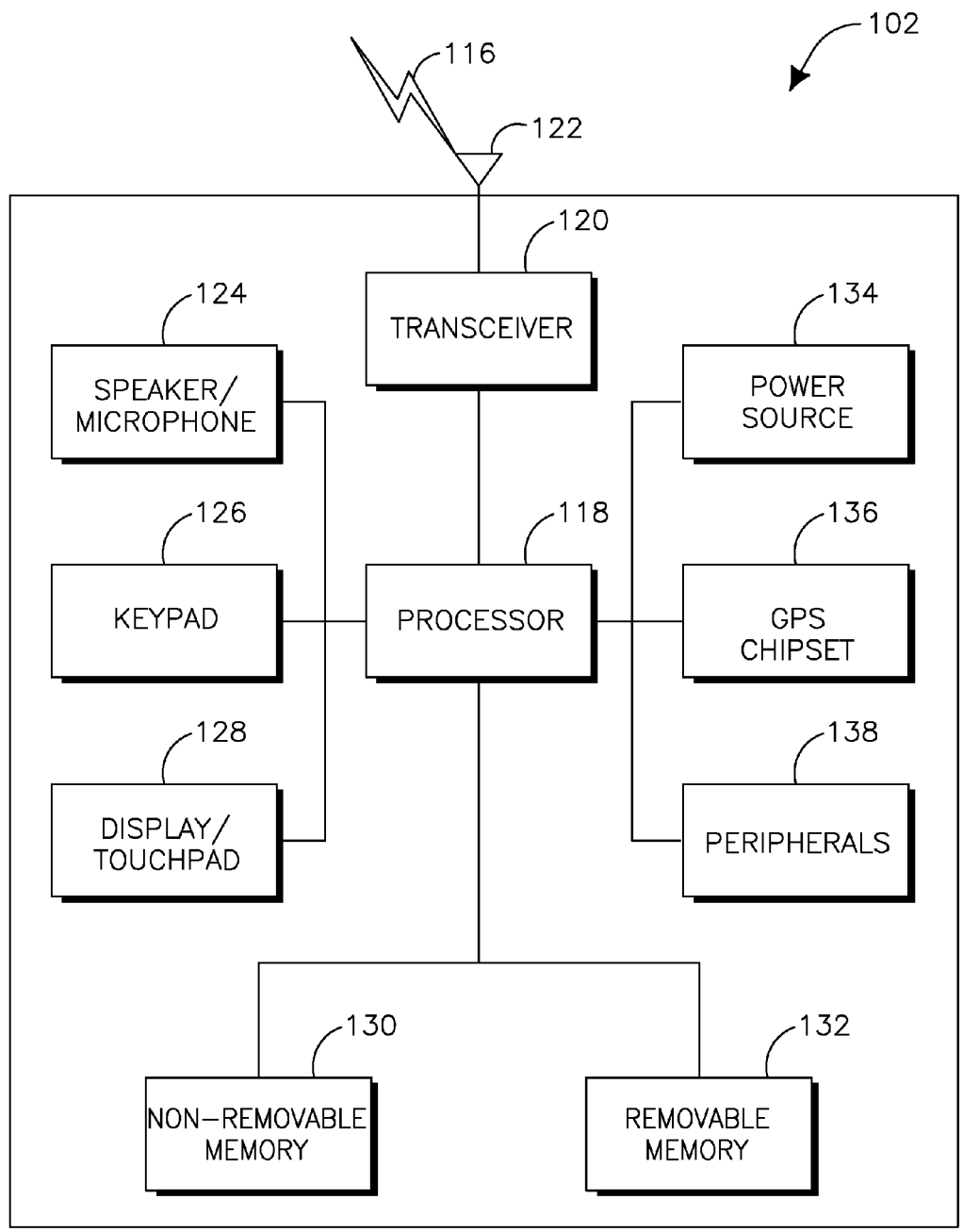
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
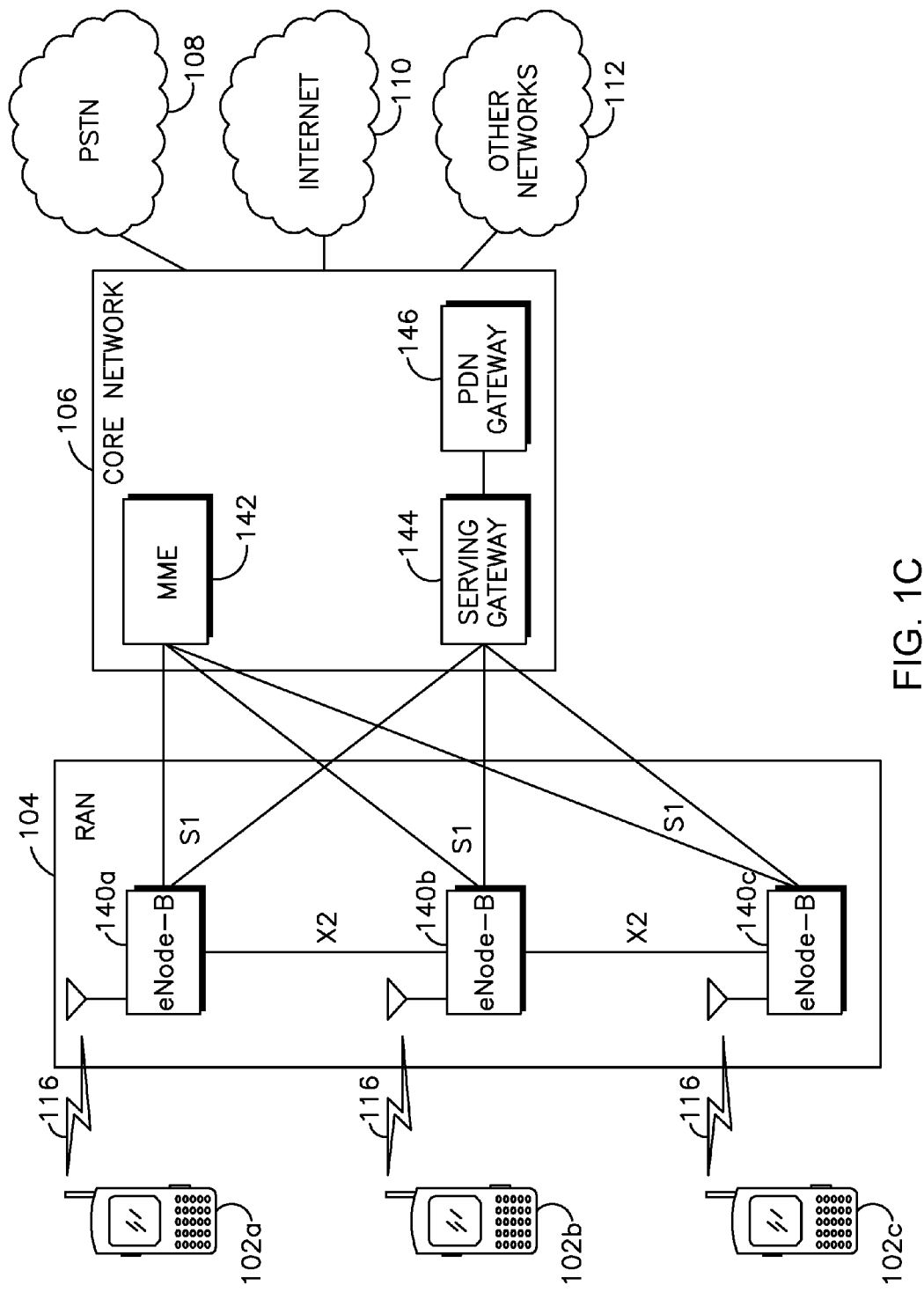
FIG. 1C shows an example radio access network and an example core network (CN) that may be used within the communications system shown in FIG. 1A.

FIG. 1C shows an example RAN 104 and an example CN 106 that may be used within the communications system 100 shown in FIG. 1A. As noted above, the RAN 104 may employ an E-UTRA radio technology to communicate with the WTRUs 102a, 102b, 102c over the air interface 116. The RAN 104 may also be in communication with the CN 106.

The RAN 104 may include eNBs 140a, 140b, 140c, though it will be appreciated that the RAN 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the UL and/or DL, and the like. As shown in FIG. 1C, the eNBs 140a, 140b, 140c may communicate with one another over an X2 interface.

The CN 106 shown in FIG. 1C may include a mobility management entity (MME) 142, a serving gateway 144, and a packet data network (PDN) gateway (GW) 146. While each of the foregoing elements is depicted as part of the CN 106, it will be appreciated that any one of these elements may be owned and/or operated by an entity other than the CN operator.

The MME 142 may be connected to each of the eNBs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when DL data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway, (e.g., an IP multimedia subsystem (IMS) server), that serves as an interface between the CN 106 and the PSTN 108. In addition, the CN 106 may provide the WTRUs 102a, 102b, 102c with access to other networks 112, which may include other wired or wireless networks that are owned and/or operated by other service providers.

Figure 2:
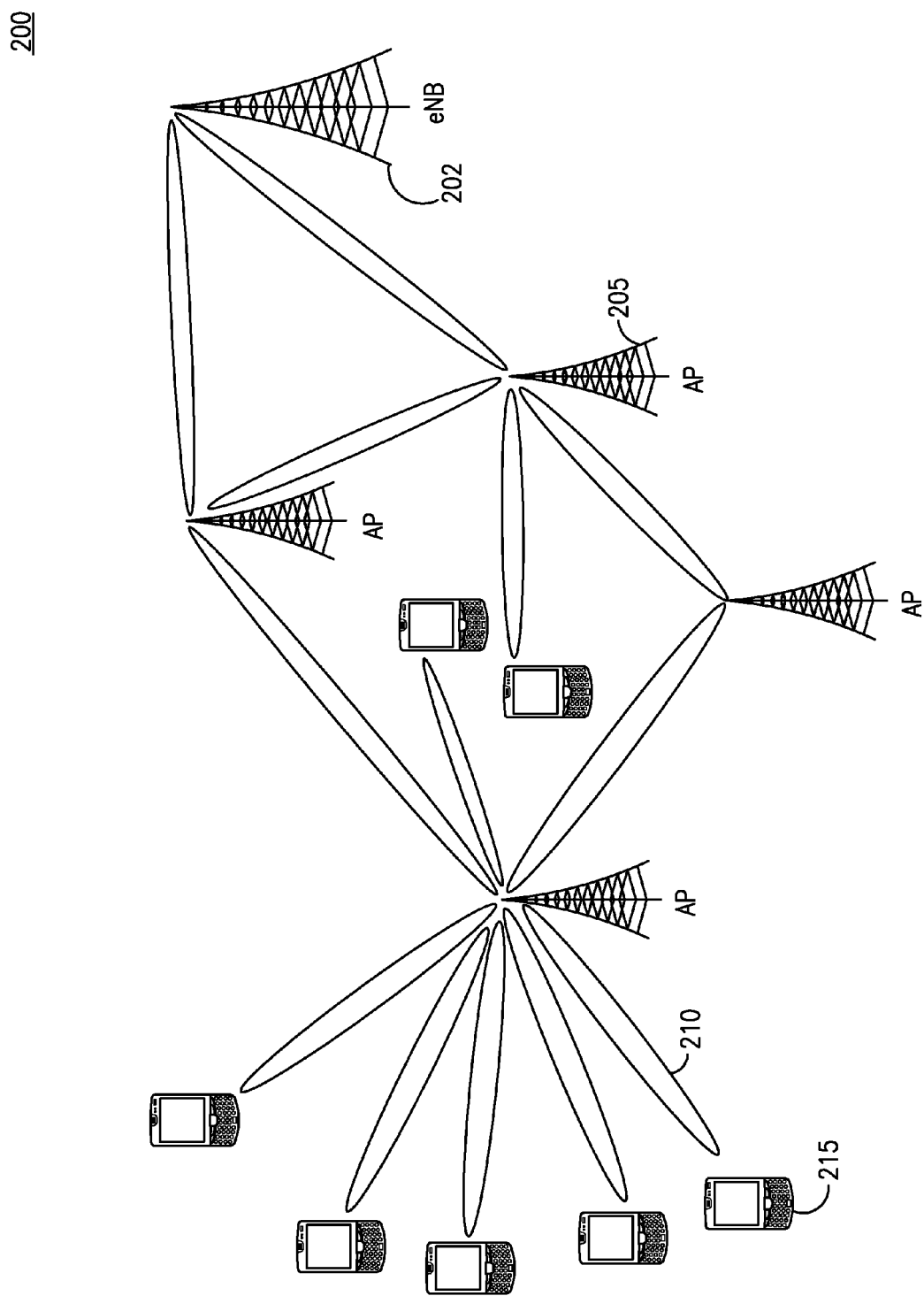
FIG. 2 shows an example evolved Node-B (eNB) with multiple millimeter-wave (mmW) base stations (mBs), highlighting the mmW layer.

Even in un-licensed spectrum, higher frequencies enable use of large bandwidth to achieve very high data rates. While making use of larger bandwidth has always been a part of meeting predictions based on Cooper's Law, additional spectrum has always been added at the "lower" frequencies (i.e., below 3 GHz). This has had an approximately linear impact on total capacity. However, there is a synergetic effect to be exploited at higher frequencies, namely spatial reuse. In order to close the link budget for a millimeter wave (mmW) band, highly directional antennas may be required. For example, in IEEE 802.11, such a system using 60 GHz may be introduced in IEEE 802.11ad. FIG. 2 shows an evolved Node-B (eNB) 200 with access points (AP) 205 with, for example, multiple mmW layers 210 or any 802.11 RAT or spectrum, to multiple WTRUs 215.

The millimeter wave (mmW) hotspot concept (mmW hotspot) project envisions that the mmW layer may be tightly coupled with an LTE system, using a carrier aggregation approach. For such an mmW plus an advanced LTE (LTE-A) hybrid system, mmW carriers may be seen as secondary carriers. Services to a mmW hotspot capable wireless transmit/receive unit (WTRU) may be provided over mmW and LTE bands simultaneously. Overlapping coverage from multiple mmW base stations (mBs)/access points (APs) may be deemed possible. Data is routed by the network to the mB(s) with better reach based on feedback. Thus, mmW feedback may be carried by LTE-A.

In such a system, all control signaling such as system information, paging, random access channel (RACH) access, radio resource control (RRC) and non-access stratum (NAS) signaling, (signaling radio bearers), and multicast traffic may be provided via LTE-A. In one embodiment, low throughput and delay sensitive traffic may also be provided via LTE-A, and high throughput traffic may be routed via an mmW system, such as IEEE 802.11ad or its successors. Optimal scheduling of data may be based on traffic class, link availability, user-class, and load balancing. This may be enabled by dynamic scheduling (at or near transmission timing interval (TTI) level) between LTE-A and mmW bands.

Although the descriptions provided below use LTE as an example 3GPP air-interface to aid understanding, a similar mechanism may be applied to high speed packet access (HSPA) or other air-interfaces to achieve tighter integration with IEEE 802.11. The alternatives and modifications required for the logical channel prioritization (LCP) algorithm may be handled separately from the architecture alternatives. It is presumed that the each architectural alternative may use any of the LCP modification alternatives.

Described herein are example network architectures for enabling tight integration of a 3GPP radio access network (RAN) and an Institute of Electrical and Electronics Engineers (IEEE) 802.11 system. In the below descriptions, the AP may refer to an 802.11 device (e.g. 802.11ad) and the eNB may refer to the cellular node. These defined logical interfaces may operate over any physical interfacing options, and may be configured to operate over existing or new Layer 2 or Layer 3 messaging, (e.g. Internet Protocol (IP) or General packet radio service (GPRS) Tunneling Protocol (GTP)). Each AP node may be optionally managed by an AP Management System (AP-MS), which provides an operations, administration and maintenance (OAM) interface to support startup, initial configuration and management of AP nodes. It is assumed that the eNB-AP link is secure.

As stated above, FIG. 2 shows an example architecture 200 that includes an evolved Node-B (eNB) 202 with APs 205. The APs 205 may communicate with WTRUs 215 over, for example, multiple mmW layers 210 or any 802.11 RAT or spectrum.

Figure 3:
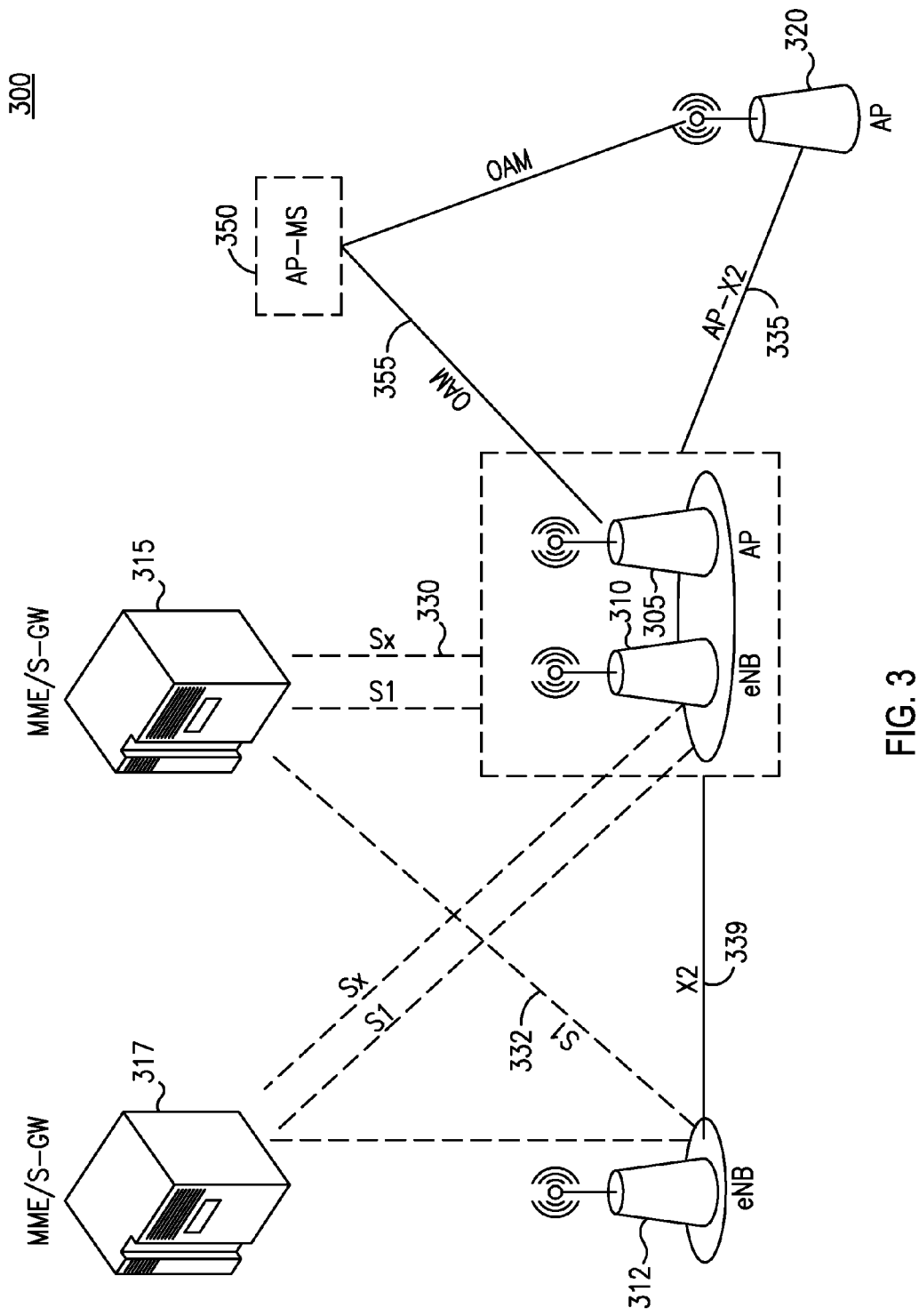
FIG. 3 shows an example overall Evolved Universal Terrestrial Radio Access Network (E-UTRAN) architecture with access point (AP)

FIG. 3 shows an example overall Evolved Universal Terrestrial Radio Access Network (E-UTRAN) architecture 300 with AP. In a co-located deployment, an AP 305 and eNB 310 are assumed to be physically located in the same box, such that there is no physical link required to communicate between the two entities. The two entities may be physically the same device, but logically defined as two functional entities, wherein the eNB 310 is responsible for LTE Radio Access Network (RAN) operation on the licensed LTE spectrum and the AP 305 is responsible for operation in the unlicensed (e.g. mmW) band.

The AP 305 may introduce additional logical interfaces to Mobility Management Entity/Serving Gateway (MME/S-GW) 315 and 317 and neighboring Access Point (AP) nodes 320. These additional interfaces may include a Sx interface 330 which may support configuration of the AP 305 from the MME/S-GW node 315 or 317. In another example, Sx 330 may be further split into a Sx-MME and Sx-U, where Sx-MME is the interface to the MME node and Sx-U is the interface to the S-GW node of the MME/S-GW node 315 or 317. In another example, a S1 332 interface may be extended with additional configuration messages or parameters to allow operation and management of the AP node 305.

Another example interface that may be included is an AP-X2 interface 335 between the AP nodes. This may be a logical interface between the AP nodes 305 and 320, which may be further split into AP-X2-Control and AP-X2-Data to carry control plane and user plane messaging, respectively, between the AP nodes 305 and 320. The eNB 310 may communicate with another eNB 312 via X2 interface 339.

The architecture 300 may further include an AP Management System (AP-MS) 350 which provides an operations, administration and maintenance (OAM) interface 355 to support startup, initial configuration and management of AP nodes 305 and 320.

Figure 4:
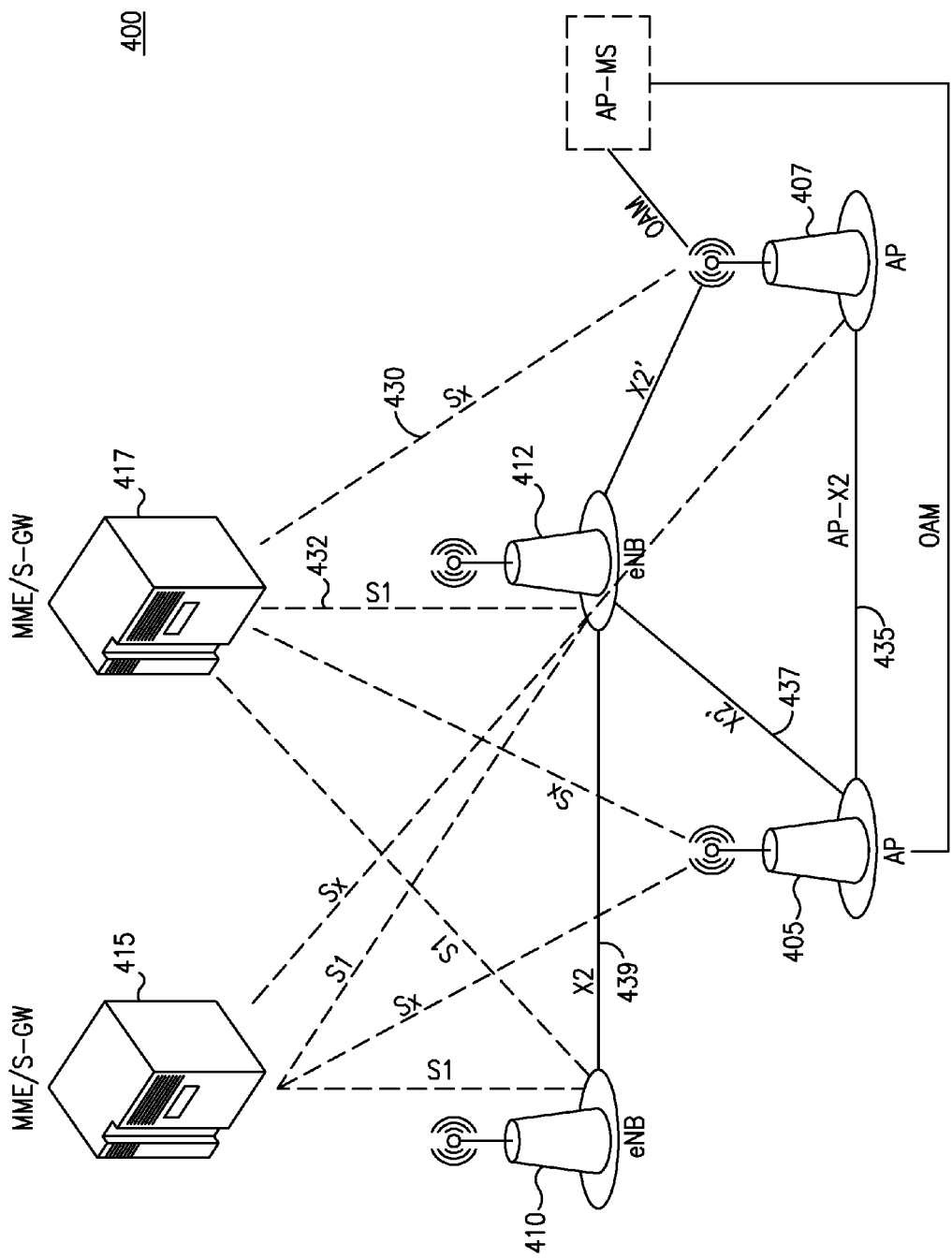
FIG. 4 shows an example overall E-UTRAN architecture with AP, non co-located deployment.

FIG. 4 shows an overall E-UTRAN architecture 400 with APs 405 and 407 in a non-co-located deployment. The APs 405 and 407 are in communication with eNBs 410 and 412, all of which are in communication with MME/S-GWs 415 and 417. The AP nodes 405 and 407 may have the following logical interfaces to the other nodes in the E-UTRAN subsystem. These may include a Sx interface 430 which may support configuration of the APs 405 and 407 from the MME/S-GW nodes 415 and 417. In another example, the Sx may be further split into Sx-MME and Sx-U, where Sx-MME is the interface to the MME and Sx-U is the interface to the S-GW of the MME/S-GW nodes 415 and 417. The Sx may be equivalent to a S1-C interface for AP nodes. In another example, a S1 432 interface may be extended with additional configuration messages or parameters to allow operation and management of the AP nodes 405 and 407. In particular, the MME may have a direct interface to the AP nodes to configure the WTRU context to the AP node, bearer context, quality of service (QoS) profiles, and the like.

The APs 405 and 407 may have an AP-X2 interface 335 between them. This interface may be further split into AP-X2-Control and AP-X2-Data to carry control plane and user plane messaging respectively between the AP nodes 405 and 407. The AP-X2 435 link may be for neighbor interference management and 802.11 band (re-) configuration. The X2' 437 may define the logical interface between eNB 412 and AP 405, for example. It may be split into X2'-C and X2'-U interfaces. The eNB 410 may communicate with another eNB 412 via X2 interface 439.

These defined logical interfaces may operate over any physical interfacing options, and may be configured to operate over existing or new Layer 2 or Layer 3 messaging (e.g. IP or GTP).

The APs may obtain configuration from the AP-MS using two different methods which are applicable to both the co-located and non-co-located examples described herein. One example method uses a direct interface to the AP-MS. In this scenario, the AP may have a connection to the IP network, i.e., at startup the AP node may be connected to the IP network and maintain an independent IP address. This allows for a direct interface to the AP-MS. Another example method uses an eNB interface to the AP-MS. In this scenario, the AP does not have a direct connection to the IP network, but has a cellular interface to obtain initial configuration from the eNB. The eNB connects to the AP-MS and provides configuration to the AP node when it attaches to the network using the cellular connection. The AP node could either directly or indirectly, (through the eNB), connect to the rest of the E-UTRAN components.

Figure 5:
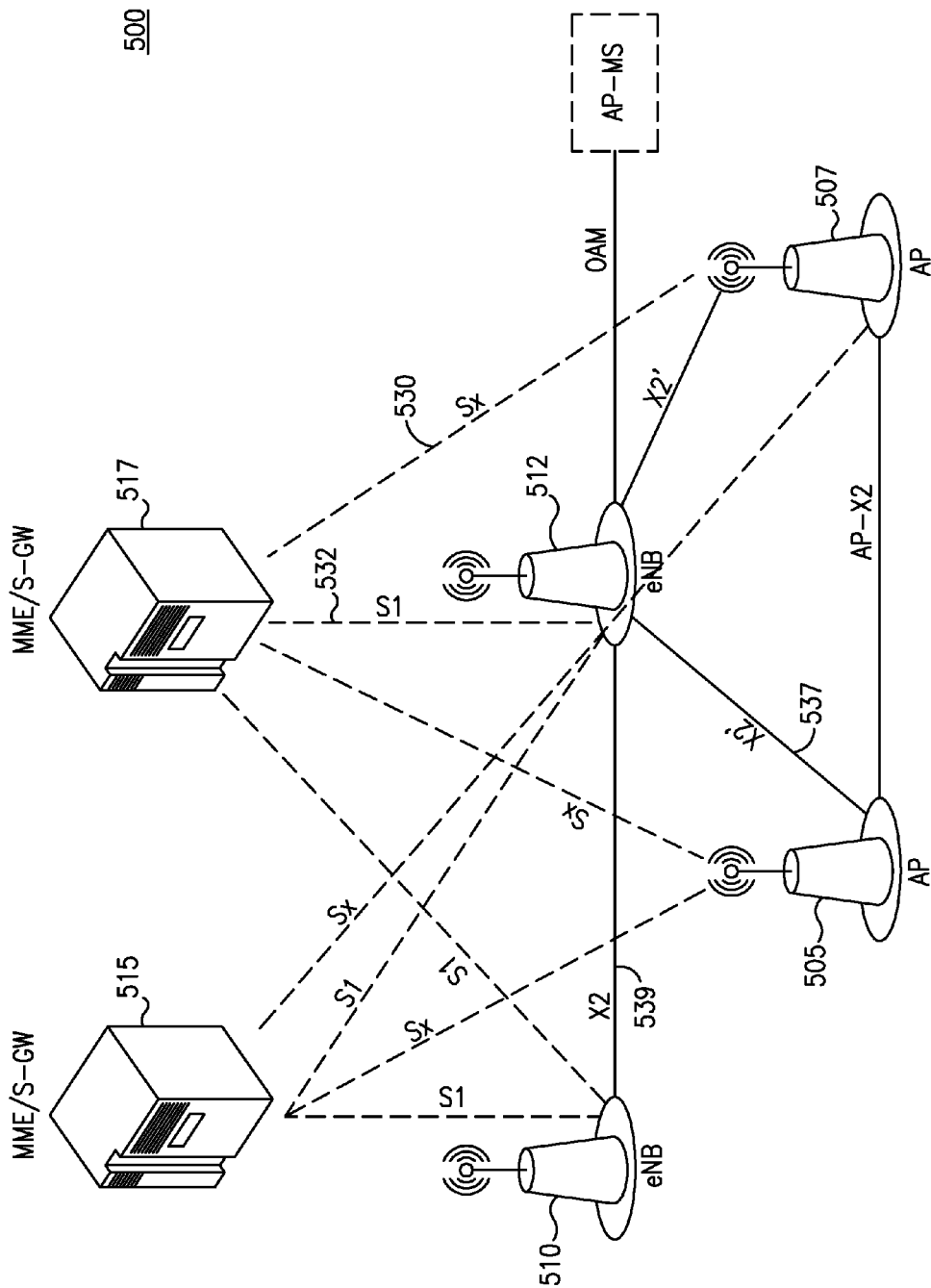
FIG. 5 shows an example overall E-UTRAN architecture with AP, non co-located deployment.

FIG. 5 shows an example overall E-UTRAN architecture 500 with APs 505 and 507 in a non-co-located deployment. The APs 505 and 507 are in communication with eNBs 510 and 512, all of which are in communication with MME/S-GWs 515 and 517. The AP nodes 505 and 507 may have the following logical interfaces to the other nodes in the E-UTRAN sub-system. These may include a Sx interface 530 which may support configuration of the APs 505 and 507 from the MME/S-GW nodes 515 and 517. In another example, the Sx may be further split into Sx-MME and Sx-U, where Sx-MME is the interface to the MME and Sx-U is the interface to the S-GW of the MME/S-GW nodes 515 and 517. In another example, a S1 532 interface may be extended with additional configuration messages or parameters to allow operation and management of the AP nodes 505 and 507. The X2' 537 may define the logical interface between eNB 512 and AP 505, for example. The eNB 510 may communicate with another eNB 512 via X2 interface 539.

The APs 505 and 507 may an AP-X2 interface 535 between them. This interface may be further split into AP-X2-Control and AP-X2-Data to carry control plane and user plane messaging respectively between the AP nodes 505 and 507.

Described herein is the X2' interface. This interface may define the logical interface between eNB and AP as shown herein above in FIGS. 4 and 5. It may be split into X2'-C and X2'-U interfaces. In both the co-located and non co-located deployments, the X2'-C is a logical interface between the AP and the eNB for exchanging control signaling for management, co-ordination and configuration between the eNB and the AP nodes. For example, the X2'-C messaging could be carrying configuration for initial setup.

In an example method, the X2'-C messaging may be exchanged using radio resource control (RRC) protocol over wired link or wireless cellular link. This may require extension of RRC messages or new messages to support or enable bring-up, operation and management of AP nodes.

In another example method, the AP may send a RRC connection request message to get a connection with the eNB. The RRC connection request method may have an additional message indicator to specify if the AP requires resources for the backhaul data-plane or not. The AP may further indicate capabilities including the back-haul and access capabilities. The RRC connection setup message may be extended to include the configuration parameters for AP operation in access link, basic service set ID (BSSID), 802.11 options, and the like. Further additional messaging may be added to authenticate the AP and exchange security parameters required for AP operation. The X2'-C messaging may be initially sent over RRC signaling using the cellular connection and later transitioned to control messaging over the backhaul RAT used. The X2'-C interface may be a wired interface to carry control signaling over a wired link.

Alternatively, the X2'-C messaging may be exchanged using new signaling protocol sent over a GTP over IP link over a generic L2/L1 stack, (wired or wireless). The X2'-C protocol may carry access configuration parameters and WTRU authentication parameters.

Described herein is the X2'-U interface between the eNB and the AP node. In the non co-located deployment, the X2'-U may be a logical interface for data-plane messaging between the eNB and the AP node. In an example, the X2'-U interface may carry radio link control (RLC) packet data units (PDUs) or medium access control (MAC) service data units (SDUs) that need to be sent to the WTRU through the AP node. The X2'-U interface may be a per-WTRU, per-Radio Bearer (or EPC bearer) per WTRU, or for only per UE interface.

The X2'-U interface may be implemented using wired or wireless backhaul. The backhaul may be implemented using GTP over IP network over any L2/L1 stack. In an example, the back-haul may use cellular data plane. In another example, the backhaul may use a wireless mesh architecture with multiple hops between the eNB and the AP node. In another example, the X2'-U messaging may be used to carry RLC user-plane traffic for individual WTRUs over GTP over User Datagram Protocol (UDP) over IP.

Figure 6:
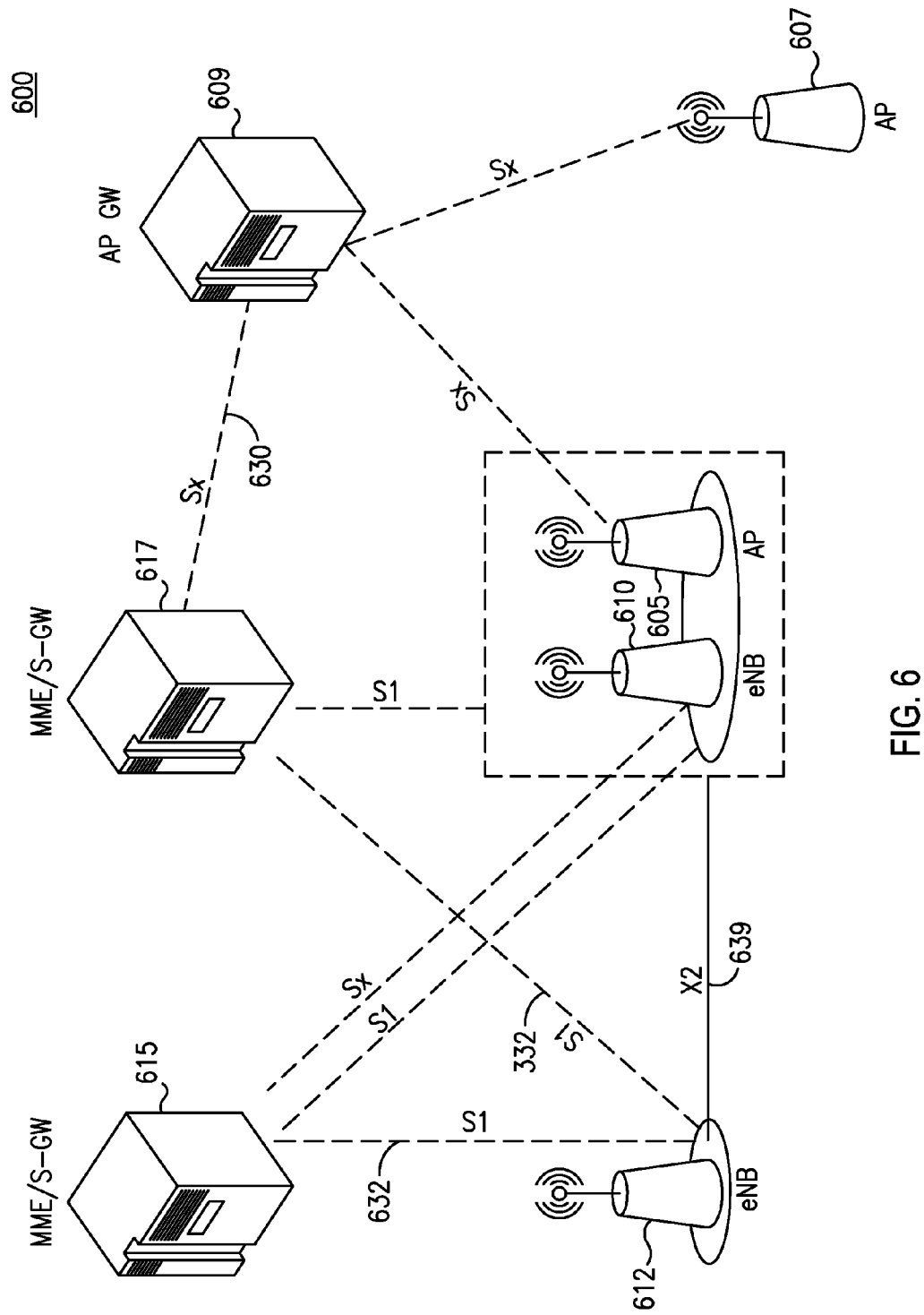
FIG. 6 shows an example overall E-UTRAN architecture with AP, co-located deployment with AP gateway (GW) node.

Described herein is the AP gateway (GW) node. FIG. 6 shows an example E-UTRAN architecture 600 with an AP 605 in a co-located deployment with an AP GW node 609. In another example, the AP 605 may be co-located as described herein above with an eNB 610. The eNB 610 may communicate with another eNB 612 via a X2 interface 639, and with MME/S-GW 615 and 617 via S1 interfaces 632. The AP 605 may communicate with AP GW 609 and MME/S-GW 615 and 617 via Sx interfaces 630. The AP may use the Sx interface 630 to communicate between the AP 605 and the EPC to support a large number of APs in a scalable manner, for example, AP 607. The AP GW 609 serves as a concentrator for the C-Plane, specifically the Sx-MME interface. The Sx-U interface from the AP 605 may be terminated at the AP GW 609, or a direct logical U-Plane connection between the eNB 610 and the S-GW of MME/S-GW 615 or 617 may be used.

Figure 7:
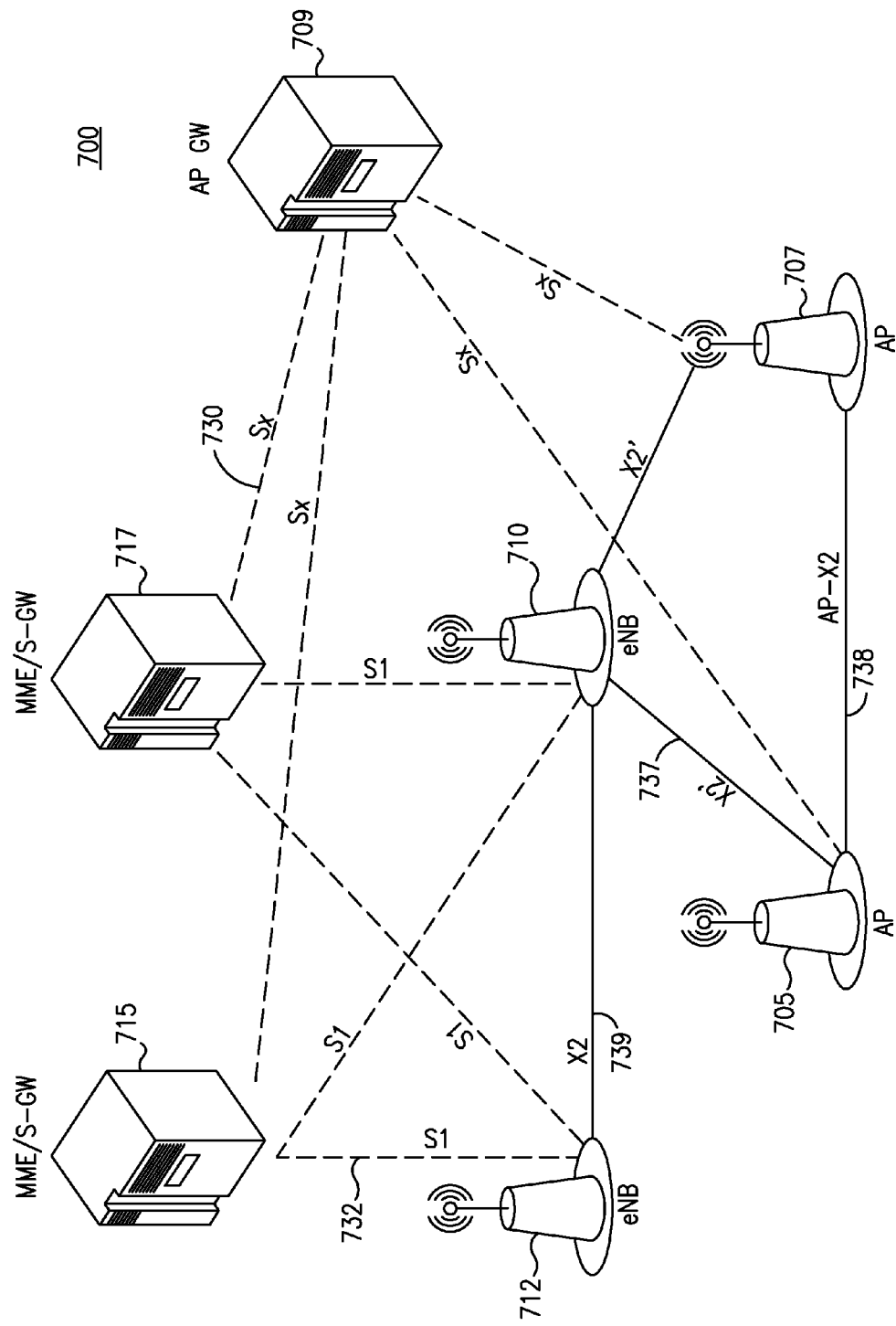
FIG. 7 shows an example overall E-UTRAN architecture with AP, non co-located deployment with AP GW.

FIG. 7 shows an example overall E-UTRAN architecture 700 with an AP 705 in a non-co-located deployment with AP-GW 709. AP 705 and AP 707 are in communication with an eNB 710 via an X2' interface 737 and are in communication with each other via an AP-X2 interface 738, i.e. the data from 705 and 707 may be routed either directly back to an eNB via X2' or though a multi-hop connection via AP-X2 and then to X2'. The eNB 710 may communicate with an eNB 712 via an X2 interface 739 and with MME/S-GW 715 and 717 via a S1 interface 732. The AP GW 709 may communicate with AP 705 and 707 and MME/S-GW 715 and 717 via an Sx interface 730.

Described herein are example deployment structures using 802.11 basic service set (BSS)/extended service set (ESS) configurations. The 802.11 APs associated with a particular eNB may form an ESS and share the same service set ID (SSID). The APs and their associated WTRUs, (also called stations—STAs), form a Basic Service Set (BSS) and are identified by a unique BSSID. The BSSs are connected to each other via the distribution system, which also may connect them to the internet.

Figure 8:
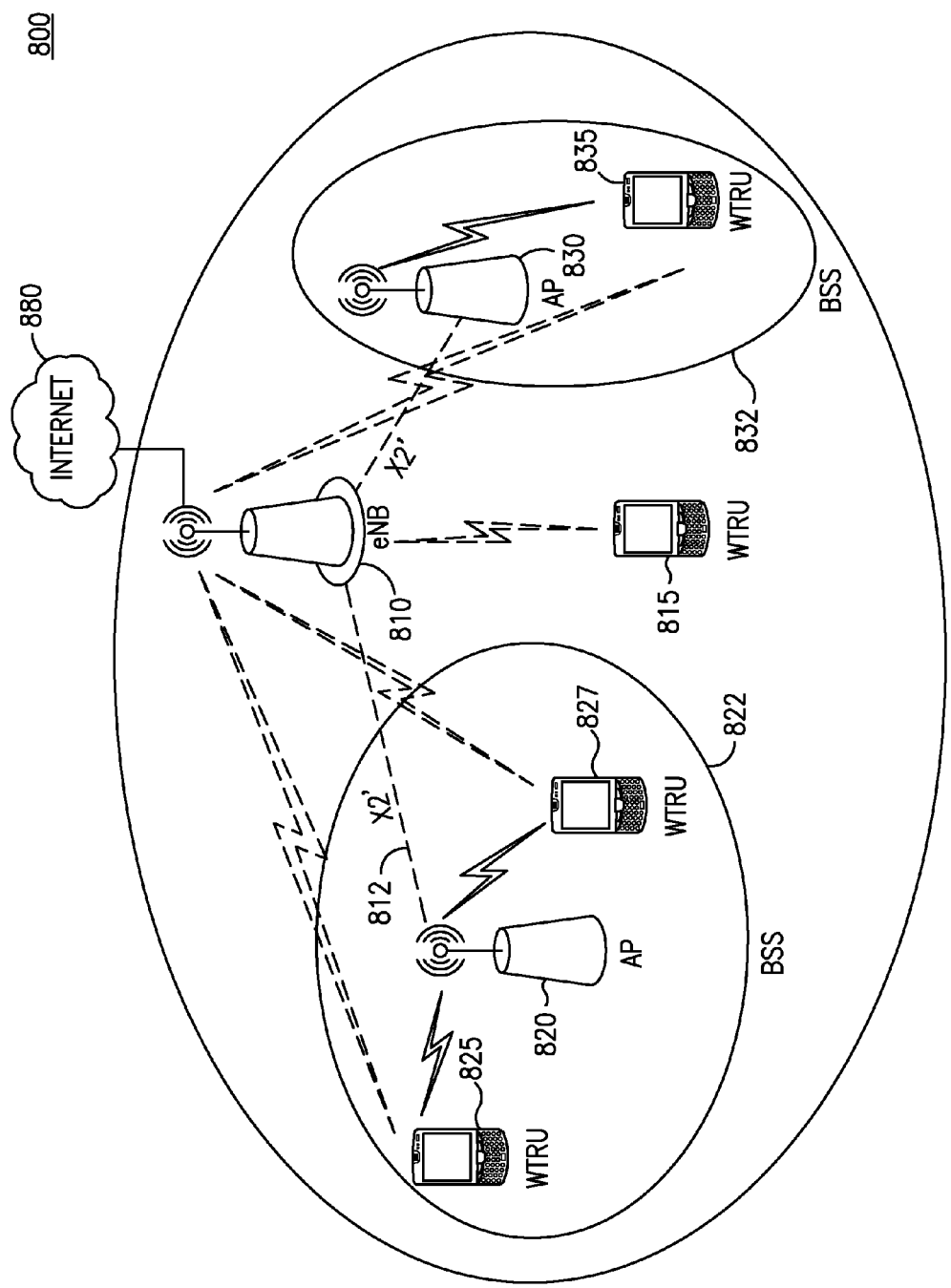
FIG. 8 shows an example collection of basis service set (BSSs) forming an extended service set (ESS)

FIG. 8 shows an example system 800 including a collection of BSSs forming an ESS and how the ESS structure relates to the hybrid cellular-WLAN architecture. In particular, an ESS 705 may include an eNB 810 that is connected to Internet 808. The eNB 810 may be connected to a WTRU 815, and to AP 820 and AP 830 via an X2' interface 812. The AP 820 may have a corresponding BSS 822 which may include WTRUs 825 and 827 in communication with AP 820. The AP 830 may have a corresponding BSS 832 which may include WTRU 835 in communication with AP 830.

A few variations may be possible as far as WTRU-to-AP mutual authentication and communication security are concerned. In an example, the AP and the WTRU authenticate to each other and exchange security keys based on the original 802.11 procedure, but with the authentication and key exchange messages flowing from the AP to the authentication server, (residing in the eNB), over the X2' interface. In another example, the mutual authentication procedure may be simplified because the WTRU and the AP have secure connections to the eNB. This allows the authentication procedure to be truncated to a simple two-message challenge text/response exchange, or may be skipped altogether.

Figure 9:
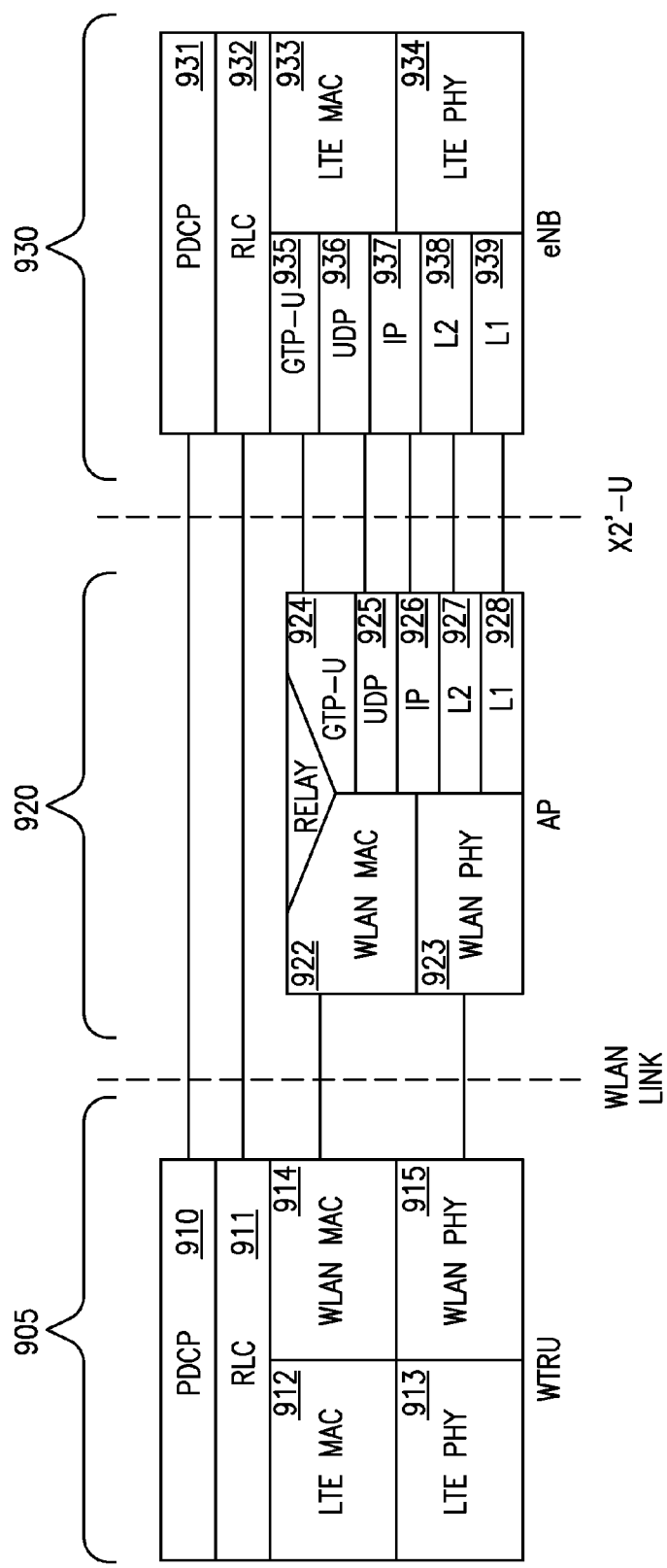
FIG. 9 shows an example user-plane protocol stack view.

FIG. 9 shows a user-plane protocol stack view 900 for a WTRU 901, AP 902 and eNB 903. This protocol stack view 900 may apply to both the co-located and non-co-located deployments. The WTRU protocol stack 905 may include a Packet Data Convergence Protocol (PDCP) entity 910, a radio link control (RLC) entity 911, a LTE MAC entity 912, a LTE PHY entity 913, a WLAN MAC entity 914 and a WLAN PHY entity 915. The AP protocol stack 920 may include a Relay entity 921, a WLAN MAC entity 922, a WLAN PHY entity 923, a GPRS Tunneling protocol user plane (GTP-U) entity 924, an UDP entity 925, an IP entity 926, an L2 entity 927 and an L1 entity 928. The eNB protocol stack may 930 may include a PDCP entity 931, a RLC entity 932, a LTE MAC entity 933, a LTE PHY entity 934, a GTP-U entity 935, an UDP entity 936, an IP entity 937, an L2 entity 938 and an L1 entity 939.

The user-plane protocol stack between the WTRU 901 and the AP 902 may use the 802.11 MAC 914, 922 and the 802.11 PHY layers 915, 923, respectively, for the WLAN link 940. The user-plane protocol stack between the AP 902 and the eNB 903 may use GTP-U 924, 935, respectively, for the X2'-U interface 950. The LTE MAC 912, 933 and PHY 913, 934 in the WTRU 901 and the eNB 903 may communicate over the Uu interface.

The L1 and L2 layers on the X2'-U interface are unspecified. Any PHY protocol running over a medium such as, but not limited to, optical fiber, Ethernet, microwave, millimeter wave or cellular-based backhaul and its accompanying Layer-2 protocols may be applicable.

Methods and apparatus (i.e., architecture) are described herein to enable tight integration of a 3GPP radio access network (RAN) and an IEEE 802.11 system. To achieve tighter integration, aggregation may be performed at or above MAC layer or below the MAC layer.

Figure 10:
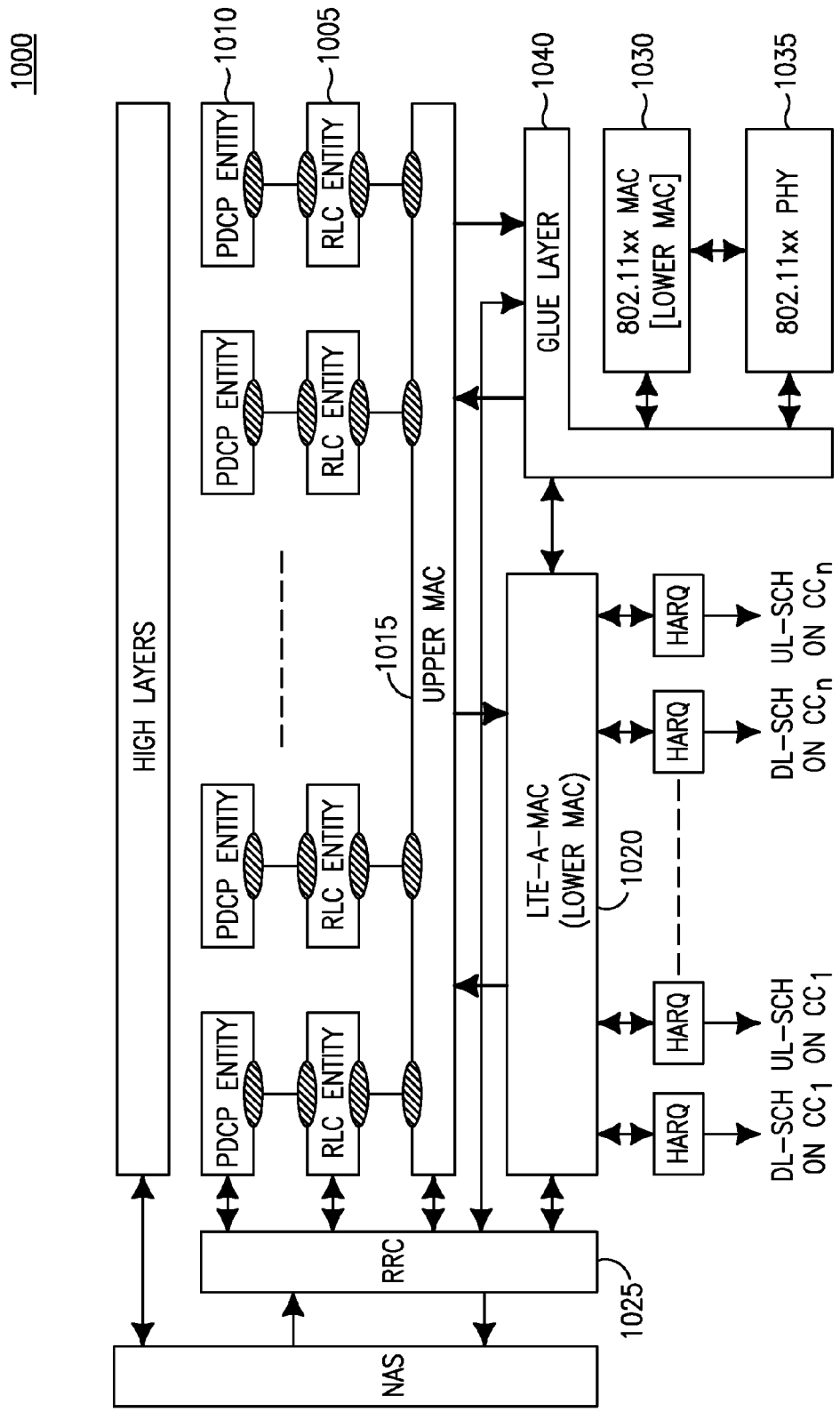
FIG. 10 shows an example medium access control (MAC) layer aggregation across long term evolution (LTE) and Institute of Electrical and Electronics Engineers (IEEE) 802.11 radio access technologies (RATs)

FIG. 10 shows MAC architecture 1000 for MAC layer aggregation between LTE and IEEE 802.11 air-interfaces. Carrier aggregation with IEEE 802.11 may be transparent to layers above the MAC entity, (for example, radio link control (RLC) entities 1005, packet data convergence protocol (PDCP) entities 1010, and the like). The MAC entity or functionality may be split into an upper MAC module 1015, (or common MAC), an LTE-A lower MAC module/entity 1020 and IEEE 802.11 MAC module/entity 1030, which may interface with the upper MAC module/entity 1015 via a "glue (WLAN Abstraction) layer or entity" 1040. The upper MAC module/entity 1015 may hide the details of specific RAT related aspects from layers above the MAC entity. The upper MAC module/entity 1015 may interface with the RLC entities 1005. An LTE radio resource control (RRC) module/entity 1025 may configure and control the upper MAC module/entity 1015, along with the LTE-A lower MAC module/entity 1020, an IEEE 802.11 lower MAC module/entity 1030 and an IEEE 802.11 physical layer/entity (PHY) 1035. The IEEE 802.11 protocol interactions with LTE layers may be abstracted using the glue layer/entity 1040.

The upper MAC module 1015 may provide a service access point (SAP) to the RLC entities 1005, map logical channel data to the LTE-A lower MAC module 1020 or the IEEE 802.11 lower MAC module 1030. Logical channel prioritization (LCP) may be part of the upper MAC module 1015 if performing combined LCP or hybrid LCP options, or may be absent if performing split LCP.

LCP may be part of the LTE-A lower MAC module 1020 if performing split LCP, and absent if performing combined LCP or hybrid LCP options. MAC frame processing is implemented by the multiplexing of MAC service data units (SDUs) from one or different logical channels onto transport blocks (TBs) to be delivered to the physical layer on transport channels, and demultiplexing of MAC SDUs from one or different logical channels from TBs delivered from the physical layer on transport channels. The LTE-A lower MAC module 1020 and the IEEE 802.11 lower MAC module 1030 may implement access schemes, channel quality monitoring, link adaptation, modulation and coding scheme (MCS) selection, scheduling information reporting and error correction through hybrid automatic repeat reauest (HARQ)/IEEE 802.11 retransmission.

The WLAN abstraction or glue layer/entity 1040 may provide a configuration for the IEEE 802.11 carrier/AP, and abstract details of IEEE 802.11 RAT implementation from LTE. In particular, the glue layer/entity 1040 may hide details specific to 802.11 MAC/PHY, provide interface for user data exchange, provide mechanisms to obtain information related to buffer occupancy, and provide an interface for 802.11 RAT to provide information as to how much data it can potentially transmit within a given time period.

The glue layer/entity 1040 may also enable application programming interfaces (APIs) to send and receive both control and data plane aspects. Control plane aspects may include configuration/re-configuration, activation/deactivation, discontinuous reception (DRX), neighbor AP and radio resource management (RRM) measurements, and the like. Data plane aspects may include scheduling related information, (modulation coding scheme (MCS), transmission opportunity (TXOP) per access class (AC), maximum packet size, grant periods and the like), higher layer data handling and associated success/failure indications, discard handling, and the like. The glue layer 1040 may also provide translation between LTE formats and IEEE 802.11 formats, provide and control first-in first-out FIFO data buffers for derandomizing data flows, and execute an LCP algorithm the case of a split LCP.

The glue/WLAN Abstraction layer/entity 1040 may also provide details specific to 802.11 MAC/PHY, interface for user data exchange, mechanisms to obtain information related to buffer occupancy, and an interface for 802.11 RAT to provide info as to how much data it can potentially transmit within a given time period. Further, it may provide QoS translation and configuration translation for example related to Measurement configuration etc.

Figure 11:
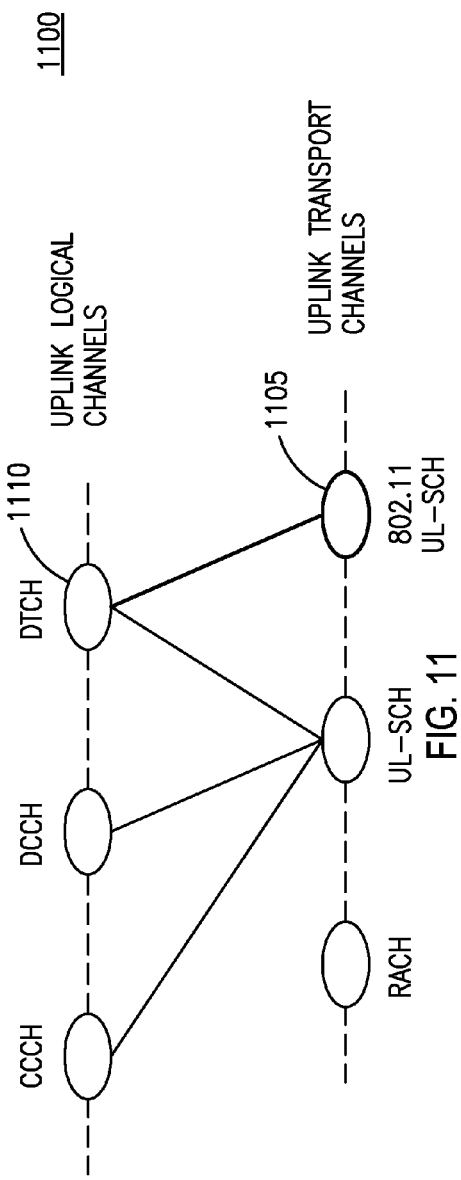
FIG. 11 shows an example uplink (UL) transport channels for an LTE and IEEE 802.11 RAT aggregated system.
Figure 12:
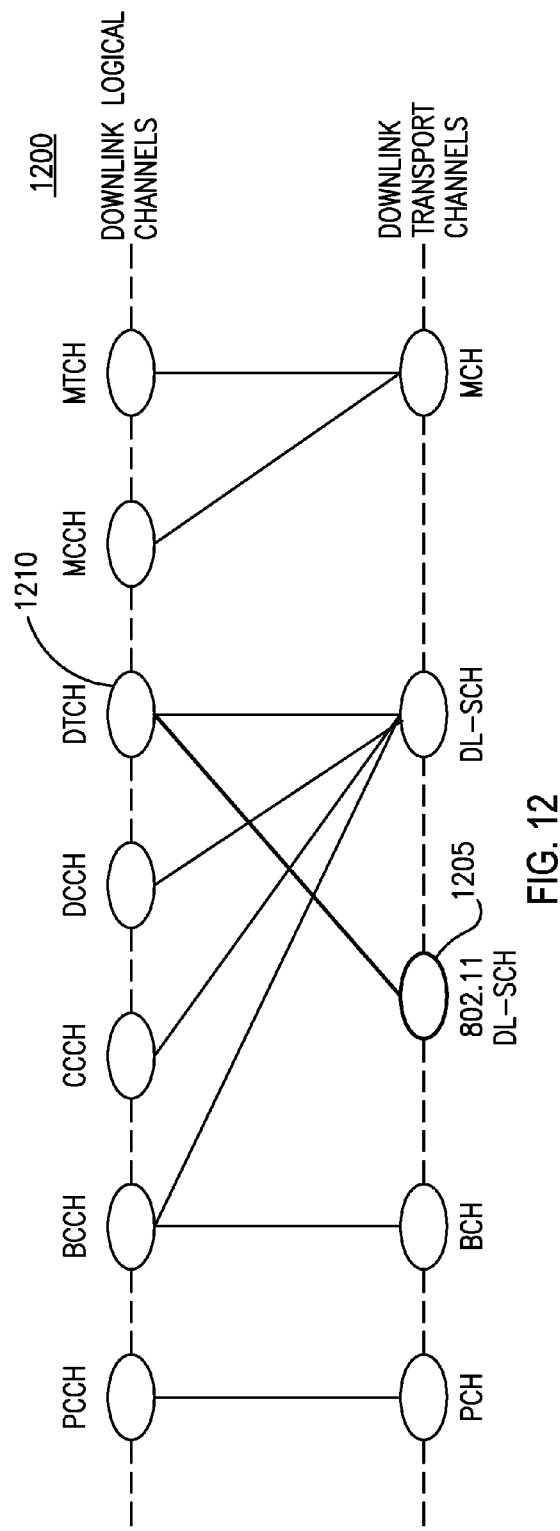
FIG. 12 shows an example downlink (DL) transport channels for an LTE and IEEE 802.11 RAT aggregated system.

Logical channel to transport channel mapping may also be implemented as part of the glue layer 1040. The IEEE 802.11 carrier may provide another transport channel both as a UL shared channel (UL-SCH) as shown in FIG. 11 and as a DL-SCH as shown in FIG. 12. In particular, FIG. 11 shows UL transport channels for an LTE and IEEE 802.11 RAT aggregated system 1100 that includes at least a 802.11 UL-SCH 1105 mapped to a dedicated traffic channel (DTCH) 1110 and FIG. 12 shows DL transport channels for an LTE and IEEE 802.11 RAT aggregated system 1200 that includes at least a 802.11 DL-SCH 1205 mapped to a dedicated traffic channel (DTCH) 1210.

Figure 13:
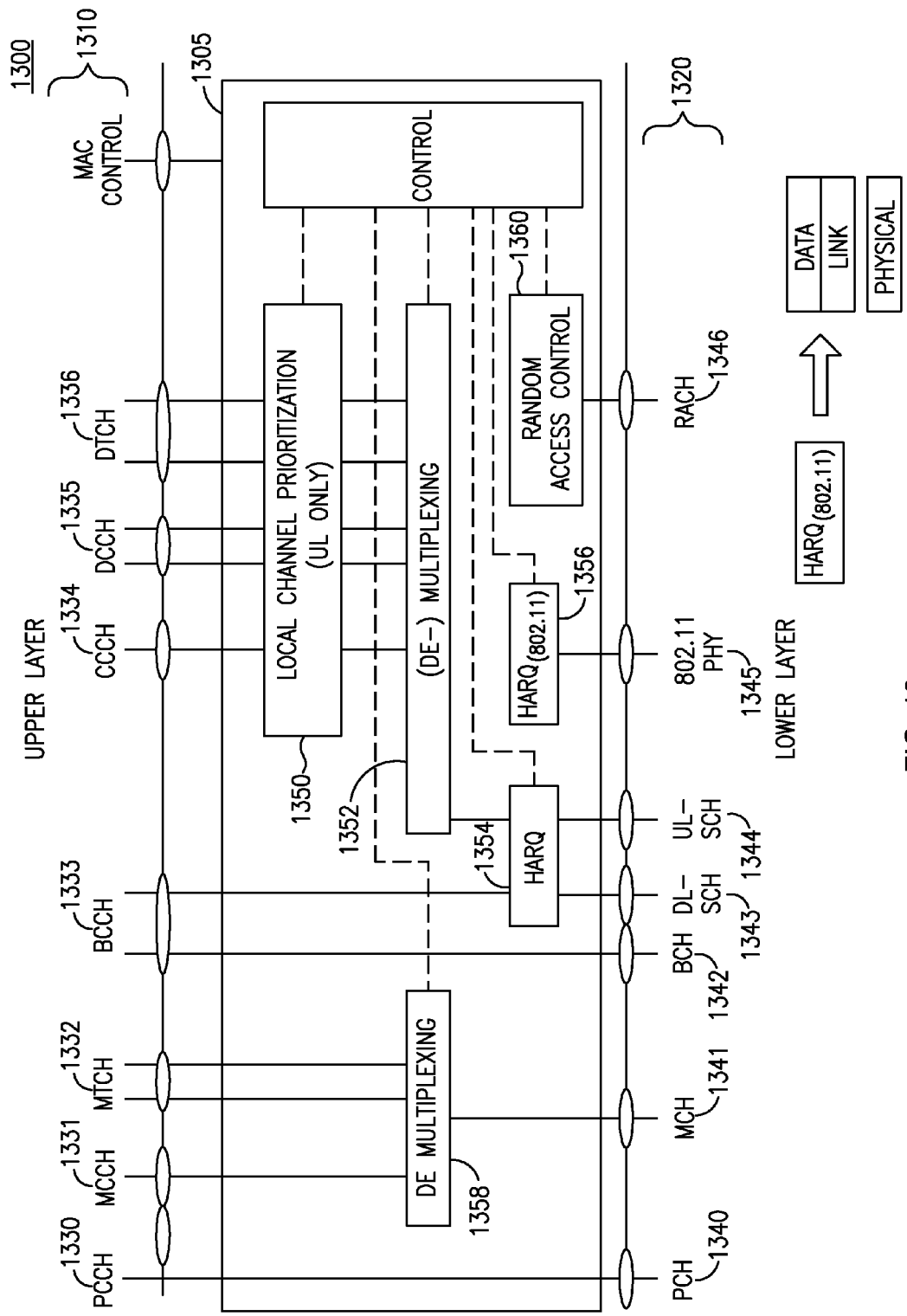
FIG. 13 shows an example architecture for below the MAC aggregation across LTE and IEEE 802.11 RATs.

FIG. 13 shows architecture 1300 for MAC aggregation across LTE and IEEE 802.11 RATs. Architecture 1300 illustrates a MAC entity 1305 that service upper layers 1310 and lower layers 1320. Service to the upper layers 1310 is provided in the form of logical channels that may include a paging control channel (PCCH) 1330, a multicast control channel (MCCH) 1331, a multicast traffic channel (MTCH) 1332, a broadcast control channel (BCCH) 1333, a common control channel (CCCH) 1334, a dedicated control channel (DCCH) 1335, and a dedicated traffic channel (1336). The upper layers 1310 further include a MAC-control entity 1315. Service to the lower layers 1320 is provided in the form of transport channels which may include a paging channel (PCH) 1340, a multicast channel (MCH) 1341, a broadcast channel (BCH) 1342, a DL-SCH 1343, an UL-SCH 1344, an 802.11 PHY 1345 and a random access channel (RACH) 1346.

The MAC entity 1305 may include a logical channel prioritization (LCP) entity 1350 connected to a (de) multiplexing entity 1352 which in turn is connected to a hybrid automatic repeat request (HARQ) entity 1354 and an IEEE 802.11 transport or HARQ entity 1356. The MAC entity 1305 may further include a de-multiplexing entity 1358 and a random access control entity 1360. A control entity 1370 is connected to the LCP 1350, (de) multiplexing entity 1352, HARQ 1354, 802.11 transport entity 1356, de-multiplexing entity 1358 and random access control entity 1360. In particular, the 802.11 transport entity 1356 may be perceived to be another HARQ entity from an LTE MAC point of view. The name IEEE 802.11 HARQ is meant to imply that an IEEE 802.11 RAT implements HARQ features such as incremental redundancy/chase combining and the like. The data interface between LTE MAC and IEEE 802.11 is configured so that a transport block may be built by an LTE MAC and provided to an IEEE 802.11 RAT for transmission. A transport block from the 802.11 transport entity 1356 may be transmitted using the 802.11 MAC and PHY layers.

Figure 14:
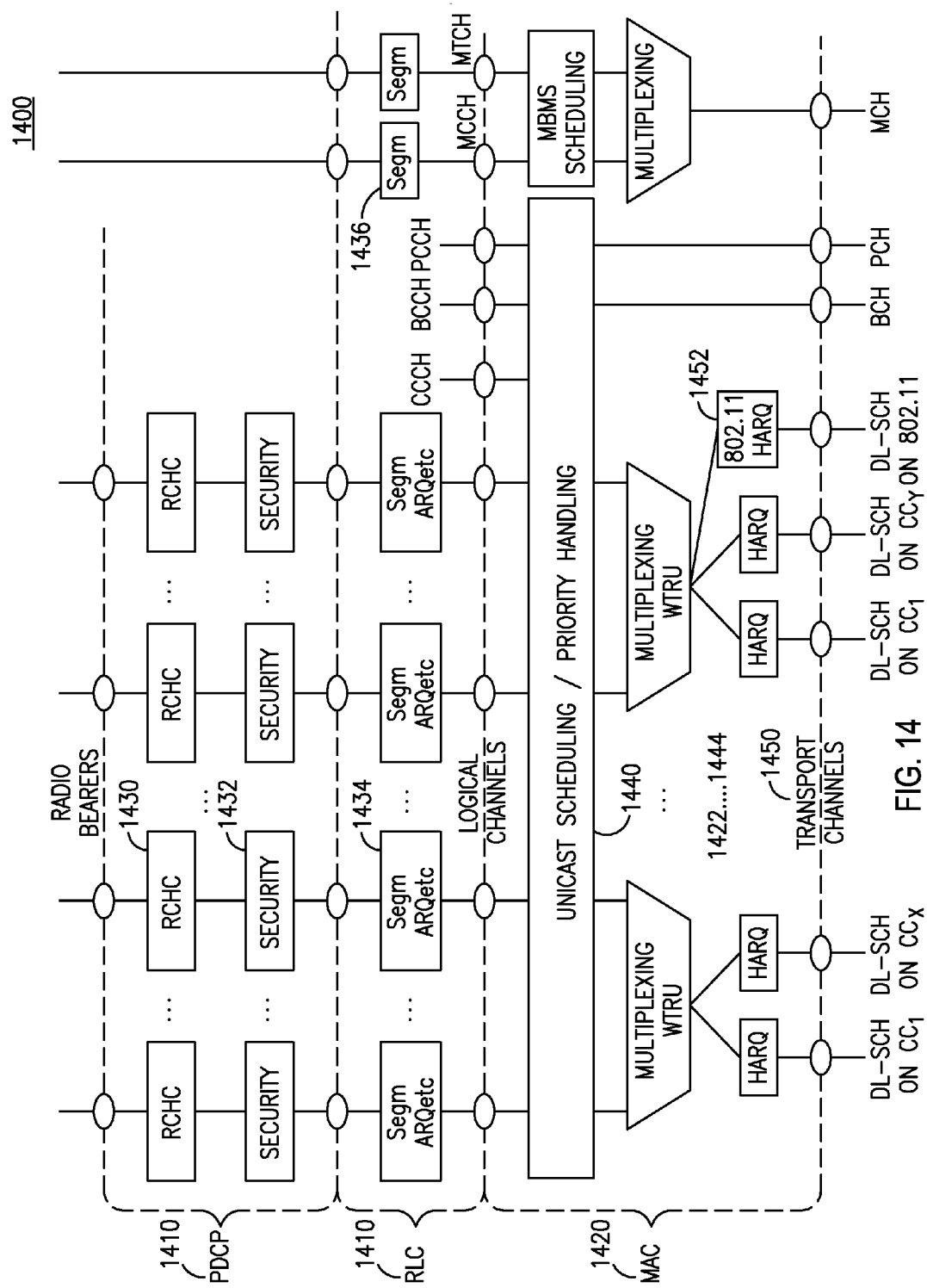
FIG. 14 shows an example DL protocol stack view for below the MAC aggregation across LTE and IEEE 802.11 RATs.
Figure 15:
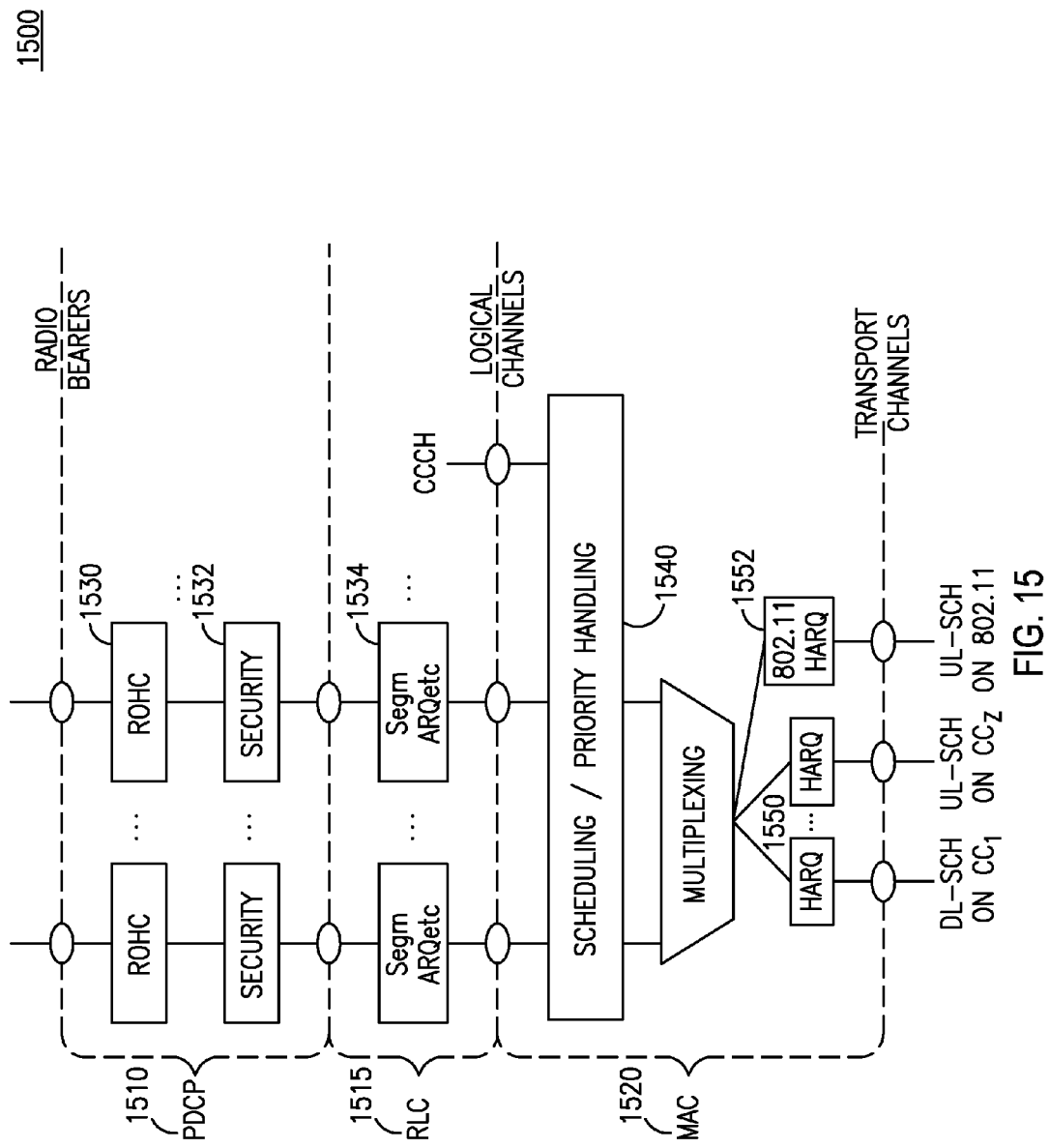
FIG. 15 shows an example UL protocol stack view for below the MAC aggregation across LTE and IEEE 802.11 RATs.

FIG. 14 shows a DL protocol stack view 1400 for MAC aggregation across LTE and IEEE 802.11 RATs and FIG. 15 shows a UL protocol stack view 1500 for below MAC aggregation across LTE and IEEE 802.11 RATs. The DL protocol stack view 1400 includes a PDCP entity 1410, a RLC entity 1415 and a MAC entity 1420. The PDCP entity 1410 may include Robust header compression (ROHC) entities 1430 and security entities 1432. The RLC entity 1415 may include at least segmentation/ARQ entities 1434 and segmentation entities 1436. The MAC entity 1420 may include an unicast scheduling/priority handling entity 1440 connected to multiplexing entities 1442 . . . 1444, which in turn are connected to HARQ entities 1450 and an 802.11 transport or HARQ entity 1452.

The UL protocol stack view 1500 includes a PDCP entity 1510, a RLC entity 1515 and a MAC entity 1520. The PDCP entity 1510 may include Robust header compression (ROHC) entities 1530 and security entities 1532. The RLC entity 1515 may include at least segmentation/ARQ entities 1534. The MAC entity 1520 may include a scheduling/priority handling entity 1540 connected to a multiplexing entity 1542, which in turn is connected to HARQ entities 1550 and an 802.11 HARQ entity 1552.

For MAC aggregation, MAC may be configured to use a semi-static grant size based on the IEEE 802.11 RAT average data capabilities, or IEEE 802.11 may provide MAC with a data size each TTI that it is capable of transmitting. This data size may be derived based on the IEEE 802.11 protocol. If the 802.11 modem is capable of operating in more than one channel/band simultaneously, (for example, when 802.11n and 802.11ad are operating simultaneously in 802.11 tri-mode device), then a separate 802.11 Transport Entity may be defined for each 802.11xx that is active, (both in uplink and downlink).

Described herein is the glue layer or WLAN abstraction layer. The glue layer or entity provides an abstraction between the LTE AS and the IEEE 802.11 RAT. The logical entities of the glue layer include a user plane and a control plane/LTE service management entity (SME). The user plane may be responsible for data buffering, flow control, quality of service mapping, scheduling feedback, (MCS, TXOP per access class (AC), grant size, packet size, and the like), discard handling and execution of an LCP algorithm in the case of split LCP. The control plane/LTE access stratum-service management entity (AS-SME) may be responsible for configuration/reconfiguration of an IEEE 802.11 carrier, activation/deactivation, DRX configuration and radio resource management (RRM) measurement configuration.

Figure 16:
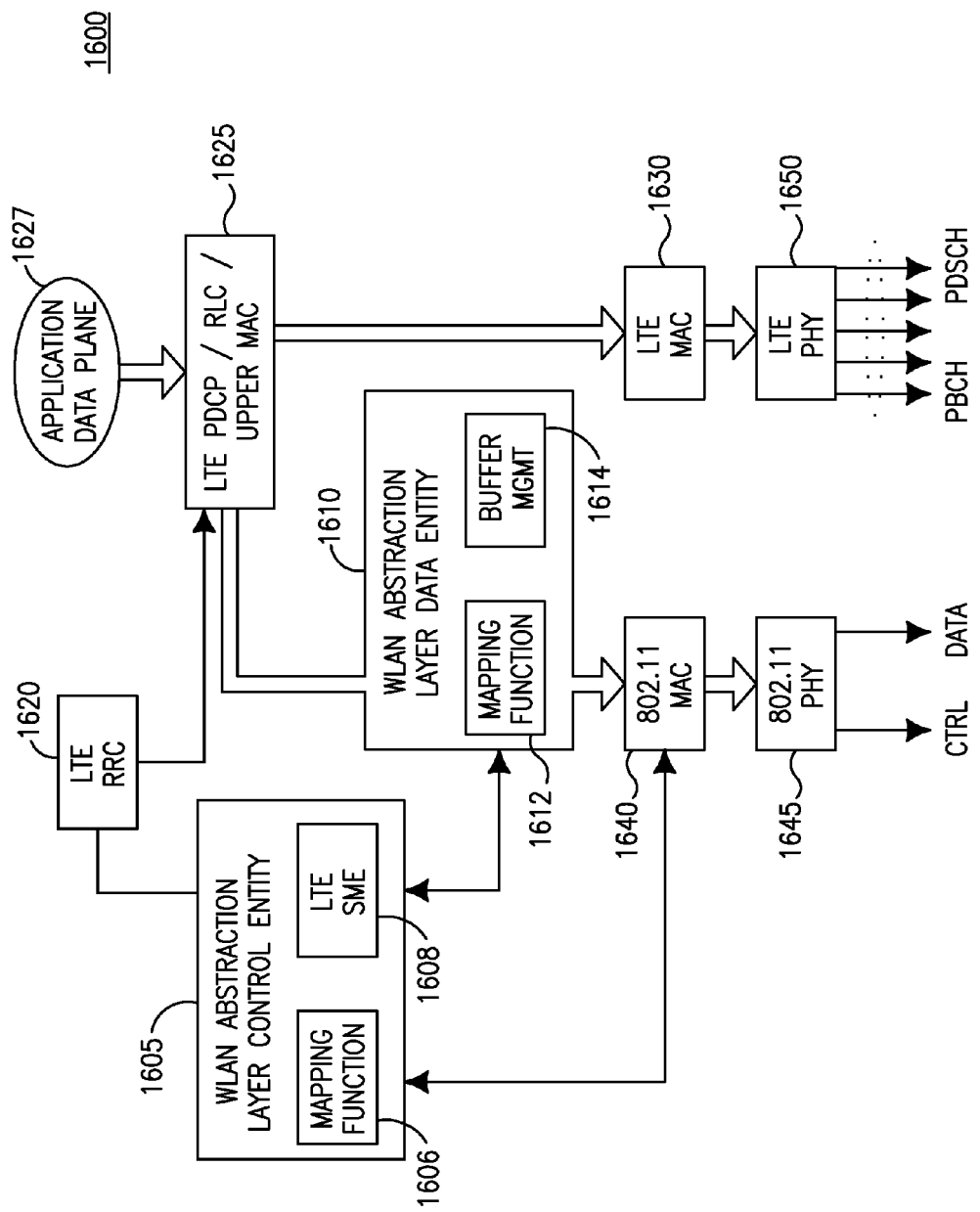
FIG. 16 shows an example wireless local area network (WLAN) Abstraction Layer relation to other wireless transmit/receive unit (WTRU) protocol layers.

FIG. 16 shows an example architecture 1600 for MAC layer aggregation across LTE and IEEE 802.11 RATs by using a glue layer control entity 1605, (in the control plane) and a glue layer data entity 1610, (in the user plane). The glue layer control entity 1605 may include a mapping function 1606 and a LTE SME entity 1608. The glue layer data entity 1610 may include a mapping function 1612 and a buffer management entity 1614. The LTE SME entity 1608 is connected to the mapping function 1612.

Architecture 1600 may further include a LTE RRC 1620 connected to glue layer control entity 1605 and to LTE PDCP/RLC/Upper MAC entity 1625, which in turn receives data from the application data plane 1627. The LTE PDCP/RLC/Upper MAC entity 1625 is also connected to the glue layer data entity 1610 and a LTE MAC entity 1630. The glue layer data entity 1610 is further connected to a 802.11 MAC entity 1640, which in turn is connected to the mapping function 1606 and to a 802.11 PHY entity 1645. The LTE MAC 1630 is connected to a LTE PHY 1650.

In the glue layer control entity 1605, the LTE RRC entity 1620 may be extended to allow aggregation of the two RATs, (IEEE 802.11 and LTE). The LTE SME 1608 provides an abstraction to provide a mapping from the LTE configuration to the IEEE 802.11 layer.

When carrier aggregation is used for tighter integration of LTE and 802.11 RAT, 802.11 RAT is assumed to be configured as a secondary carrier. LTE may be configured as the primary carrier and may perform all LTE functionalities.

Figure 17:
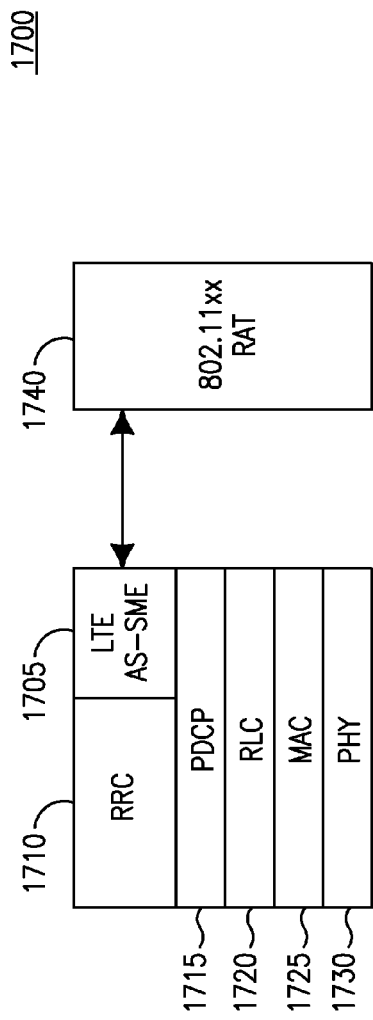
FIG. 17 shows an example LTE access stratum-service management entity (AS-SME)

FIG. 17 shows an example LTE stack 1700 which may include a LTE AS-SME 1705. The LTE stack 1700 may include a RRC entity 1710, a PDCP entity 1715, a RLC entity 1720, a MAC entity 1725 and a PHY entity 1730. For LTE plus IEEE 802.11 carrier aggregation, the LTE AS may act as the SME that interfaces to the IEEE 802.11 MAC layer management entity (MLME). This entity or module 1705 may interact closely with the existing LTE RRC entity 1710. The LTE AS-SME 1705 may also be viewed as part of an RRC layer or the glue layer.

RRC messages received from the network related to a IEEE 802.11 RAT 1740 may be forwarded to the LTE AS-SME 1715 for configuring and maintaining the IEEE 802.11 RAT 1740, (measurement control, and the like), as required. The LTE AS-SME 1705 may also receive updates from the IEEE 802.11 RAT 1740 and translate them to RRC messages as required to be transmitted to the network.

Different methods for configuration of the IEEE 802.11 RAT 1740 may be used depending on the availability of WTRU location information at the network. In an example, location of the WTRU is known to the network with a high degree of precision via methods such as assisted satellite positioning, Cell ID based positioning, observed time difference of arrival, or others. Then, based on its prior knowledge of AP locations and current AP traffic conditions, the network can make a determination of the optimum AP for the WTRU to associate with. All 802.11 RAT pre-data transfer steps including authentication, authorization and key management, traffic stream (TS) setup and association are performed between the 802.11 RAT in the WTRU and the chosen AP through the LTE network. The WTRU may directly start frame exchanges with the AP via contention based or contention free mechanisms. In case of quality of service (QoS) enabled AP and WTRU, multiple frames may be transmitted in an efficient manner via polled or contention-based transmission opportunity (TXOP).

In another example, when WTRU location is unknown or known with insufficient precision, the 802.11 RAT in the WTRU is provided a list of channels to scan and obtain a list of reachable APs that are available on them by the eNB via cellular link. This instruction appears as a Beacon Request to the 802.11 RAT, which then responds with the received channel power indicator (RCPI), received channel to noise indicator (RSNI), receiver antenna ID and timing synchronization function (TSF) offset of each observed BSS. The reported information may result from passive scanning of beacon or measurement pilot frames or from probe responses received in response to a probe request to neighboring APs. The LTE AS-SME then interprets and translates this information to a RRC report which is sent to the network. Based on the reported information and other information such as AP traffic loads that is already known, the network may choose one of the APs and recommend it to the WTRU to associate with. Similar to the first example, all pre-data transfer steps including authentication, authorization and key management, TS setup and association are performed between the 802.11 RAT in the WTRU and the chosen AP through the LTE network. The WTRU may directly start frame exchanges with the AP at the next transmission opportunity (TXOP). Measurement configuration and reports are described herein below.

A variation of the second example involves the eNB supplying the 802.11 RAT in the WTRU with the SSID of a preferred ESS. Then the WTRU transmits a Probe Request frame including the specified SSID. In response, only those APs that receive the Probe Request and share the particular SSID would respond with Probe Response frames that would enable the WTRU to perform signal strength measurements as described above. This reduces the amount of time the WTRU has to wait to receive all Probe Responses from neighboring APs, since APs that are not part of the ESS would not respond to the Probe Request frame. A further optimization of this process is possible due to cellular layer controls as follows. Upon receiving the Probe Request from the WTRU, APs that are a part of the corresponding ESS report to the eNB their traffic load and other parameters such as signal strength of the received Probe Request. Based on this information the eNB directs all or some of the APs to respond with Probe Response frames and also schedules their transmission. The WTRU is also notified about the number of Probe Response frames to expect. This will reduce the scan time as the APs do not have to contend for channel access to transmit the Probe Responses and the WTRU need not wait till the end of the probe response timeout period to receive all responses.

In another example, an IEEE 802.11 AP related configuration may be provided by the network to a WTRU as part of an RRC message. This message may be forwarded to the LTE AS-SME, which uses the provided configuration information to configure an IEEE 802.11 RAT. This message may consist of one or more IEEE 802.11 service set identifiers (SSIDs), channel(s) used by AP(s) under consideration, and other similar details required by IEEE 802.11 RAT to associate with an IEEE 802.11 AP. The IEEE 802.11 RAT in a WTRU may be instructed to perform scanning and obtain details of APs that are available. The IEEE 802.11 RAT may provide this information to the LTE AS-SME, which may interpret and translate this information to an RRC report. This message may then be sent to the network. Based on RRM and other admission criteria, the network may then choose one of the APs and recommend it to the WTRU to associate with. After reception of this RRC message via the LTE AS-SME, the IEEE 802.11 RAT may start an association with this particular AP.

A mapping function may be provided by the LTE SME entity to translate LTE RRC messaging to IEEE 802.11 control and management functions.

Described herein are measurement methods for the 802.11 carrier. The 802.11 carrier is presented to the LTE AS a secondary cell (SCell). As such, measurements of the 802.11 signal strength and quality must be performed to provide the necessary SCell measurements for cell detection and configuration/deletion.

The WTRU reports measurement information in accordance with the measurement configuration as provided by the network. The network may provide the measurement configuration applicable for the WTRU in RRC_CONNECTED by means of dedicated signaling, i.e., using the RRCConnectionReconfiguration message.

For an IEEE 802.11 channel, the WTRU may be requested to perform intra-frequency measurements of different BSSs that reside on the configured channel, and inter-frequency measurements of identified BSSs on different channels/bands.

For all of the measurements on the IEEE 802.11 channel, measurement gaps may be provided to allow the WTRU associated with a BSS to obtain measurements on other BSSs and/or channels. Additionally, if measurement pilots are used by neighbor BSSs, the measurement configuration may include a pattern and the periodicity of measurement pilots, pilot configuration, and the like. Measurement pilots may be designed to support rapid discovery of BSS and neighbor AP signal strengths. They may be transmitted at a configurable interval that is a fraction of the beacon period.

Measurement objects and gaps, (configuration elements), may be enhanced to include an 802.11 channel measurement. Measurement objects include objects on which the WTRU would perform measurements. For intra-frequency and inter-frequency measurement, this would map to an 802.11 channel in a certain band. For example, in the industrial, scientific and medical (ISM) 2.4 GHz band, any of the 20 MHz channels, such as channel 1, 6, 11, may be configured as a measurement object. Measurement gaps are periods that the WTRU may use to perform measurements. These gaps are configured with the knowledge that the IEEE 802.11 AP may not perform transmissions at these times for the WTRU (i.e., DRX operation in IEEE 802.11).

A new RAT-specific IEEE 802.11 measurement object (MeasObject80211) as shown in Table 1 may be added to provide the following additional configuration to allow IEEE 802.11 measurements as a neighbor and/or secondary cell. IEEE 802.11 measurement objects (MeasObject80211) may additionally include configuration to measurement neighbor cells (BSSs), including BSS list in the channel, frequency of measurement pilot and offset relative to beacon of serving AP, beacon periodicity and offset relative to beacon of serving AP, and other configuration details for measuring neighbor BSSs.

TABLE 1

```
-- ASN1START
MeasObject80211 ::=       SEQUENCE {
    carrierFreq               ARFCN-Value80211,
    allowedMeasBandwidth      AllowedMeasBandwidth,
    neighCellConfig           NeighCellConfig,
    offsetFreq                Q-OffsetRange           DEFAULT dB0,
    -- Cell list
    cellsToRemoveList         CellIndexList           OPTIONAL,   -- Need ON
    cellsToAddModList         CellsToAddModList       OPTIONAL,   -- Need ON
    -- Black list
    blackCellsToRemoveList    CellIndexList           OPTIONAL,   -- Need ON
    blackCellsToAddModList    BlackCellsToAddModList  OPTIONAL,   -- Need ON
}
CellsToAddModList ::=     SEQUENCE (SIZE (1..maxCellMeas)) OF CellsToAddMod
CellsToAddMod ::=   SEQUENCE {
    cellIndex                 INTEGER (1..maxCellMeas),
    BSS                       BSS-CONFIG
    cellIndividualOffset      Q-OffsetRange
}
```

TABLE 1-continued

```
BlackCellsToAddModList ::=    SEQUENCE (SIZE (1..maxCellMeas)) OF BlackCellsToAddMod
BlackCellsToAddMod ::=  SEQUENCE {
    cellIndex                 INTEGER (1..maxCellMeas),
    BSS                       BSS-CONFIG
}
MeasCycleSCell-r10 ::=    ENUMERATED {0,5,10,20,30,xxxx} [ Measurement period when
the 802.11 carrier is configured as a secondary cell. Time in ms]
}
```

Figure 18:
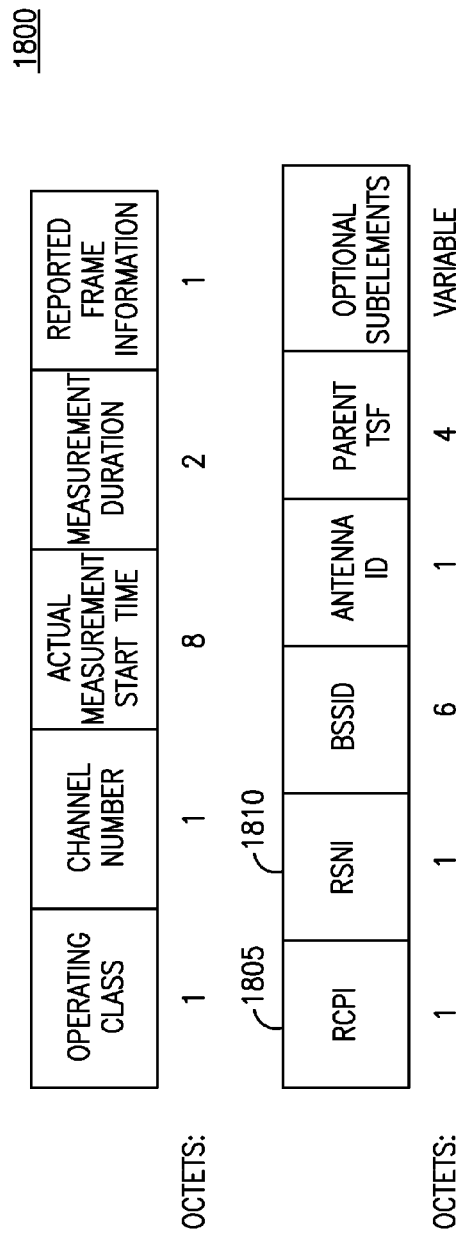
FIG. 18 shows an example Measurement Report Field format for Beacon Report.

In order to facilitate neighbor cell measurements, the AP may send the WTRU a Beacon Request action frame including but not limited to the following parameters: channel identifier, Beacon Interval, TSF Offset, measurement duration. At the end of the measurement duration the WTRU responds with a Beacon Report action frame with BSSIDs of all observed BSSs on the channel, (if wildcard BSSID was used by serving AP in Beacon Request), and corresponding measurements including, but not limited to, the Received channel Power Indicator (RCPI), the Received Signal to Noise Indicator (RSNI), and receiver antenna ID. FIG. 18 shows the Measurement Report Field format 1800 for a Beacon Report which contains a RCPI 1805 and RSNI 1810.

The neighbor BSS Beacon periodicity and offset reported by the AP may enable the WTRU to calculate the Target Beacon Transmission Time (TBTT) of the neighbor AP. This enables the WTRU to make a determination of when to switch channels if the measurement corresponds to a non-operating channel. The AP will not transmit to the WTRU during this interval. In order to avoid the situation of all associated WTRUs simultaneously listening to Beacon transmission on a non-operating channel, which would preclude any data transmission on the BSS over that duration, the AP may schedule the measurement cycles of the WTRUs in such a way that they do not all coincide in time.

The use of Measurement Pilot frames, which are action frames including most of the information present in the Beacon frame and transmitted more frequently than Beacon frames, allows for rapid discovery of neighbor BSSs and also may enable neighbor BSS measurements with higher periodicity. The serving AP may signal the periodicity and offset of neighbor AP Measurement Pilot frames, when they are used, instead of Beacon frames, thereby enabling smaller measurement latency.

In case of event-based triggering, the 802.11 carrier may be configured to report measurements when the measurement goes over A3, (neighbor measurement is better than primary cell by an offset), A6, (neighbor measurement is better than secondary cell by an offset threshold), or new events might need to be defined to allow 802.11 RAT to additionally indicate channel utilization threshold, and the like.

The threshold quantities may be defined in information element (IE) IEThreshold80211. The threshold configuration parameters may include the following values, including but not limited to the RSSI, channel utilization, number of observed BSSs, and so on.

Figure 19B:
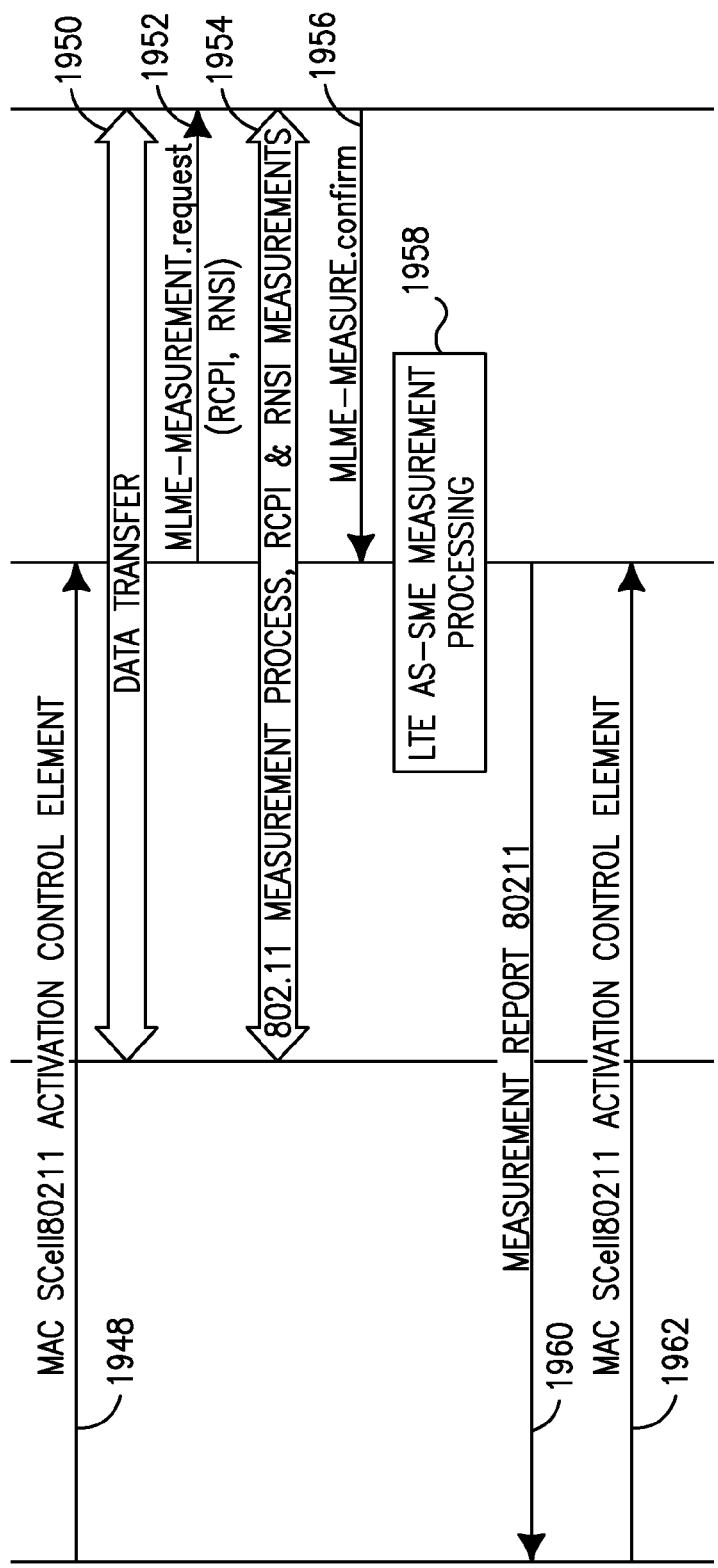

FIGS. 19A and 19B show an example method 1900 for configuring 802.11 measurements via a LTE AS, and for performing and reporting those measurements back to the eNB. As shown, the method 1900 operates or interacts between an eNB 1905, 802.11 BSS 1910, and a WTRU 1915 that may include a LTE AS-SME 1917 and an 802.11 MLME 1919. A new measurement object type for 802.11 measurements may be introduced that contains the SSID and/or BSSID and channel list for the 802.11 systems compatible with LTE, as would be configured by the service providers. In addition, the reportConfig80211 configuration element may be introduced to configure event triggered and/or periodic measurement.

The eNB 1905 may send a measurement configuration message to the LTE AS-SME 1917 (1920). A message confirmation message may be sent by the LTE AS-SME 1917 to the eNB 1905 to confirm receipt of the measurement confirmation message for the 802.11 SCell (1922). The LTE AS-SME 1917 may then create and send an MLME-SCAN.request (1924) to initiate searching for infrastructure BSS's that belong the service providers system (1926). Once the 802.11 MAC/PHY in the WTRU detects a valid 802.11 SCell, it may send the results to the LTE AS-SME 1917 (1928). The LTE AS-SME 1917 may then initiate measurements by sending a MLME-MEASURE request to the 802.11 MLME 1919 (1930). The measurements are taken (1932) and a confirmation message may be sent to the LTE AS-SME (1934). The LTE AS-SME 1917 may then process the measurement results (1936) and send a measurement report to the eNB 1905, (for example, the RRC), (1938). The measurement report may be sent every measurement period or based on event reporting, (depending on configuration).

Based on these measurements, the eNB 1905 may configure an appropriate secondary cell (SCell) (1940) and send a RRCConnectionReconfiguration message to the LTE AS-SME 1917 initiate 802.11 association (1942). The LTE AS-SME 1917 may send a MLNE.Associate message to the 802.11 MLME 1919 (1944), which in turn may start the association and authentication process between the LTE AS-SME 1917 and the 802.11 MLME 1919 (1946). The eNB 1905 may send a MAC SCell Activation Control Element message to the LTE AS-SME 1917 to activate the SCell (1948). Data transfer between the 802.11 BSS 1910 and the 802.11 MLME may then take place (1950).

The measurement procedures may continue and may be used to trigger SCell addition/deletion, (activation/deactivation). For example, the LTE AS-SME 1917 may initiate measurements by sending a MLME-MEASURE request to the 802.11 MLME 1919 (1952). The measurements are taken (1954) and a confirmation message may be sent to the LTE AS-SME (1956). The LTE AS-SME 1917 may then process the measurement results (1958) and send a measurement report to the eNB 1905, (for example, the RRC), (1960). Based on the measurement report, the eNB 1905 may send a MAC SCell Deactivation Control Element message (1962).

Figure 20:
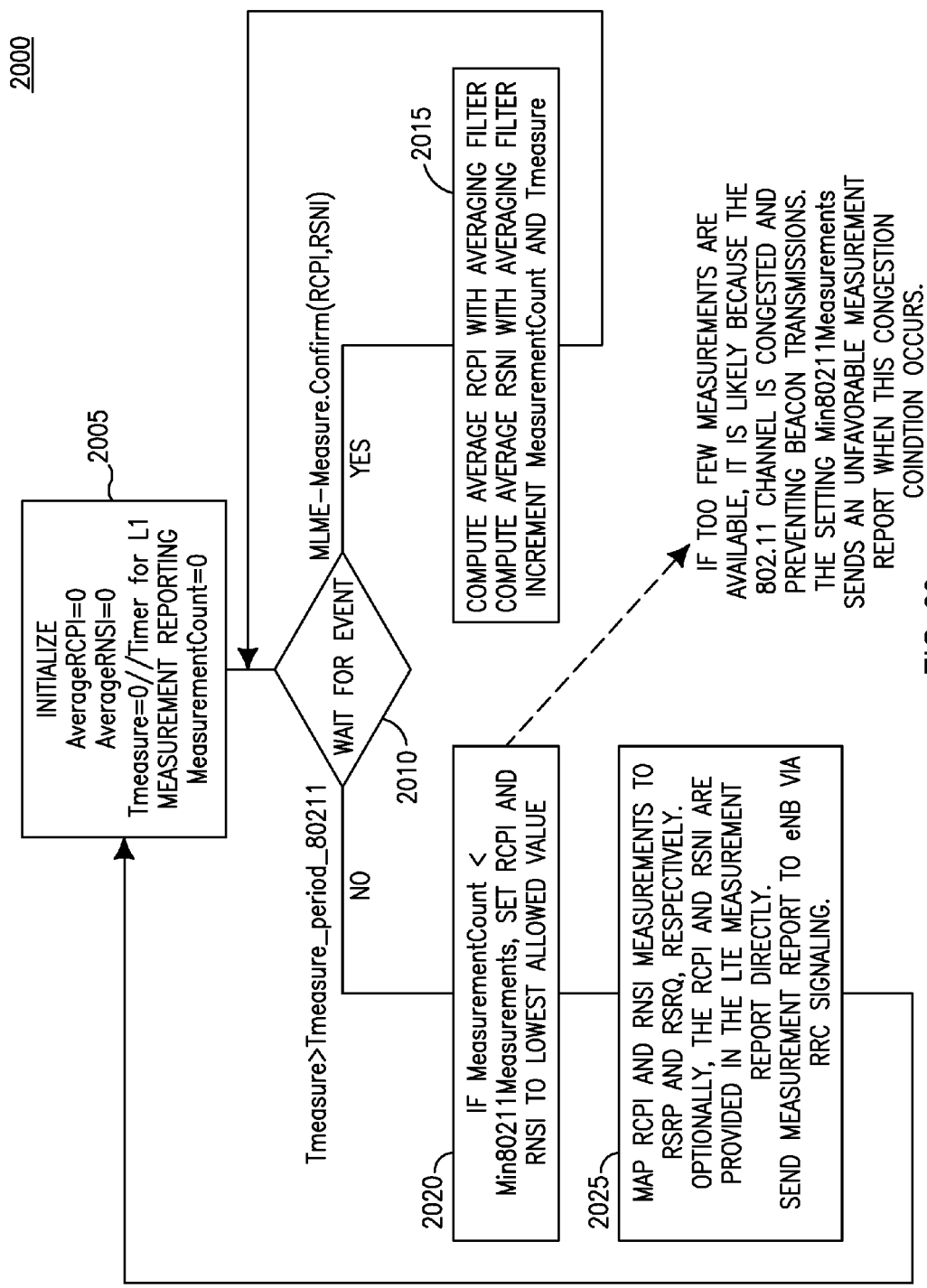
FIG. 20 shows an example procedure of the LTE AS-SME measurement processing.

FIG. 20 shows an example method for LTE AS-SME measurement processing 2000. In general, the LTE AS-SME measurement processing ensures that LTE RRC measurement entity receives measurement reports at the Layer 1 reporting interval. Typically this may be a 200 msec interval, (Tmeasurement_period_80211=200 msec). As 802.11 beacons are detected by the 802.11 MAC/PHY, the Beacon Reports are sent to the LTE AS-SME and processed. The procedure provides averaging for the RCPI and RSNI. Once the measurement period has expired, RCPI and RSNI are mapped to the RSRP and RSRQ measurements, respectively. As an alternative, the RRC signaling may be updated for an 802.11 measurement report and contain the RCPI and RSNI results directly. As another feature of the LTE AS-SME measurement processing, the number of Beacon Reports in the averaging interval may be counted. If too few Beacon Reports (MeasurementCount<Min80211Measurements) are received, it may be assumed that the channel may be too congested. In this case the minimum RCPI and RSNI are assumed such that the channel may be deemed unfavorable.

The parameters are initialized to zero (2005). This may include setting the AverageRCPI, AverageRSNI, Tmeasure and MeasurementCount to zero. The parameter Tmeasure is a timer of for layer one measurement reporting and the parameter MeasurementCount tallies the number of reports received in the averaging interval. If the timer is still running (2010, yes), measurements are taken and sent to the LTE AS-SME. The LTE AS-SME may then compute the AverageRCPI, and AverageRSNI (2015). The parameters MeasurementCount and Tmeasure are also incremented. If the timer has expired (2010, no), it is determined if the number of measurements made, (as counted by MeasurementCount), is less than the minimum threshold (2020). The RCPI and RSNI are set to zero if MeasurementCount is lower than the threshold. The RCPI and RSNI are then mapped to the RSRP and RSRQ measurements, respectively (2025). The measurement report may be sent to the eNB via RRC signaling.

Figure 21B:
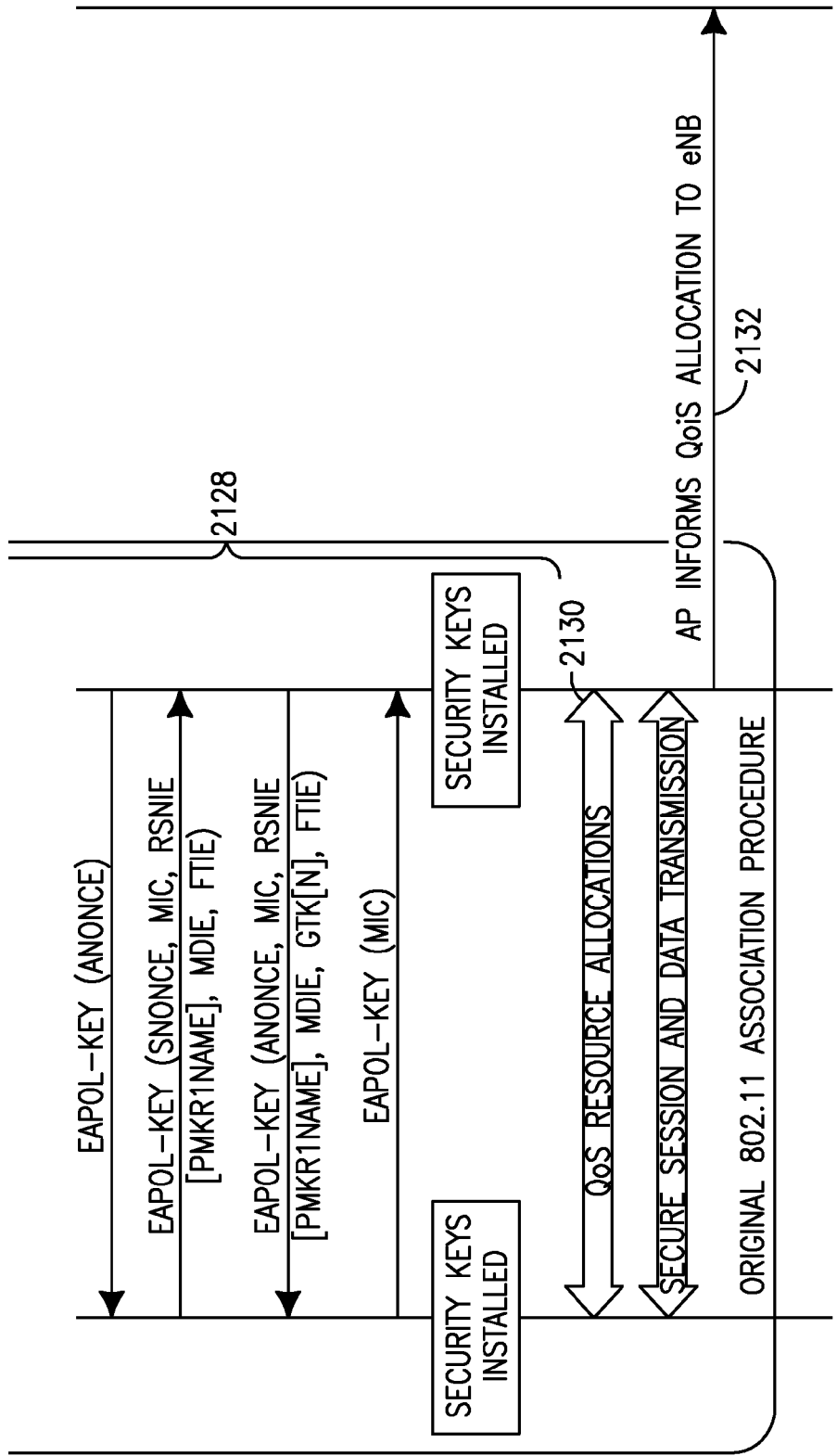

Described herein is 802.11 carrier management and in particular, adding and removing 802.11 carriers. FIGS. 21A and 21B show an example flowchart 2100 for addition and removal of the 802.11 carriers without cellular assistance. In particular, FIGS. 21A and 21B show cellular integration with 802.11 initial mobility domain association. The decision to add an 802.11 carrier may be made by the eNB, based on considerations such as network load or to switch traffic corresponding to a certain quality of service (QoS) Class Identifier (QCI). The choice of which AP to associate with for a WTRU, when multiple APs are within its communication range, may be also made by the eNB.

Initially, a WTRU 2103 may be attached to the network (2109). At system start-up an AP 2105 may be configured by its serving eNB 2107 with operational parameters, (such as SSID, Beacon Interval, authentication and security procedures, operational band in case of multi-mode AP, channel number, and the like), via X2' messaging (2110). The eNB 2107 may then inform the WTRU 2103 to be ready for 802.11 carrier addition (2112). This may trigger activation of proximity indication sensing by the WTRU 2103 or energizing its 802.11 transceiver (2114). The 802.11 radio may be generally in powered off state to conserve power.

The WTRU may send an "entering" proximity indication when it determines it may be near an AP, (based on autonomous search procedures). The proximity indication may include the BSSID and channel number used during previous session. The eNB may configure the WTRU with relevant measurement configuration including the channel number, (in case it has changed since the WTRU's last visit), and the target beacon transmission time (TBTT), so that the WTRU may minimize its channel scan time. These steps may not be performed in case the WTRU has not previously visited the BSS.

In case proximity indication may be not triggered or if the AP linked to the proximity indication may be non-useable, the eNB may configure the WTRU with a list of channels and the corresponding TBTTs for the WTRU to scan (2116).

The WTRU may scan the indicated channels for Beacon and Measurement Pilot frames. Measurement pilots may be designed to support rapid discovery of BSS and neighbor AP signal strengths. They may be transmitted at a configurable interval that may be a fraction of the beacon period. The WTRU 2103 may send a Measurement Report that may include a list of BSSIDs of observed APs and their corresponding signal quality in terms of received channel power indicator (RCPI), received signal to noise indicator (RSNI) or some other pre-configured measure (2118). The eNB 2105 may then respond with the chosen AP from the list sent by the WTRU 2103 (2120). This choice may be based on parameters such as link quality at the WTRU and traffic load at the APs. The authentication and security procedures used by the AP may also be included in the message to the WTRU.

The WTRU 2103 and AP 2105 may undergo beamforming training if operating as part of a directional multi-gigabit (DMG) BSS, (operational frequency greater than 45 GHz) (2122). The WTRU 2103 may then perform authentication (2124), association (2126), security key exchange (2128), and QoS resource allocation (2130) with the indicated/target AP 2105. The indicated/target AP 2105 may inform the eNB 2105 of successful WTRU association and QoS allocation (2132). Data transmission proceeds between the WTRU 2103 and the AP 2105 for the chosen QoS classes.

The 802.11 carrier may be deleted by the WTRU when instructed to do so by the eNB by transmitting a disassociate frame to the AP, or when it moves outside the communication range of the AP, (indicated by missed beacon frames). In either case, carrier deletion may be reported to the eNB.

Figure 22:
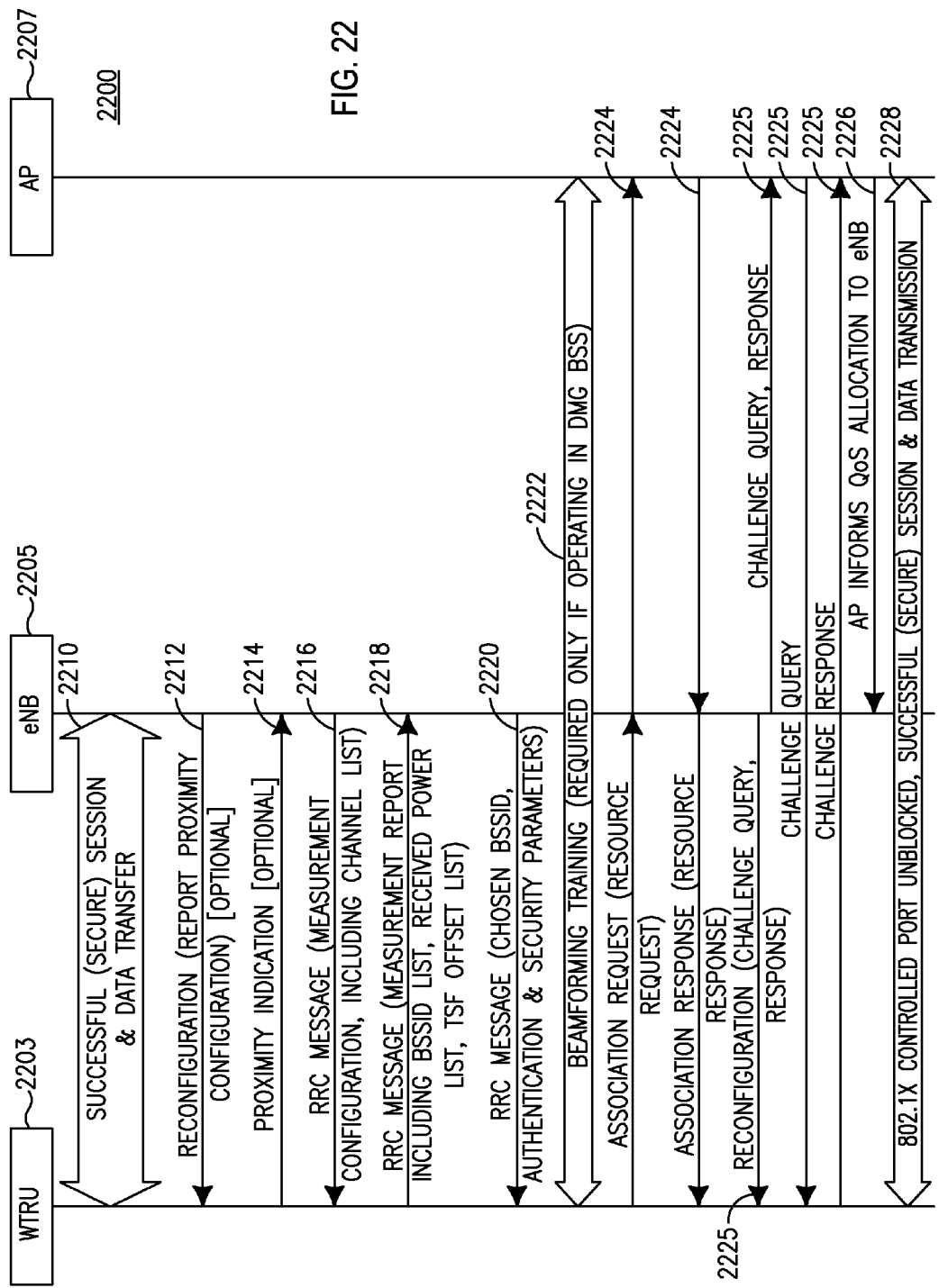
FIG. 22 shows an example cellular-assisted initial mobility domain association.

FIG. 22 shows an example flowchart 2200 for addition and removal of the 802.11 carriers without cellular assistance. In particular, FIG. 22 shows cellular-assisted initial mobility domain association. The procedure to add 802.11 carriers may be considerably simplified due to the prior establishment of secure links from an eNB 2205 to a WTRU 2203 (2210) and from the eNB 2205 to an AP 2207. The WTRU 2203 may use proximity indication processing as described herein above (2212 and 2214). The eNB 2205 may configure the WTRU 2203 with relevant measurement configuration including a list of channels as described herein above (2216).

The WTRU 2203 may scan the indicated channels for Beacon and Measurement Pilot frames. Measurement pilots may be designed to support rapid discovery of BSS and neighbor AP signal strengths. They may be transmitted at a configurable interval that may be a fraction of the beacon period. The WTRU 2203 may send a Measurement Report that may include a list of BSSIDs of observed APs and their corresponding signal quality in terms of received channel power indicator (RCPI), received signal to noise indicator (RSNI) or some other pre-configured measure (2218). The eNB 2205 may then respond with the chosen AP from the list sent by the WTRU 2203 (2220).

The secure link from the WTRU 2203 to the AP 2207 through the eNB 2205, (that follows cellular authentication procedures), allows the WTRU-to-AP authentication procedure to be truncated or even eliminated. Also, Packet Data Convergence Protocol (PDCP) layer security provided by the cellular network obviates the need for 802.11 key exchange and security procedures as shown in FIG. 21.

Post target AP identification by the eNB, possible beamforming training in DMG BSS (2222), association processing (2224) and QoS resource request processing may be accomplished by messages between the WTRU 2203 and the AP 2207 transmitted through the eNB 2205. The WTRU 2203 and the AP 2207 mutually authenticate each other by means of challenge query and response messages that have been previously delivered to each node by the eNB 2205 (2225). This reduces the authentication procedure to a two-message exchange. The target AP 2207 may inform the eNB 2205 of successful WTRU association and QoS allocation (2226). Data transmission may proceed between the WTRU 2203 and the AP 2207 for the chosen QoS classes (2228).

Figure 23:
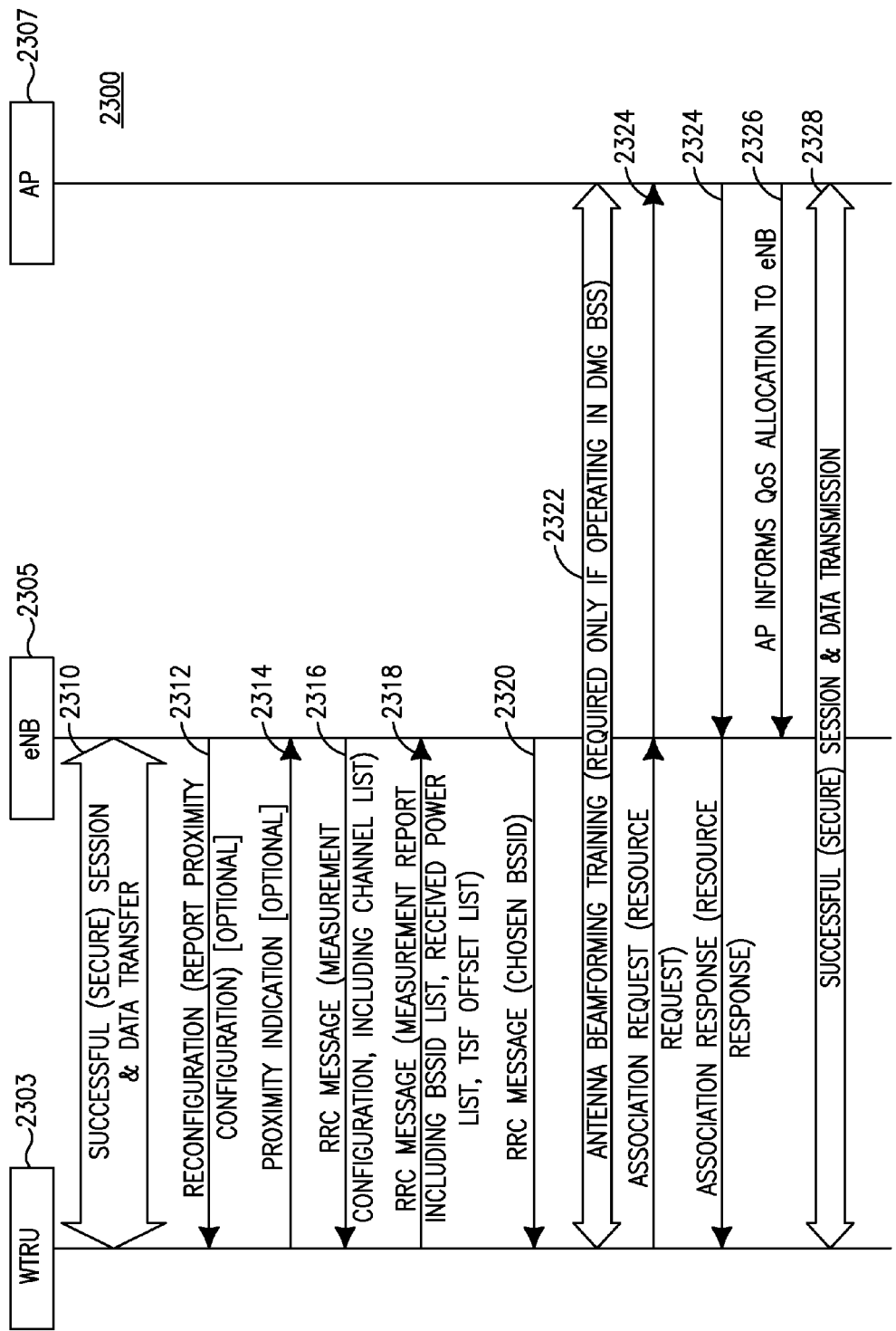
FIG. 23 shows an example cellular-assisted initial mobility domain association without WLAN authentication.

FIG. 23 shows an example flowchart 2300 for cellular-assisted initial mobility domain association without WLAN authentication. Secure links from an eNB 2305 to a WTRU 2303 (2310) and from the eNB 2305 to an AP 2307 are in existence. The WTRU 2303 may use proximity indication processing as described herein above (2312 and 2314). The eNB 2305 may configure the WTRU 2303 with relevant measurement configuration including a list of channels as described herein above (2316).

The WTRU 2303 may scan the indicated channels for Beacon and Measurement Pilot frames. Measurement pilots may be designed to support rapid discovery of BSS and neighbor AP signal strengths. They may be transmitted at a configurable interval that may be a fraction of the beacon period. The WTRU 2303 may send a Measurement Report that may include a list of BSSIDs of observed APs and their corresponding signal quality in terms of received channel power indicator (RCPI), received signal to noise indicator (RSNI) or some other pre-configured measure (2318). The eNB 2305 may then respond with the chosen AP from the list sent by the WTRU 2303 (2320). As described herein above, the secure link from the WTRU 2303 to the AP 2307 through the eNB 2305 allows the WTRU-to-AP authentication procedure to be truncated or even eliminated.

Post target AP identification by the eNB 2305, possible beamforming training in DMG BSS (2322), association processing (2324) and QoS resource request processing may be accomplished by messages between the WTRU 2303 and the AP 2307 transmitted through the eNB 2305. The mutual authentication procedure may be eliminated due to pre-authentication of the WTRU 2303 and the AP 2307 to the eNB 2305 and PDCP-level encryption already in use at the cellular layer. The target AP 2307 may inform the eNB 2305 of successful WTRU association and QoS allocation (2326). Data transmission may proceed between the WTRU 2203 and the AP 2307 for the chosen QoS classes (2328).

Described herein are the messaging details. The function of the WLAN Abstraction layer may be to map the above configuration into 802.11 configurations. Configuration parameters for adding an AP via RRC configuration messages are shown as an example. In particular, a RRC Reconfiguration message with information element (IE) Scell-80211-AddMod element would map to request to associate with a certain 802.11 channel, BSS, and with provided MAC configuration parameters. Scell-80211 Remove would map to request to disassociate with an 802.11 channel.

In an example, a new element may be added to the SCellToAddMod-r10 IE to include an 802.11 carrier as shown in Table 2.

TABLE 2

```
SCellToAddMod-r10 ::=        SEQUENCE {
    sCellIndex-r10               SCellIndex-r10,
    cellIdentification-r10       SEQUENCE {
        physCellId-r10               PhysCellId,
        dl-CarrierFreq-r10           ARFCN-ValueEUTRA
    }
    802.11Carrier        SEQUENCE {
        channelMHz       ARFCN-Value80211
}
ARFCN-Value80211 information element
-- ASN1START
ARFCN-Value80211 ::=         INTEGER (0..maxEARFCN80211)
-- ASN1STOP
```

Common radio resource configuration for 802.11 may require extension of RadioResourceConfiguration IEs as shown in the example in Table 3.

TABLE 3

```
RadioResourceConfigCommonSCell-r10 ::=    SEQUENCE {
    -- DL configuration as well as configuration applicable for DL and UL
            nonUL-Configuration-r10              SEQUENCE {
                -- 1: Cell characteristics
                dl-Bandwidth-r10                     ENUMERATED {n6, n15,
    n25, n50, n75, n100},
                -- 2: Physical configuration, general
                antennaInfoCommon-r10                AntennaInfoCommon,
                mbsfn-SubframeConfigList-r10         MBSFN-SubframeConfigList
        OPTIONAL,    -- Need OR
                -- 3: Physical configuration, control
                phich-Config-r10                     PHICH-Config,
                -- 4: Physical configuration, physical channels
                pdsch-ConfigCommon-r10               PDSCH-ConfigCommon,
                tdd-Config-r10                       TDD-Config
                    OPTIONAL   -- Cond TDD
                80211-Config-XX                              80211-Config
                    OPTIONAL
    },
    -- UL configuration
    ul-Configuration-r10                         SEQUENCE {
        ul-FreqInfo-r10                              SEQUENCE {
            ul-CarrierFreq-r10                           ARFCN-ValueEUTRA
            OPTIONAL,   -- Need OP
            ul-Bandwidth-r10                             ENUMERATED {n6, n15,
    n25, n50, n75, n100}      OPTIONAL,   -- Need OP
            additionalSpectrumEmission-r10               AdditionalSpectrumEmission
        },
        p-Max-r10                                    P-Max
            OPTIONAL,  -- Need OP
        uplinkPowerControlCommonSCell-r10    UplinkPowerControlCommonSCell-r10,
        -- A special version of IE UplinkPowerControlCommon may be introduced
        -- 3: Physical configuration, control
        soundingRS-UL-ConfigCommon-r10       SoundingRS-UL-ConfigCommon,
        ul-CyclicPrefixLength-r10            UL-CyclicPrefixLength,
```

TABLE 3-continued

```
   -- 4: Physical configuration, physical channels
       prach-ConfigSCell-r10            PRACH-ConfigSCell-r10
   OPTIONAL,  -- Cond TDD-OR
       pusch-ConfigCommon-r10           PUSCH-ConfigCommon
   }
                OPTIONAL,  -- Need OR
....
}
```

The 80211 Config-XXX element and associated Physical-ConfigChannelScell80211-Config IE may include 802.11 specific configuration parameters, including but not limited to, channel ID, BSS ID, channel bandwidth, security configuration, (pairwise cipher suite count and pairwise cipher suite list), and AP related parameters, (supported rates, Block acknowledgement configuration, and the like).

In addition, the 802.11 configuration elements may also include configuration 80211-MAC-Config element which allows configuration/reconfiguration of 802.11 MAC may include discontinuous reception (DRX) configuration and buffer status report (BSR) configuration.

Described herein is QoS mapping. In order to support multiple QoS requirements, different bearers may be set up within the Evolved Packet System (EPS), each being associated with a QoS. Each bearer may have an associated QoS Class Identifier (QCI). Each QCI may be characterized by priority, packet delay budget and acceptable packet loss rate. The QCI label for a bearer determines how it may be handled in the eNB. Nine such QCIs have been standardized along with their associated characteristics.

On the other hand, QoS requirements in 802.11 may be met via four access categories (ACs). These are labeled AC_VO, AC_VI, AC_BE and AC_BK. Several different mapping strategies may be possible from cellular QoS to 802.11 QoS, including AC identifiers (ACI)-to-AC mapping, Priority-to-AC mapping and Packet Delay Budget-to-AC mapping. Table 4 shows illustrative mappings from QCI to AC.

TABLE 4

| Priority | QoS Class Identifier (QCI) | Access Category (AC) | Wi-Fi Multimedia (WMM) designation |
|---|---|---|---|
| 1 | 5 | AC_VO | Voice |
| 2 | 1 | | |
| 3 | 3 | AC_VI | Video |
| 4 | 2 | | |
| 5 | 4 | AC_BE | Best Effort |
| 6 | 6 | | |
| 7 | 7 | AC_BK | Background |
| 8 | 8 | | |
| 9 | 9 | | |

QoS differentiation in 802.11 may involve different back-off windows and priorities for the ACs, both of which impact packet latency. But it lacks procedures resulting in different packer error rates for the ACs. This may be affected by assigning different retransmission attempt limits for each AC, according to its packet error rate requirement. These parameters may be pre-configured at the AP and the WTRU, and may be chosen so that the 802.11 packet error rates for the ACs correspond to those for LTE ACIs.

Described herein is DRX configuration. Typical EUTRA DRX-Config may support configuration of DRX for 802.11 carriers. The 802.11 carrier may be configured, (via WLAN Abstraction Layer), to ensure that either a contention period or a power save multi-poll (PSMP) frame may be starting in the channel when any such WTRU comes out of a DRX period for the 802.11 carrier. Note that WTRU may be still required to maintain sync with the 802.11 carrier. For the case that the AP may be co-located with the eNB, synchronization without frequent measurements may be maintained via the LTE carriers. When the WTRU comes out of DRX, it may also perform radio resource management (RRM) measurements as configured using LTE AS-SME.

The DRX and discontinuous transmission (DTX) parameters may be communicated by the LTE AS-SME to the 802.11 SME in the WTRU, which then schedules the appropriate listen interval with the AP via legacy power save mode. This may require the DRX Off duration to be an integer multiple of the beacon interval. Further, the QoS parameters may be communicated to the 802.11 QoS, which may be used it to create a traffic specification (TSPEC) with the AP by sending an add traffic stream (ADDTS) frame. This may allow the WTRU to create a scheduled PSMP stream with the AP. A PSMP frame may be sent by the AP according to the service period, (i.e., packetization period sought by the WTRU), and may be synchronized to the scheduled power save period being used. In effect this creates mini-schedules for the medium, 8 milliseconds at a time, which may include uplink and downlink transmission times for the WTRU. The transceiver may shut down for all other times.

The Scheduled-PSMP sequence may be appropriate for applications such as conversational voice and video which generate a fairly steady flow of frames. However, applications such as internet surfing and e-mail that produce bursty traffic and long periods of inactivity are better served by a two-level idle duration structure.

An example implicit method of transitioning between the two modes is described herein. At the time of initial TSPEC creation and flow admittance by the AP, a schedule of Service Periods (SPs) and Service Intervals (SIs) may be established for the traffic stream (TS). During these SPs, the AP may schedule PSMP sequences to communicate with all WTRUs that have overlapping SPs. The SPs are scheduled with appropriate intervening SI to satisfy the QoS requirements of the particular TS. The WTRU and AP may transition to a pre-configured long SI if a pre-configured number of consecutive Uplink Transmission Times (UTTs) and Downlink Transmission Times (DTTs) pass without any uplink or downlink frames for the WTRU.

Figure 24:
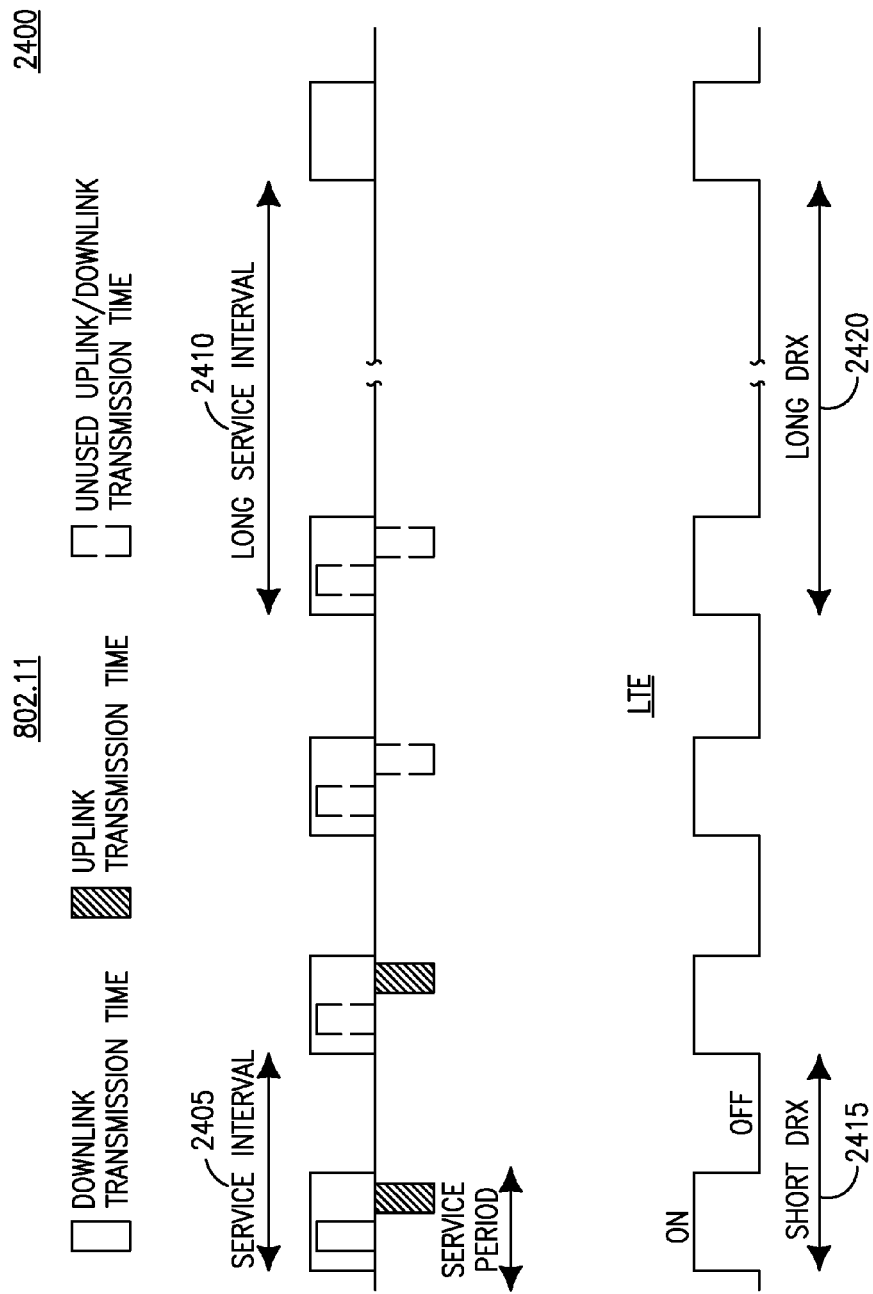
FIG. 24 shows an example of implicit transitioning between short service interval (SI) and long SI, and their alignment with LTE short discontinuous reception (DRX) and long DRX.

The WTRU then wakes up after every long SI interval to check for any downlink frames at the AP or to transmit any waiting frames in its own buffer. The AP also buffers frames for the WTRU during the long SI interval. The presence of frames in the uplink or downlink buffers causes the AP and WTRU to transition to the (short) SI. It may be conceivable to maintain different sets of parameters, (number of empty UTTs and DTTs to transition to long SI, long SI duration), for different access categories (ACs). Finally, the SI and long SI durations may be assigned identical values as the short DRX and long DRX cycles of LTE for inter-RAT alignment of activity cycles. FIG. 24 shows an example diagram 2400 for implicit transitioning between (short) SI 2405 and long SI 2410, and their alignment with LTE short DRX 2415 and long DRX 2420.

Described herein is a user plane WLAN abstraction layer entity. The user-plane WLAN Abstraction layer entity may perform the following functions: assist in translation of scheduling related information, (MCS, TXOP per AC, max packet size, grant periods and the like), from 802.11 RAT to LTE; translate between LTE formats and 802.11 formats such as QoS; provide and control first in first out (FIFO) data buffers for de-randomizing data flows; and execute LCP algorithm in case of split LCP.

Described herein is scheduling and grant management. The WLAN Abstraction Layer interfaces with the 802.11 MAC and provides information on how much data it may potentially transmit within a given time period to the LTE Upper MAC entity. The WLAN Abstraction Layer may operate in a persistent scheduling mode or a dynamic scheduling mode. In persistent scheduling mode, where semi-static schedule covering a longer duration than an LTE sub-frame may be used. This mode may be suitable for applications generating a steady flow of packets such as conversational voice and video. In dynamic scheduling mode, where scheduling per individual time-unit such as a LTE sub-frame may be followed. This mode may be suitable for applications that generate bursty traffic such as internet surfing and e-mail.

In the persistent scheduling mode, a traffic stream (TS) may be set up with the AP based on the QoS parameters of the access category via a TSPEC. Then the AP schedules periodic service periods (SPs) with appropriate parameters, (duration and periodicity), to satisfy the QoS requirements. The AP shall try to schedule downlink transmissions to a WTRU with which it has already established scheduled SPs within the same SP. Performing uplink and downlink transmissions meant for a particular WTRU in the same SP results in improved transmission efficiency. Additional frames in either direction may be scheduled dynamically.

A TS may be set up by the exchange of an Add Traffic Stream (ADDTS) request and an ADDTS response between an AP and WTRU. Both the ADDTS request and ADDTS response frames contain the TSPEC element that specifies the traffic characteristics and QoS requirements of the requested TS. The ADDTS response frame also may include a schedule element, which specifies the SP schedule information. If the AP does not have adequate resources to meet the requested QoS, the TS setup may be rejected, and this may be indicated in the ADDTS response frame. At a later time, the schedule for a SP may be changed by sending a schedule frame with revised parameters.

Uplink or downlink transmissions may also be scheduled dynamically by starting a controlled access phase (CAP) by the AP, in response to a non-empty downlink buffer or a BSR from the WTRU. The AP may gain access to the channel by waiting for a shorter duration than other contending stations after the end of any ongoing transmission.

Described herein is buffer management. The WLAN Abstraction layer user-plane entity may maintain a set of FIFO data buffers as a mechanism to flow control data between the LCP entity in the upper MAC and the 802.11 MAC entity. It may also be required to interface with the 802.11 flow control indications and use the available room in the data buffers as input to determine the next grant that may be reported to the Upper MAC.

The BSR reported on the LTE carriers may be either configured to account for data that may be buffered for IEEE 802.11 UL, account for data buffer for LTE UL, account for data that may be buffered for IEEE 802.11 UL less the anticipated data that will be transmitted in the next scheduled PSMP UL, account for the data in the LTE UL plus data present in the glue layer buffer UL, or account for the data in the LTE UL+data present in the WLAN Abstraction Layer buffer UL.

UL transmissions in the PSMP sequence may carry QoS messages indicating additional data remains. The information may be translated into a BSR-like report to the LTE upper stack.

The buffer status report may be augmented to take into account a 802.11 secondary carrier. This is applicable in the case of Split LCP, where a group of logical channels are ear-marked to be transmitted on 802.11 RAT. Several logical channel groups (LCGs) may be assigned to be transmitted over 802.11 secondary carrier(s). In the case of Combined and hybrid LCP, existing BSR mechanisms from LTE Release 10 may suffice.

Figure 25:
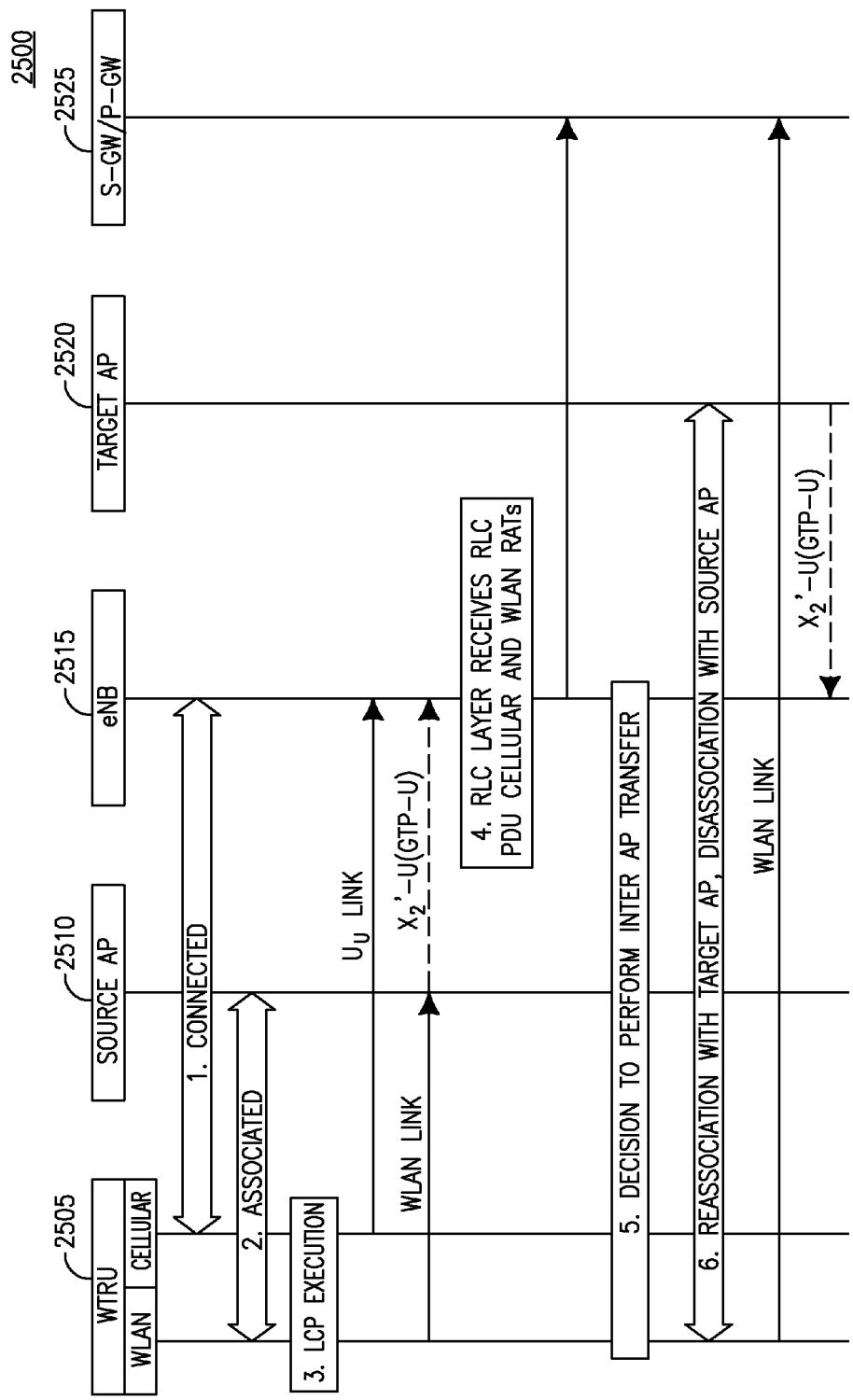
FIG. 25 shows an example message sequence flow and procedure for cellular-assisted 802.11 RAT addition and inter AP transfer for uplink.

Described herein are user data transfer over cellular and WLAN RATs. FIG. 25 provides an example flowchart 2500 of uplink user plane procedures for cellular-controller 802.11 RAT addition and cellular-controlled Inter AP transfer. The entities involved are a WTRU 2505, a source AP 2510, a eNB 2515, a target AP 2520 and a Serving Gateway (S-GW)/packet data network gateway (P-GW) 2525. Upon initial start-up, the WTRU 2505 attaches to the network (1). At a later time, the WTRU 2505 may associate with the source AP 2510 (2). The association procedure may be implemented as described herein above, where association may be done without cellular assistance, association may be done with cellular assistance, and association may be done with cellular assistance and with bypassed WLAN authentication. This may be followed by data segmentation using the examples described herein below, where three different logical channel prioritization (LCP) versions are described: combined LCP, split LCP and hybrid LCP.

A radio link control (RLC) entity/layer at the eNB 2515 may receive packet data units (PDUs) from the cellular and WLAN RATs, and may performs PDU reordering of out-of-sequence PDUs (4). Based on factors including, but not limited to, changing channel conditions and network load balancing, the eNB 2515 may decide to transfer the WTRU 2505 association from the current/source AP 2510 to another/target AP 2520 within the same ESS (5). Cellular-controlled inter-AP transfer may be performed, either with or without cellular layer assistance (6). Inter-AP transfer procedural details and various methods are described herein.

The user-plane, X2'-U, switch from the source AP 2510 to the target AP may follow one of two methods. In a first method, the X2'-U link to the source AP 2510 may be interrupted upon eNB 2515 determination of inter AP transfer initiation. The user-plane may be restored to the target AP 2520 after the source AP 2510 receives a disassociate frame from the WTRU as described herein below for inter AP transfer procedures.

To limit data interruption duration, the second method allows user-plane data to be delivered to the source AP 2510 right up to the point of disassociation, at which time the user-plane traffic may be re-directed to the target AP 2520. In both methods, the RLC entity/layer retransmissions are expected to recover any lost data during the switch from the source AP 2510 to the target AP 2515.

Figure 26A:
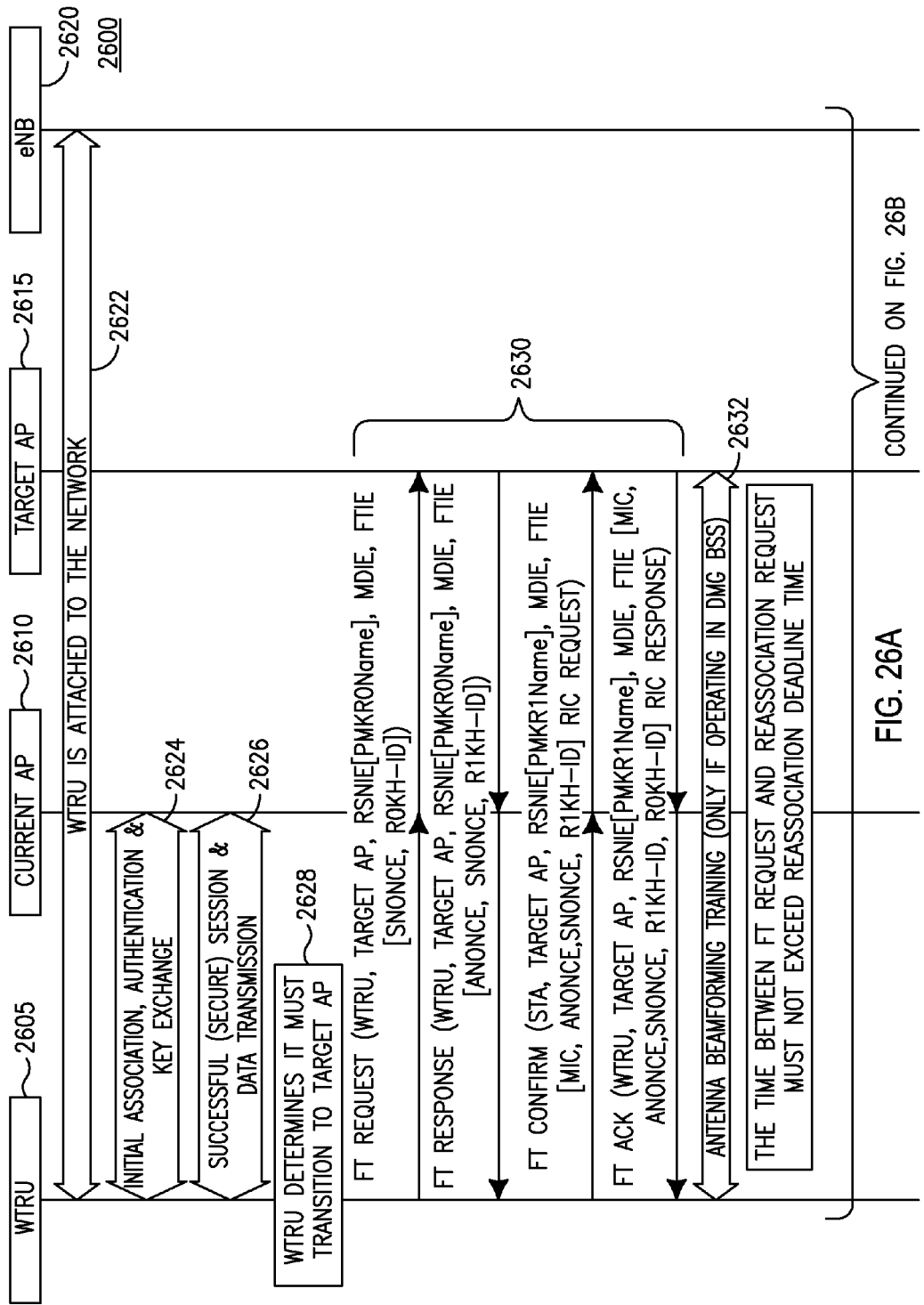
FIGS. 26A and 26B show an example of fast inter AP transition, no cellular layer assistance.
Figure 26B:
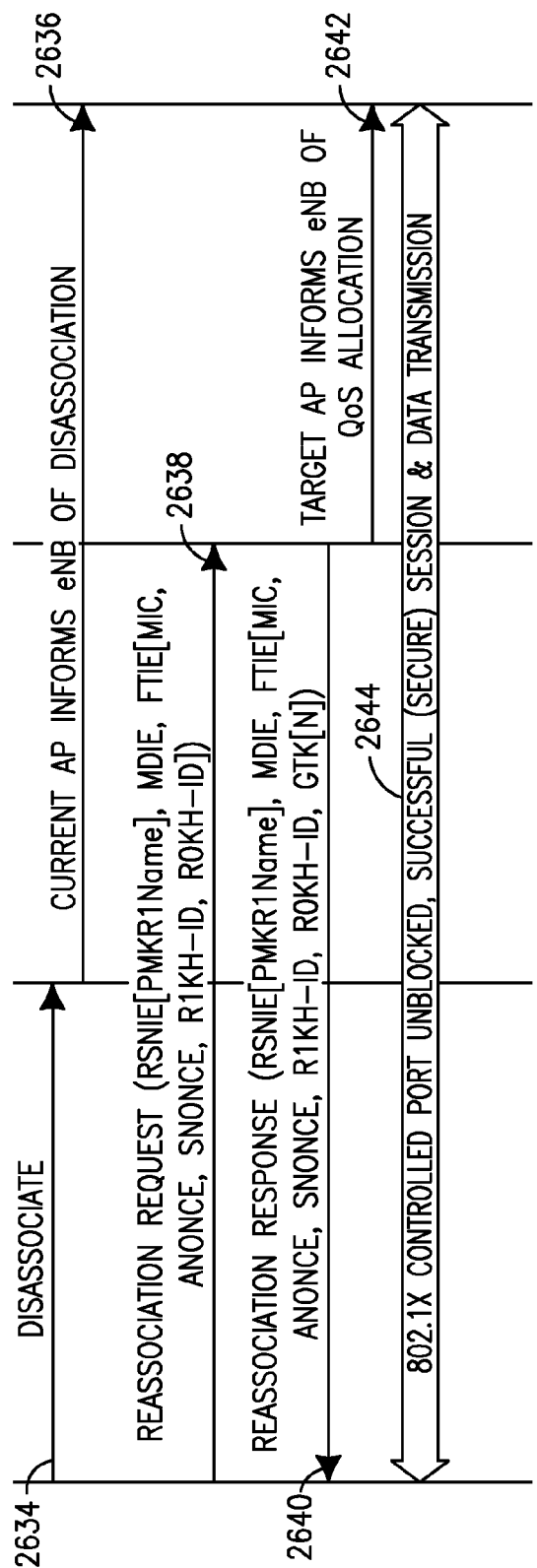

Described herein is an 802.11 inter AP transfer. FIGS. 26A and 26B are an example flowchart 2600 for performing an inter AP transfer with cellular assistance. The entities involved are a WTRU 2605, a current AP 2610, a target AP 2615 and an eNB 2620. Initially, the WTRU 2605 is attached to the cellular network after energizing (2622). When the WTRU 2605 is within range of an 802.11 AP, for example current AP 2610, the WTRU 2605 associates with the current AP 2610 via one of the three methods described herein above (2624 and 2626). The WTRU 2605 may then at a later time determine that it must transition to the target AP 2615 due to link quality deterioration with the current AP 2610 (2628).

The Fast BSS Transition (FT) procedure may allow quick transition from one AP to another by performing the pre-association steps while being attached to the current AP 2610 (2630). The FT procedure may include the four-way handshake for key distribution followed by antenna beamforming training if operating in a DMG BSS (2632). The WTRU 2605 may send a disassociate message or signal to the current AP 2610 (2634), which in turn informs the eNB 2620 of the disassociation (2636). A reassociation request may then be sent by the WTRI 2605 to the target AP 2615 (2638), which in turn may send a reassociation response to the WTRU 2605 (2640). The target AP 2615 may inform the eNB 2620 of WTRU association and new quality of service (QoS) resource allocation (2642). A successful secure session is established between the WTRU 2605 and the target AP 2615 (2644).

Figure 27A:
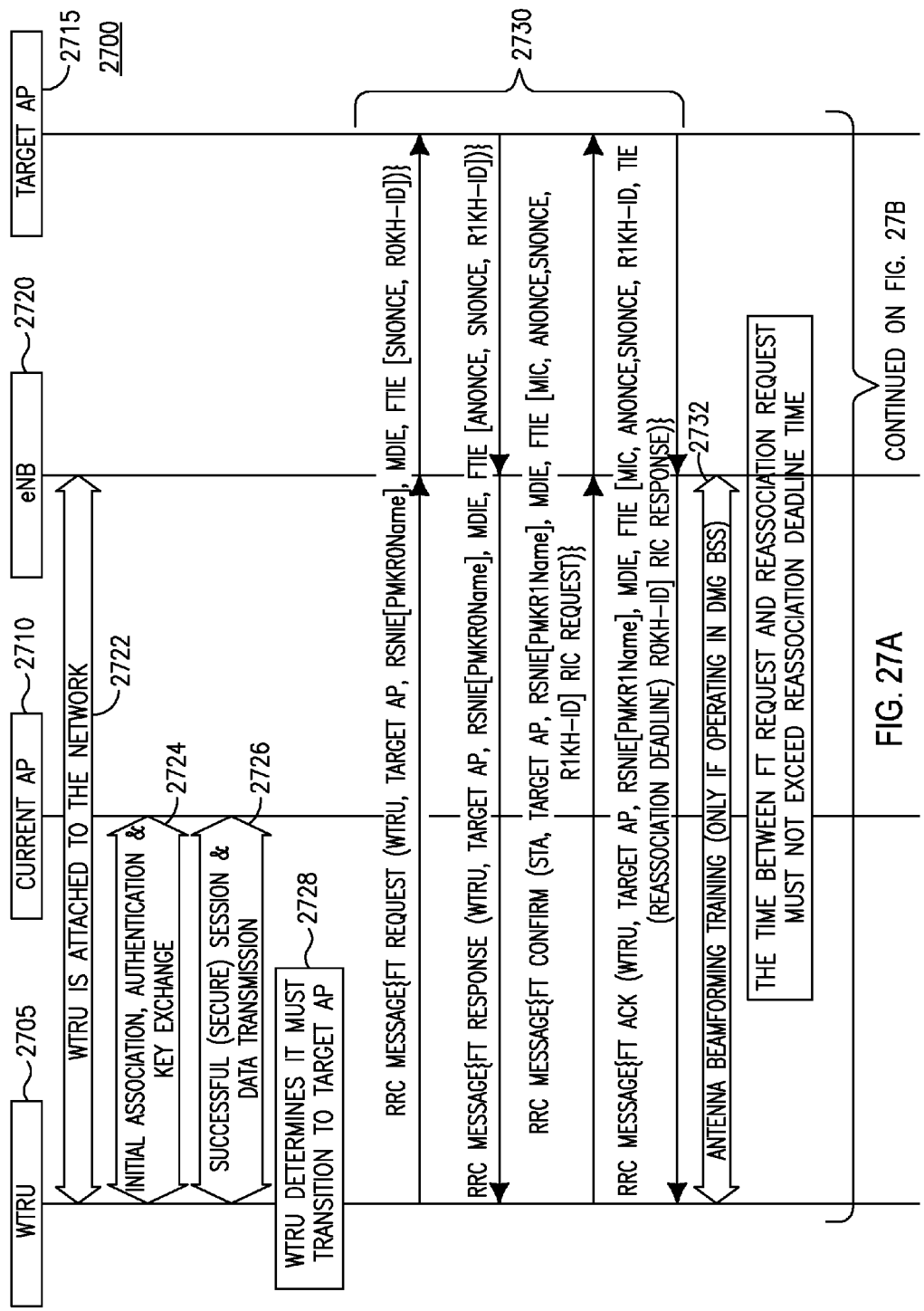
FIGS. 27A and 27B show an example of cellular assisted AP to AP transfer.
Figure 27B:
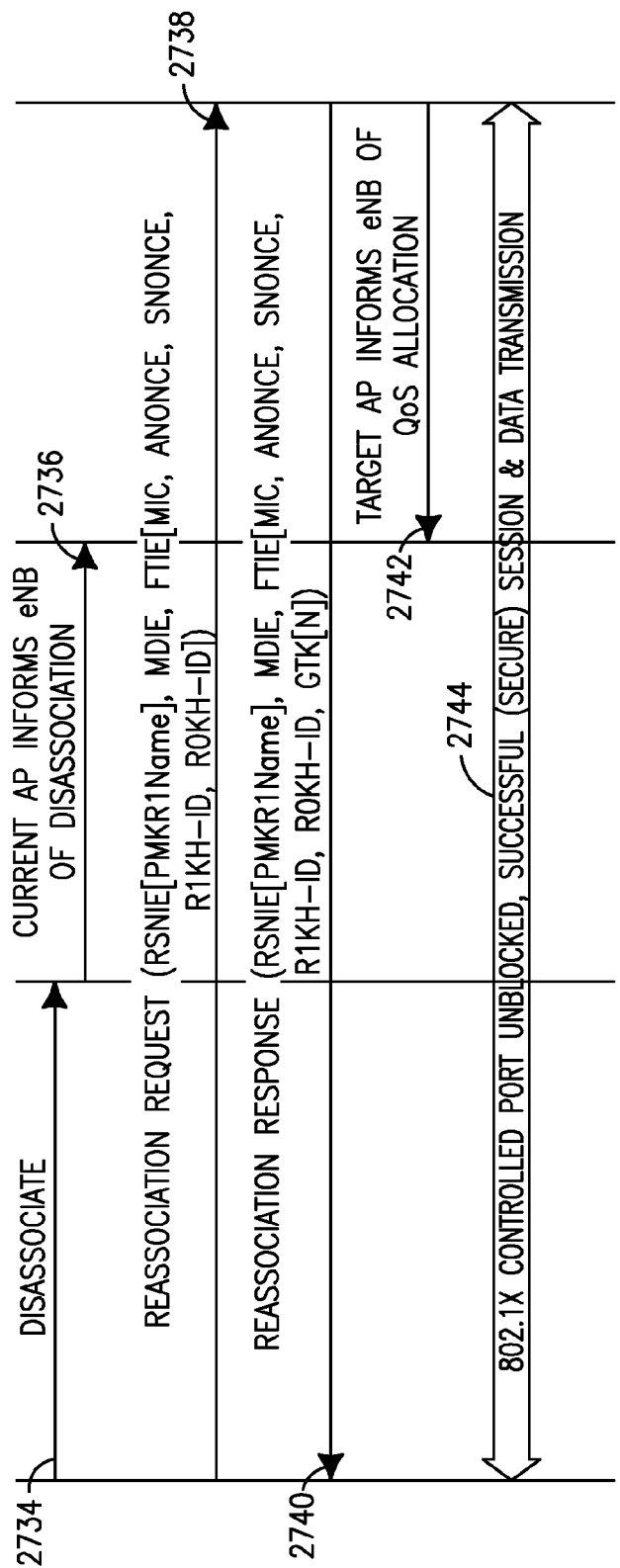

FIGS. 27A and 27B show an example flowchart 2700 for fast Inter AP transition with cellular layer assistance. The entities involved are a WTRU 2705, a current AP 2710, a target AP 2715 and an eNB 2720. In general, the AP to AP transfer messages are passed through the eNB 2720. The FT messages from the WTRU 2705 are encapsulated in radio resource control (RRC) messages to the eNB 2720, which are then forwarded to the target AP 2715 on a X2' interface.

Initially, the WTRU 2705 is attached to the cellular network after energizing (2722). When the WTRU 2705 is within range of an 802.11 AP, for example current AP 2710, the WTRU 2705 associates with the AP 2710 via one of the three methods described herein above (2724 and 2726). The WTRU 2705 may then at a later time determine that it must transition to the target AP 2715 due to link quality deterioration with the current AP 27610 (2728).

The Fast BSS Transition (FT) procedure may allow quick transition from one AP to another by performing the pre-association steps while being attached to the current AP 2710 (2730). As stated above, the FT messages from the WTRU 2705 are encapsulated in RRC messages to the eNB 2720, which are then forwarded to the target AP 2715 on a X2' interface. Similarly, messages from the target AP 2715 are first sent to the eNB 2720 before being sent to the WTRU 2705. The FT procedure may include the four-way handshake for key distribution followed by antenna beamforming training if operating in a DMG BSS (2732). The WTRU 2705 may send a disassociate message or signal to the current AP 2710 (2734), which in turn informs the eNB 2720 of the disassociation (2736). A reassociation request may then be sent by the WTRU 2705 to the target AP 2715 (2738), which in turn may send a reassociation response to the WTRU 2705 (2740). In this instance, the reassociation request may go directly to the target AP 2715, as the FT procedure followed by beamforming has already been executed. The target AP 2715 may inform the eNB 2720 of WTRU association and new quality of service (QoS) resource allocation (2742). A successful secure session is established between the WTRU 2705 and the target AP 2715 (2744).

Described herein is a method for AP to AP transfer with cellular assistance and optimized security procedures. In this instance, the reassociation and security key exchange steps are optimized due to prior establishment of secure links from an eNB to a current AP and from the eNB to a target AP. The secure link from the WTRU to the current AP through the eNB, (that follows from cellular authentication procedures), allows the WTRU-to-AP authentication procedure to be truncated or even eliminated. Also, the PDCP layer security provided by the cellular network obviates the need for 802.11 key exchange and security procedures. Two examples of the optimized procedure are described herein below.

Figure 28A:
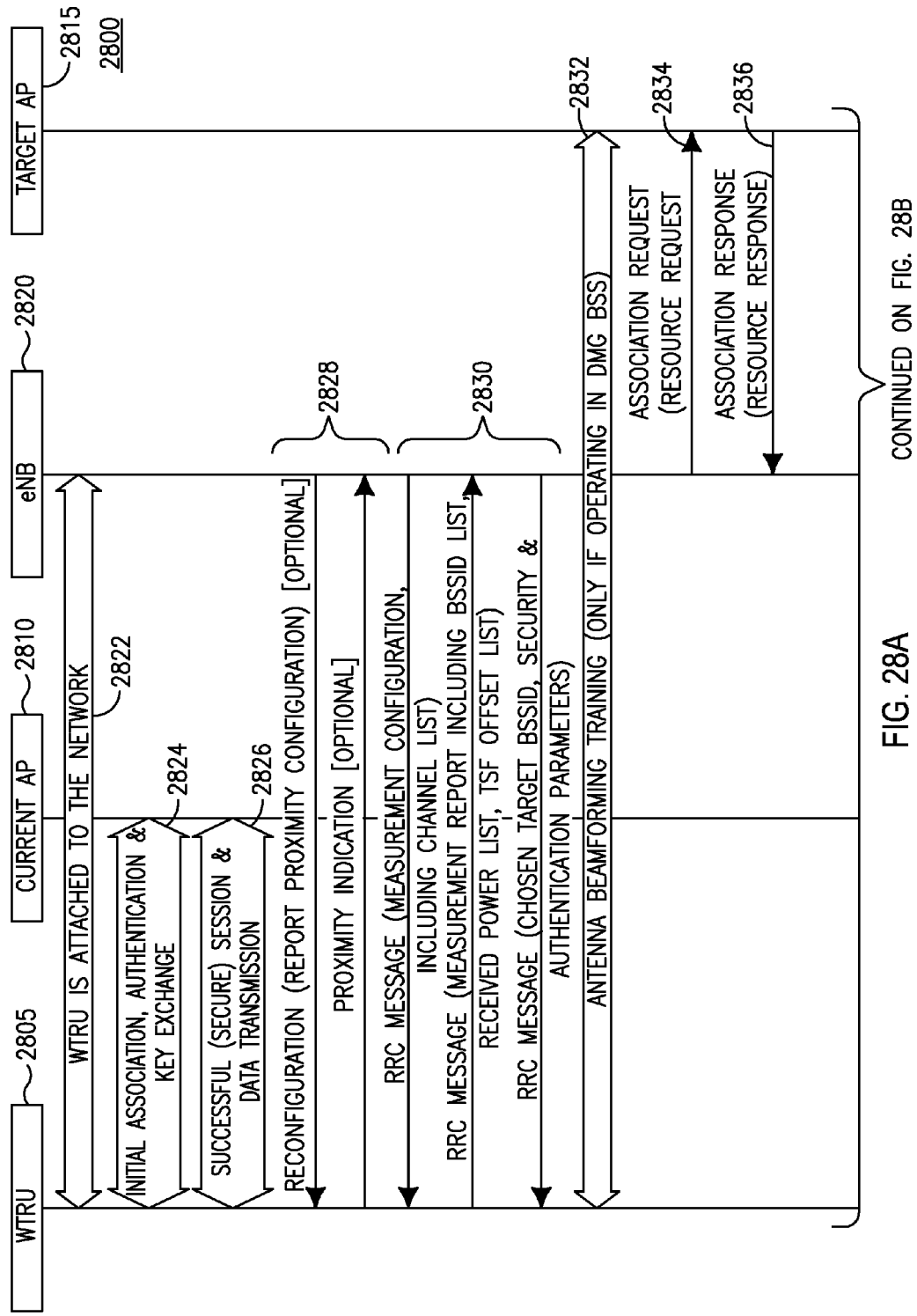
FIGS. 28A and 28B show an example of cellular assisted AP to AP transfer with optimized security procedures.
Figure 28B:
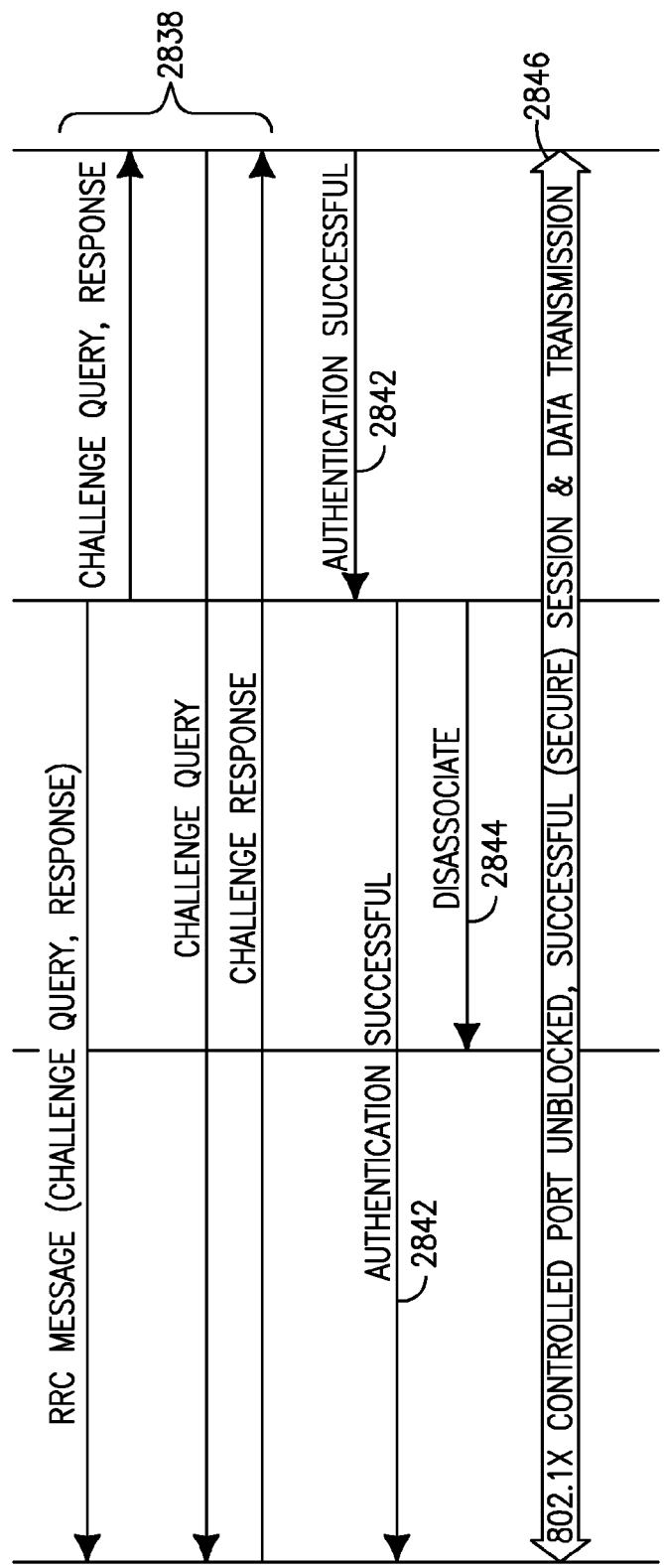

FIGS. 28A and 28B show an example flowchart 2800 for AP to AP transfer with cellular assistance and optimized security procedures. The entities involved are a WTRU 2805, a current AP 2810, a target AP 2815 and an eNB 2820. As before, the WTRU 2805 is attached to the cellular network after energizing (2822). When the WTRU 2805 is within range of an 802.11 AP, for example current AP 2810, the WTRU 2805 associates with the AP 2810 via one of the three methods described herein above (2824 and 2826). The WTRU may then determine that it needs to transition to a target AP 2815 by proximity indication (2828) or by measuring the quality of the periodically received beacon of measurement pilot frames from all APs within communication range (2830). Antenna beamforming training may be performed with the target AP 2815 if it may be part of a DMG BSS (2832).

An association request, which may include QoS Resource Request, may originate from the eNB 2820 to the target AP 2815 (2834). This may be possible because QoS parameters of the traffic streams sought to be transferred to the target AP 2815 are available with the eNB 2820. The target AP 2815 may send an association response to the eNB 2820 (2836). The eNB 2820 may then inform the WTRU 2805 of successful reassociation with the target AP 2815 (2840) and then facilitate the truncated authentication procedure described herein above (2842). The eNB 2820 may send a disassociate message to the current AP 2810 (2844). A successful secure session is established between the WTRU 2805 and the target AP 2815 (2846).

Described herein is an example method of cellular assisted AP to AP transfer with optimized security procedures without WLAN authentication. This may be similar to the cellular-assisted, optimized AP to AP transfer procedure described herein with respect to FIG. 28. However, similar to the initial association procedure without authentication described herein, the authentication steps are skipped due to pre-authentication of the WTRU, current AP and target AP to the eNB and prior establishment of secure links from the eNB to the WTRU, current AP and target AP. Security key exchange may also be skipped due to PDCP-level encryption already in use at the cellular layer.

Figure 29:
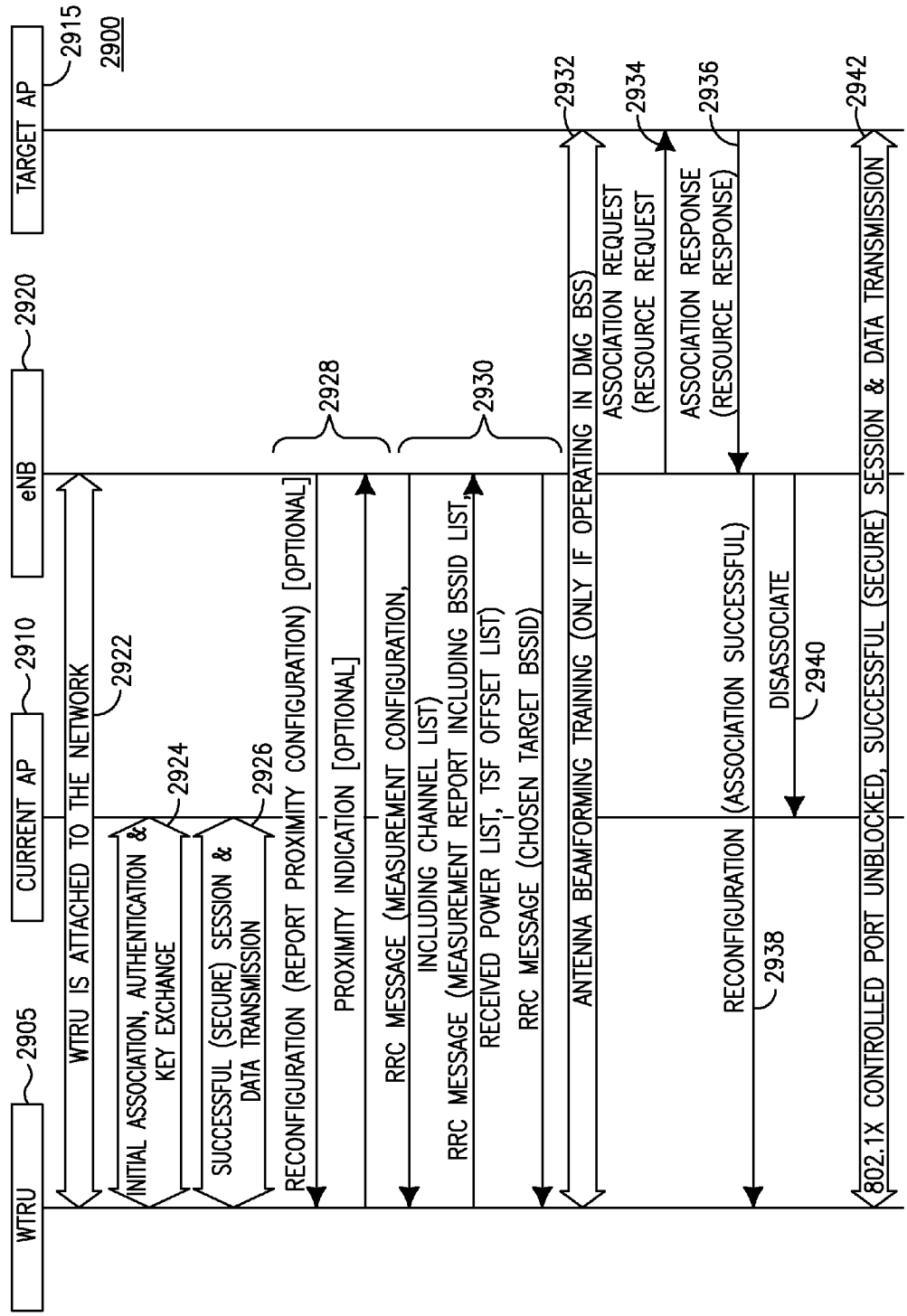
FIG. 29 shows an example of cellular-assisted fast BSS transition without WLAN authentication.

FIG. 29 shows an example flowchart 2900 of cellular assisted AP to AP transfer with optimized security procedures without WLAN authentication. The entities involved are a WTRU 2905, a current AP 2910, a target AP 2915 and an eNB 2920. As before, the WTRU 2905 is attached to the cellular network after energizing (2822). When the WTRU 2905 is within range of an 802.11 AP, for example current AP 2910, the WTRU 2905 associates with the AP 2910 via one of the three methods described herein above (2924 and 2926). The WTRU may then determine that it needs to transition to a target AP 2915 by proximity indication (2928) or by measuring the quality of the periodically received beacon of measurement pilot frames from all APs within communication range (2930). Antenna beamforming training may be performed with the target AP 2915 if it may be part of a DMG BSS (2932).

An association request, which may include QoS Resource Request, may originate from the eNB 2920 to the target AP 2915 (2934). This may be possible because QoS parameters of the traffic streams sought to be transferred to the target AP

2915 are available with the eNB 2920. The target AP 2915 may send an association response to the eNB 2920 (2936). The eNB 2920 may then inform the WTRU 2905 of successful reassociation with the target AP 2915 (2938). The eNB 2920 may send a disassociate message to the current AP 2910 (2940). A successful secure session is established between the WTRU 2905 and the target AP 2915 (2942).

Several types of Logical channel prioritization (LCP) are proposed below. Depending on the deployment and application scenarios, any of the LCP types may be used. Any LCP type mentioned below may be used with either MAC level aggregation or below the MAC aggregation.

Combined LCP may be performed across all logical channels at an LTE TTI interval rate. This type of LCP algorithm ensures that data is prioritized irrespective of which underlying RAT the data is carried on. At each LTE TTI, a combined LCP algorithm may be invoked. Grants for each of the LTE component carriers may be available at this point. Depending on the IEEE 802.11 protocol used, a different set of grant related information may be fed by an IEEE 802.11 RAT.

When a distributed coordinated function (DCF) is used, there may be no grant guarantees in IEEE 802.11. In such a case, an IEEE 802.11 RAT may provide the maximum data packet it can send based on its current CSI feedback, its data rate capabilities, and the like, to the combined LCP algorithm as input. When using an IEEE 802.11e amendment, an IEEE 802.11 RAT may provide the maximum data packet it can send for each access category based on TXOP limit, its current CSI feedback, and its data rate capabilities and the like to the combined LCP algorithm as an input. In this case, an IEEE 802.11 RAT may be providing a maximum data packet it can send for each of the four access categories specified by IEEE 802.11e. The RRC may provide additional information to a MAC layer on how to map different access categories to logical channel priorities.

When a dedicated grant is possible as part of an IEEE 802.11 protocol used, (for example IEEE 802.11ad), an IEEE 802.11 RAT may provide the grant information and maximum data packet it can send based on its current CSI feedback, its data rate capabilities, and the like, to a combined LCP algorithm as input.

Figure 30:
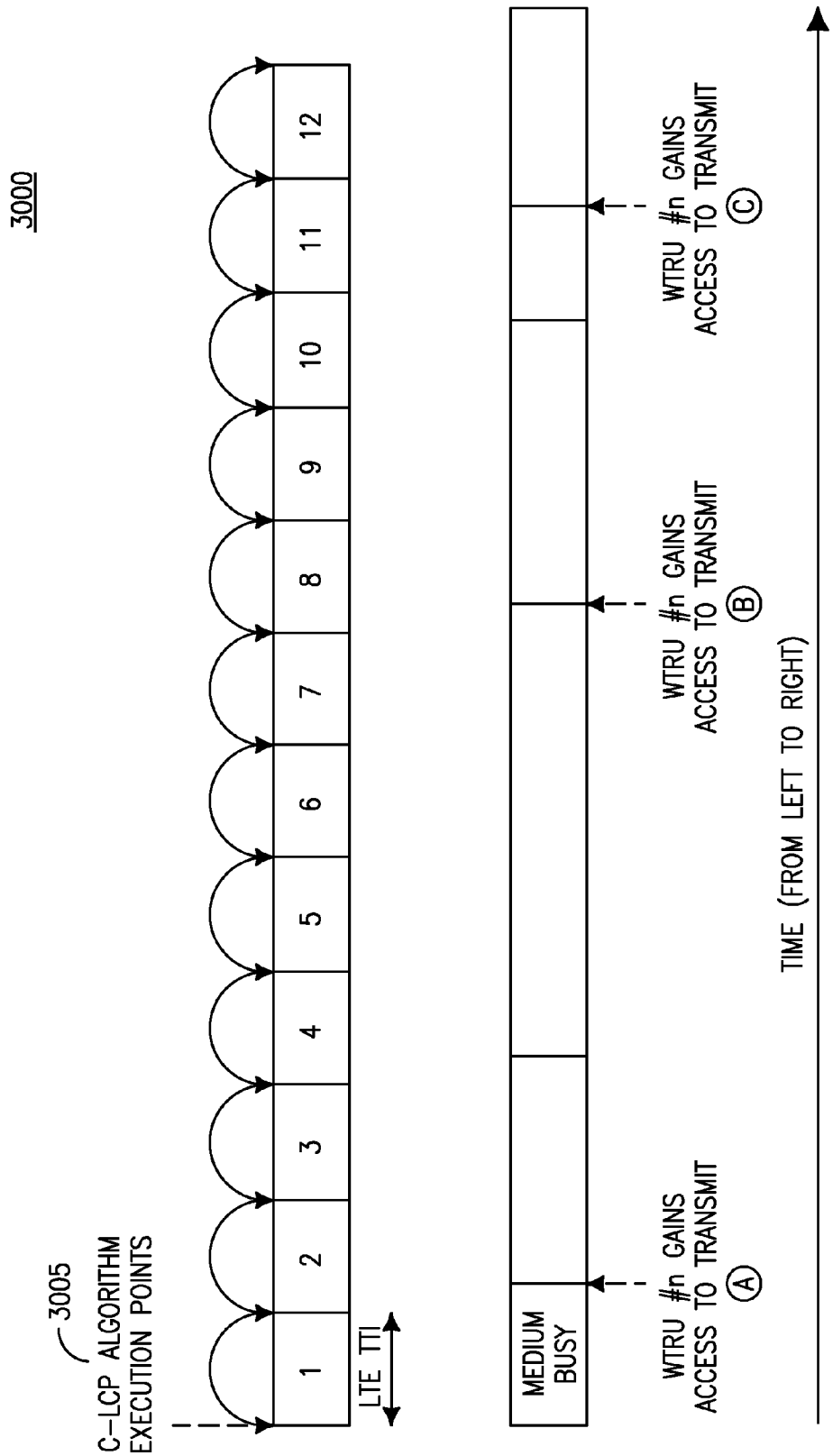
FIG. 30 shows an example timeline for a combined logical channel prioritization (LCP) execution and IEEE 802.11 transmissions.

Most IEEE 802.11 protocols are not time slotted and are not TTI aligned to an LTE air-interface. Since the combined LCP algorithm may be executed at an LTE TTI rate, these aspects have to be accounted for in the glue layer. As can be seen from the illustration 3000 in FIG. 30, a combined LCP algorithm may be executed every LTE TTI 3005, and an IEEE 802.11 RAT may provide feedback with regard to its capability to transmit in that TTI. Also an IEEE 802.11 RAT may not be able to gain access to the channel every LTE TTI, but may get access at different points shown as A, B and C.

There may be some aspects that are inherently different for IEEE 802.11 protocols that have to be taken into account for a combined LCP algorithm. Once a certain amount of data is provided to an IEEE 802.11 RAT to be transmitted, either due to contention or channel conditions or retransmissions, the IEEE 802.11 RAT may not be able to deliver this data as compared to an LTE air-interface, where a grant guarantees a TXOP. Due to the above mentioned reasons, if the internal buffers provided by the IEEE 802.11 RAT are deemed full based on a threshold, the IEEE 802.11 RAT may project the maximum data rate it can transmit in a given LTE TTI to be potentially less, (including zero bits), than what it may actually transmit in that time interval.

This LCP method may also lead to out of sequence packets at the radio link control (RLC) layer or entity. For baseline LTE Release 8 (R8)/10 (R10) RLC-acknowledge mode (AM), this is not an issue as it is capable of handling out-of-sequence packet data units (PDUs). If RLC re-segmentation is used, care must be taken in how the timer t-Reordering value is set as different segments might take different paths, (via cellular or 802.11 links). Baseline LTE R8/R10 RLC-unacknowledged mode (UM) may also be capable of handling out-of-sequence UM PDUs. This is handled again by using timer t-Reordering. The timer t-Reordering may be configured per RLC entity.

In split LCP, logical channels may either be mapped to LTE or IEEE 802.11 RAT, but not to both at the same time. Thus, certain traffic, (identified by specific logical channels), may be mapped to be carried over an IEEE 802.11 RAT at a configuration time. This mapping may not change on a TTI basis, but may be allowed to be updated on a much coarser scale, (for example using RRC (re)configuration messaging).

An LTE MAC may perform LCP similar to a baseline, for the logical channels that are mapped to LTE. An IEEE 802.11 RAT may perform LCP based on the logical channels that are mapped to IEEE 802.11. This LCP for IEEE 802.11 may be executed in the glue layer using data from each logical channel, such as buffer occupancy, SDU sizes and the like, and logical channel priority information provided during configuration along with MCS, TXOP and grant period information from an IEEE 802.11 stack.

In hybrid LCP, an LTE stack may first execute its LCP to satisfy prioritized bit rate (PBR) requirements for all logical channels in that TTI and also maximum bit rate (MBR) requirements for some channels to the extent that the LTE grant allows it. The remaining MBR data for each of the remaining logical channels may be provided to an IEEE 802.11 RAT for transmission. The IEEE 802.11 RAT may perform LCP for the MBR data for the logical channels it is provided with in that time interval. Hybrid LCP may lead to out-of-order packet arrival at the receiver, and since RLC supports out-of-order reception, this may not be an issue.

Described herein are radio resource management for 802.11 CA with 3GPP RAN. In order for the network to understand the load for different APs and channels within a particular AP, the network may use existing measurements as defined in IEEE 802.11 protocols or configured as described herein above.

The LTE AS-SME may configure measurements in the WTRU and obtain measurement reports as needed. If an LTE node and AP are integrated, (either co-located or non-co-located), the LTE node may request its AP to perform measurements related to BSS transition capability. Using a BSS transition management query, BSS transition management request, or BSS transition management response frames, the AP may be able to query the WTRU of neighboring APs and how the WTRU ranks the neighboring APs.

The AP may provide this information to a network management entity in an LTE node, which may use it for load balancing purposes. This mechanism may also take the WTRU's view and which APs it prefers. Based on this information and other RRM inputs, the LTE node may request the WTRU to disassociate with the AP that it is currently associated with to move to a different AP.

The network management entity may also request the AP to configure measurements at the WTRU to understand the channel load by configuring channel load measurement reports. These measurements may be measured using either physical or virtual carrier sense mechanisms at the WTRU. The WTRU may report these as a percentage of channel busy time over a measured period. The network may also use this information for load balancing purposes.

As an alternative technique, an AP may signal to another AP a request for a channel load report, assuming an AP supports performing channel load measurements. Since an AP may be a superset of a WTRU, it may support the measurement of the capabilities of a WTRU if these are implemented in the AP.

In order to monitor an IEEE 802.11 link, an IEEE 802.11 link layer feedback mechanism may be used to report to the RRC layer whether the link is up or down via the glue layer or WLAN abstraction layer. As part of the WLAN abstraction layer, a UL and DL data buffer may be set up to de-randomize the data flow through the glue layer. In the DL, data from LTE higher layers, (i.e., transport blocks), may be deposited in the buffer, and glue layer buffer status (GBS) may be visible to the LTE MAC. A GBS may also be available for the UL so that the LTE MAC knows when UL data is available to be fetched. If the DL GBS for a WTRU is not reduced by the IEEE 802.11 MAC for a specified period, and UL data does not arrive in the IEEE 802.11 carrier, a link failure may be deduced by LTE and the data in the DL glue layer buffer may be 'canceled' from the IEEE 802.11 flow and redirected to a LTE carrier.

Multiple methods may be available to explicitly test the link. Such tests may be configured in the IEEE 802.11 carrier, via the WLAN abstraction layer, by LTE. The results of such tests may be sent to the LTE layer for additional processing and determination of the availability of the link for that WTRU. Such methods may include a probe request/response, Request to Send and Clear to Send (RTS/CTS) exchanges, and an MCS request/response. IEEE 802.11 may also know that the link is up due to recent unsolicited feedback from the WTRU. For example, if the WTRU sends an unsolicited MCS feedback in the last M mSec, then the link may be considered to be functioning. The IEEE 802.11 may also have a missing positive acknowledgement (ACK)/negative acknowledgement (NACK), (or other response missing responses), that may indicate that the link is lost or of low quality and send that information, (via the WLAN abstraction layer) to the LTE stack. Any of these mechanisms may be used to report to the RRC/LTE AS-SME layer of link failure.

In some deployments, the IEEE 802.11 AP may not be co-located with the LTE eNB, and may appear as a downlink only channel, such that the feedback (MAC ACK/NACKs, CQI, measurements) from the IEEE 802.11 channel are fed back to the LTE eNB. This may require an additional translation entity in the WTRU that encapsulates and sends the IEEE 802.11 feedback from an IEEE 802.11 MAC at the receiving end to the LTE uplink channel.

The power amplifier (PA) configuration for a WTRU may be signaled to an LTE system, (e.g., as part of capability class information). In the event that a single PA is used to support both an IEEE 802.11 carrier and an LTE carrier, the maximum transmit (Tx) power for the capability class may need to consider the sum of the Tx powers in both carriers.

In an example, if an IEEE 802.11 transmission has started before an LTE UL grant is determined by the WTRU and the transmission may still exist at the time the LTE transmission starts, the Tx power of the IEEE 802.11 transmission may not be reduced when the LTE transmission starts. The power of the LTE transmission with any backoff may be computed as usual except that the maximum Tx power in the UL power control (PC) algorithm may be reduced by the amount of the power used in the IEEE 802.11 transmission.

In another example, if an LTE transmission has started before a scheduled IEEE 802.11 UL is detected and the transmission will still exist at the time that IEEE 802.11 transmission starts, the Tx power of the LTE transmission may not be reduced when the IEEE 802.11 transmission starts. Alternatively, the power of the IEEE 802.11 transmission may be unchanged as long as the increased total power is below the Pmax of the PA. Otherwise, the IEEE 802.11 transmission may be reduced to the available power or aborted. LTE may facilitate this by controlling an attenuator in the feed of the PA.

If an LTE transmission has started and there is insufficient headroom for any unscheduled IEEE 802.11 transmission, the IEEE 802.11 transmission may be reduced to the available power or aborted. LTE may facilitate this by controlling an attenuator in the feed of the PA. Alternatively, a NAV counter may be incremented at the beginning of the LTE transmission by an amount sufficient to ensure no IEEE 802.11 unscheduled transmissions are possible.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A base station for inter-radio access technology (RAT) integration configured to operate in a first RAT, comprising:
a transceiver;
a processor configured to control the transceiver to transmit control signals to another base station that is not co-located with the base station and is configured to operate in a second RAT, wherein the control signals include management, co-ordination and configuration signals; and
circuitry configured to establish a link with the other base station that is not co-located with the base station whereby a medium access control (MAC) entity associated with the second RAT is abstracted from Packet Data Convergence Protocol (PDCP) layer associated with the first RAT to enable transmission of data packets originating from the first RAT via the other base station over the second RAT and the established link.

2. The base station of claim 1, wherein the base station includes a radio resource control (RRC) entity for exchanging the control signals.

3. The base station of claim 1, wherein the base station is configured to receive a RRC connection request message from the other base station that includes at least one of an indicator for data plane resources, capabilities, and configuration parameters.

4. The base station of claim 1, wherein the control signals exchanged are for at least one of authentication and security.

5. The base station of claim 1, wherein the first RAT is a third generation partnership project (3GPP) radio access network and the second RAT is an Institute of Electrical and Electronics Engineers (IEEE) 802.11 radio access technology.

6. A wireless transmit/receive unit (WTRU) for multiple radio access technology (RAT) integration, comprising:
   a processor;
   a radio resource control (RRC) entity associated with a first RAT;
   a medium access control (MAC) management entity associated with a second RAT;
   a WLAN abstraction entity or a session management entity (SME) configured to map between the RRC entity associated with the first RAT and the MAC management entity associated with the second RAT, wherein:
   the RRC entity is configured to configure and control a physical entity associated with the second RAT and the MAC management entity, and
   the WLAN abstraction entity or the SME is further configured to provide an abstraction of the MAC management entity associated with the second RAT from the RRC entity associated with the first RAT to enable transmission of data packets originating from the RRC entity associated with the first RAT via the second RAT.

7. The WTRU of claim 6, wherein the RRC entity configures the WLAN abstraction entity for interfacing between the first RAT and the second RAT.

8. The WTRU of claim 6, wherein an access spectrum (AS) entity associated with the first RAT is configured to at least act as the WLAN abstraction entity or the SME (AS-SME entity).

9. The WTRU of claim 8, wherein the RRC entity includes the WLAN abstraction entity or the AS-SME entity.

10. The WTRU of claim 8, wherein the first RAT is configured to operate as a primary carrier and the second RAT is configured to operate as a secondary carrier.

11. The WTRU of claim 10, wherein for the second RAT, the WTRU is configured to provide measurements for at least one different basic service sets (BSSs) that reside on a configured channel or identified BSSs on different channels.

12. The WTRU of claim 6, wherein a discontinuous receive (DRX) off duration is an integer multiple of a beacon interval.

13. The WTRU of claim 6, wherein quality of service (QoS) parameters are used to create a traffic specification (TSPEC) with an access point (AP) by sending an add traffic stream (ADDTS) frame.

14. The WTRU of claim 13, wherein a scheduled power save multi-poll (PSMP) stream is established with the AP for downlink transmission times (DTTs) and uplink transmission times (UTTs).

15. The WTRU of claim 13, wherein service periods and service intervals (SIs) are scheduled based on the QoS parameters and a predetermined long SI is used on a condition that a pre-configured number of consecutive Uplink Transmission Times (UTTs) and Downlink Transmission Times (DTTs) pass without any uplink or downlink frames for the WTRU.

16. The WTRU of claim 15, wherein the SI and long SI are assigned identical values as a short DRX and a long DRX for inter-RAT alignment of activity cycles.

17. The WTRU of claim 6, wherein combined logical channel prioritization (LCP) is performed across the first RAT and second RAT logical channels at a first RAT transmission time interval (TTI) rate.

18. The WTRU of claim 17, wherein maximum data packet rates are provided by the second RAT for performance of the combined LCP.

19. The WTRU of claim 6, wherein the WLAN abstraction entity is further configured to:
   receive a reconfiguration message from a base station on a condition of access point handover, the reconfiguration message including a challenge query, and
   respond with a challenge response to effect the access point handover.

20. The method of claim 19, wherein the WLAN abstraction entity manages time alignment, data buffering and flow control between the first RAT and the second RAT.

21. A method for access point transfer, comprising:
   transmitting a measurement configuration request to an attached wireless transmit/receive unit (WTRU) that is configured to operate in a first radio access technology (RAT) and a second RAT, wherein the measurement configuration request includes measurement gaps, objects or pilots to make measurements of access points configured to operate in the second RAT;
   receiving a measurement report from the attached WTRU;
   transmitting a selected target access point to the attached WTRU;
   associating with the selected target access point; and
   facilitating authentication between the WTRU and the selected target access point; and
   establishing a link with the AP whereby a medium access control (MAC) entity associated with the second RAT is abstracted from the Packet Data Convergence Protocol (PDCP) entity of the first RAT to enable transmission of data packets originating from the first RAT over the second RAT and the established link.

* * * * *